US012696173B2

(12) United States Patent
Breaux, III et al.

(10) Patent No.: US 12,696,173 B2
(45) Date of Patent: Jul. 28, 2026

(54) CONTEXT-AWARE MOBILE DEVICE MANAGEMENT

(71) Applicant: CELLCONTROL, INC., Baton Rouge, LA (US)

(72) Inventors: Joseph E. Breaux, III, Baton Rouge, LA (US); Michael W. Lynn, Baton Rouge, LA (US); Chad Howell, Mandeville, LA (US); John Wright, Baton Rouge, LA (US); Chester Parrott, Walker, LA (US); Nicholas Hathaway, Zachary, LA (US); Chad A. Kennedy, Baton Rouge, LA (US)

(73) Assignee: CELLCONTROL, INC., Baton Rouge, LA (US)

( * ) Notice: Subject to any disclaimer, the term of this patent is extended or adjusted under 35 U.S.C. 154(b) by 421 days.

(21) Appl. No.: 18/240,193

(22) Filed: Aug. 30, 2023

(65) Prior Publication Data

US 2023/0413159 A1     Dec. 21, 2023

Related U.S. Application Data

(63) Continuation of application No. 17/368,454, filed on Jul. 6, 2021, now Pat. No. 11,751,123, which is a
(Continued)

(51) Int. Cl.
H04W 48/04         (2009.01)
G06F 3/02          (2006.01)
(Continued)

(52) U.S. Cl.
CPC .......... H04W 48/04 (2013.01); G06F 3/0227 (2013.01); H04W 4/027 (2013.01); H04W 4/80 (2018.02);
(Continued)

(58) Field of Classification Search
CPC ....... H04W 48/04; H04W 4/80; H04W 76/14; H04W 4/027; H04W 8/18; H04W 4/50;
(Continued)

(56) References Cited

U.S. PATENT DOCUMENTS 5,410,621 A     4/1995 Hyatt
6,745,021 B1    6/2004 Stevens
(Continued)

FOREIGN PATENT DOCUMENTS

EP          1335614        11/2011
WO       2018/073561       4/2018

OTHER PUBLICATIONS

English Translation of Office Action issued in KR10-2021-7029654 (Apr. 19, 2024).
(Continued)

*Primary Examiner* — Congvan Tran
(74) *Attorney, Agent, or Firm* — Barnes & Thornburg LLP

(57)         ABSTRACT

Technologies disclosed herein are directed to context-based mobile device management. According to one embodiment, an application executing in a mobile device detects an event to trigger context-based management of the mobile device. A usage context associated with the mobile device is determined. One or more policies to enforce on the mobile device are identified as a function of the usage context. The application enforces the one or more policies on the mobile device.

14 Claims, 14 Drawing Sheets

Related U.S. Application Data continuation-in-part of application No. 17/068,611, filed on Oct. 12, 2020, now Pat. No. 11,284,334, which is a continuation of application No. 16/276,194, filed on Feb. 14, 2019, now Pat. No. 10,805,861, which is a continuation-in-part of application No. 15/191,353, filed on Jun. 23, 2016, now Pat. No. 10,268,530, which is a continuation-in-part of application No. 14/944,178, filed on Nov. 17, 2015, now Pat. No. 9,398,421, which is a continuation of application No. 14/273,505, filed on May 8, 2014, now Pat. No. 9,338,605.

(60) Provisional application No. 62/183,452, filed on Jun. 23, 2015, provisional application No. 61/936,152, filed on Feb. 5, 2014, provisional application No. 61/892,406, filed on Oct. 17, 2013, provisional application No. 61/821,019, filed on May 8, 2013.

(51) Int. Cl.

| | |
|---|---|
| *H04W 4/02* | (2018.01) |
| *H04W 4/80* | (2018.01) |
| *H04W 76/14* | (2018.01) |
| *H04R 3/00* | (2006.01) |
| *H04W 84/12* | (2009.01) |
| *H04W 84/18* | (2009.01) |

(52) U.S. Cl.
CPC .............. *H04W 76/14* (2018.02); *H04R 3/00* (2013.01); *H04R 2499/11* (2013.01); *H04R 2499/13* (2013.01); *H04W 84/12* (2013.01); *H04W 84/18* (2013.01)

(58) Field of Classification Search
CPC ..... H04W 84/12; H04W 84/18; G06F 3/0227; H04R 2499/13; H04R 2499/11; H04R 3/00
See application file for complete search history.

(56) References Cited

U.S. PATENT DOCUMENTS

| | | | |
|---|---|---|---|
| 6,909,359 | B1 | 6/2005 | McGovern |
| 7,269,162 | B1 | 9/2007 | Turner |
| 7,711,355 | B1 | 5/2010 | Kruger |
| 7,991,399 | B2 | 8/2011 | Ganesan |
| 8,213,962 | B2 | 7/2012 | Carr et al. |
| 8,254,592 | B2 | 8/2012 | Sander et al. |
| 8,280,791 | B2 | 10/2012 | Davis, III |
| 8,504,066 | B1 | 8/2013 | Green |
| 8,589,495 | B1* | 11/2013 | Beckert ................... G06F 9/542 709/204 |
| 8,613,070 | B1* | 12/2013 | Borzycki .............. H04L 67/104 726/8 |
| 8,618,913 | B1 | 12/2013 | Bailey et al. |
| 8,630,283 | B1 | 1/2014 | Breau |
| 8,676,266 | B2 | 3/2014 | Kim |
| 8,732,827 | B1 | 5/2014 | Zhukov |
| 8,750,853 | B2 | 6/2014 | Abramson |
| 8,856,322 | B2 | 10/2014 | Dare |
| 8,898,771 | B1 | 11/2014 | Kim |
| 8,938,226 | B2* | 1/2015 | Weinstein ............... H04W 4/50 455/419 |
| 8,948,790 | B1 | 2/2015 | Kim |
| 8,958,853 | B1 | 2/2015 | Bovis |
| 9,338,605 | B2 | 5/2016 | Guba et al. |
| 9,398,421 | B2 | 7/2016 | Guba et al. |
| 9,912,802 | B2 | 3/2018 | Wolterman |
| 10,268,530 | B2 | 4/2019 | Breaux et al. |
| 10,271,265 | B2 | 4/2019 | Breaux |
| 10,477,454 | B2 | 11/2019 | Breaux |
| 10,922,157 | B2 | 2/2021 | Breaux |
| 11,119,836 | B2 | 9/2021 | Breaux |
| 2001/0005804 | A1 | 6/2001 | Rayner |
| 2004/0156487 | A1* | 8/2004 | Ushiki .............. H04M 3/42272 455/414.3 |
| 2005/0220286 | A1 | 10/2005 | Valdez |
| 2006/0080444 | A1 | 4/2006 | Peddemors |
| 2006/0083390 | A1 | 4/2006 | Kaderavek |
| 2006/0177014 | A1 | 8/2006 | Skakkebaek |
| 2006/0223494 | A1 | 10/2006 | Chmaytelli et al. |
| 2007/0183651 | A1 | 8/2007 | Comaniciu |
| 2007/0195818 | A1 | 8/2007 | Stephenson |
| 2007/0280211 | A1 | 12/2007 | Malueg |
| 2008/0114647 | A1 | 5/2008 | Singer et al. |
| 2008/0181140 | A1 | 7/2008 | Bangor |
| 2008/0200143 | A1 | 8/2008 | Qiu |
| 2008/0227493 | A1 | 9/2008 | Yamazaki |
| 2009/0005136 | A1 | 1/2009 | Hutzel et al. |
| 2009/0049220 | A1 | 2/2009 | Conti |
| 2009/0153295 | A1 | 6/2009 | Hamada |
| 2009/0181657 | A1 | 7/2009 | Ramanathan |
| 2009/0247189 | A1 | 10/2009 | Sennett |
| 2009/0309831 | A1 | 12/2009 | Sun |
| 2009/0325566 | A1 | 12/2009 | Bell |
| 2010/0005804 | A1 | 1/2010 | Chen et al. |
| 2010/0090816 | A1 | 4/2010 | Hirsch |
| 2010/0305779 | A1 | 12/2010 | Hassan |
| 2011/0009107 | A1 | 1/2011 | Guba |
| 2011/0053665 | A1 | 3/2011 | Yamashita |
| 2011/0065375 | A1 | 3/2011 | Bradley |
| 2011/0105082 | A1 | 5/2011 | Haley |
| 2011/0105097 | A1 | 5/2011 | Tadayon et al. |
| 2011/0112717 | A1 | 5/2011 | Resner |
| 2011/0112969 | A1 | 5/2011 | Zaid et al. |
| 2011/0137854 | A1 | 6/2011 | Walter |
| 2011/0151830 | A1 | 6/2011 | Blanda, Jr. et al. |
| 2011/0185390 | A1 | 7/2011 | Faenger |
| 2011/0205040 | A1 | 8/2011 | van Wiemeersch |
| 2011/0248992 | A1 | 10/2011 | Van Os |
| 2011/0269441 | A1 | 11/2011 | Silver |
| 2011/0280386 | A1 | 11/2011 | Fotta |
| 2011/0298924 | A1 | 12/2011 | Miller |
| 2012/0009896 | A1 | 1/2012 | Bandyopadhyay |
| 2012/0021770 | A1 | 1/2012 | Naqvi |
| 2012/0036220 | A1 | 2/2012 | Dare |
| 2012/0142315 | A1 | 6/2012 | Chung |
| 2012/0172012 | A1 | 7/2012 | Sumcad |
| 2012/0214470 | A1 | 8/2012 | Tadayon et al. |
| 2012/0214472 | A1 | 8/2012 | Tadayon |
| 2012/0220284 | A1 | 8/2012 | Tadayon et al. |
| 2012/0244877 | A1 | 9/2012 | Margalef |
| 2012/0276867 | A1 | 11/2012 | McNamee |
| 2013/0024812 | A1 | 1/2013 | Reeves |
| 2013/0072174 | A1 | 3/2013 | Enty et al. |
| 2013/0084847 | A1 | 4/2013 | Tibbitts et al. |
| 2013/0111020 | A1 | 5/2013 | Cohen |
| 2013/0131890 | A1 | 5/2013 | Armitage |
| 2013/0147901 | A1 | 6/2013 | Weiser |
| 2013/0163476 | A1 | 6/2013 | Meghani |
| 2013/0183924 | A1 | 7/2013 | Saigh |
| 2013/0212130 | A1 | 8/2013 | Rahnama |
| 2013/0218902 | A1 | 8/2013 | Vendrow |
| 2013/0227419 | A1 | 8/2013 | Lee |
| 2013/0281079 | A1 | 10/2013 | Vidal |
| 2013/0295901 | A1 | 11/2013 | Abramson |
| 2013/0303143 | A1 | 11/2013 | Schrader |
| 2013/0304758 | A1 | 11/2013 | Gruber |
| 2013/0324160 | A1 | 12/2013 | Sabatellil |
| 2013/0336094 | A1 | 12/2013 | Gruteser et al. |
| 2014/0007198 | A1 | 1/2014 | Durbha et al. |
| 2014/0052531 | A1 | 2/2014 | Kent et al. |
| 2014/0052681 | A1 | 2/2014 | Nitz |
| 2014/0063175 | A1 | 3/2014 | Jafry |
| 2014/0087708 | A1 | 3/2014 | Kalita |
| 2014/0111391 | A1 | 4/2014 | Nagata |
| 2014/0177818 | A1 | 6/2014 | Chang |
| 2014/0179261 | A1 | 6/2014 | Riggs |
| 2014/0187219 | A1 | 7/2014 | Yang |
| 2014/0256303 | A1 | 9/2014 | Jones |
| 2014/0280625 | A1 | 9/2014 | Byrd et al. |

(56) References Cited

U.S. PATENT DOCUMENTS

| | | |
|---|---|---|
| 2014/0282003 A1 | 9/2014 | Gruber |
| 2014/0370869 A1 | 12/2014 | Naqvi |
| 2014/0373095 A1 | 12/2014 | Yoon |
| 2015/0024804 A1 | 1/2015 | Davis |
| 2015/0062017 A1 | 3/2015 | Barabas et al. |
| 2015/0139058 A1 | 5/2015 | Xia |
| 2015/0207708 A1 | 7/2015 | Raleigh |
| 2015/0271102 A1 | 9/2015 | Antich |
| 2015/0339912 A1 | 11/2015 | Farrand |
| 2016/0021238 A1 | 1/2016 | Abramson |
| 2016/0044511 A1 | 2/2016 | Broch et al. |
| 2016/0094563 A1 | 3/2016 | Arsanjani et al. |
| 2016/0094707 A1 | 3/2016 | Stuntebeck |
| 2016/0121817 A1 | 5/2016 | Liu |
| 2016/0209018 A1 | 7/2016 | Johnson |
| 2016/0301808 A1 | 10/2016 | Choi |
| 2016/0309018 A1 | 10/2016 | Tibbitts |
| 2016/0335038 A1 | 11/2016 | Choi |
| 2016/0364665 A1 | 12/2016 | Hurst |
| 2017/0279971 A1* | 9/2017 | Raleigh ................. H04W 60/06 |
| 2017/0291611 A1 | 10/2017 | Innes |
| 2017/0302006 A1 | 10/2017 | Lavin |
| 2017/0339636 A1 | 11/2017 | Buck et al. |
| 2018/0007149 A1 | 1/2018 | Gauglitz |
| 2018/0032997 A1* | 2/2018 | Gordon ............. G06Q 30/0269 |
| 2020/0045519 A1* | 2/2020 | Raleigh .................. H04W 4/08 |
| 2022/0329579 A1 | 10/2022 | Grinman |
| 2023/0100200 A1 | 3/2023 | Evani et al. |

OTHER PUBLICATIONS

Examination Report issued in NZ 779934 (Jun. 24, 2024).
Office Action issued in CA3188150 (Jun. 4, 2024).
Canadian Office Action for application No. 3,188,150 (Jul. 25, 2025).
Extended Search Report issued in Appl. No. EP20755622.6 (Oct. 17, 2022).

* cited by examiner

200

300

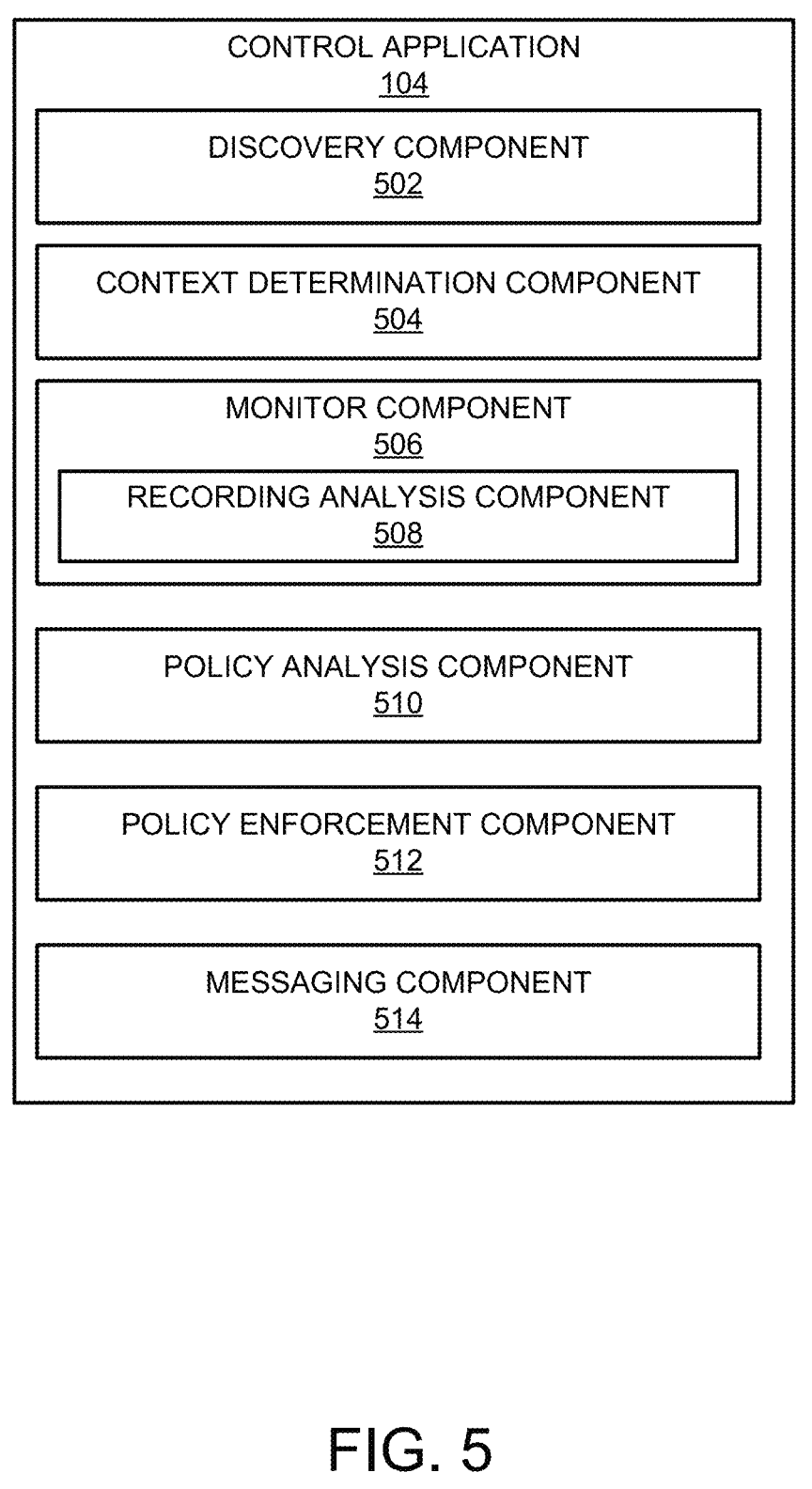

CONTROL APPLICATION
104

DISCOVERY COMPONENT
502

CONTEXT DETERMINATION COMPONENT
504

MONITOR COMPONENT
506

RECORDING ANALYSIS COMPONENT
508

POLICY ANALYSIS COMPONENT
510

POLICY ENFORCEMENT COMPONENT
512

MESSAGING COMPONENT
514

FIG. 5

Figure 7:
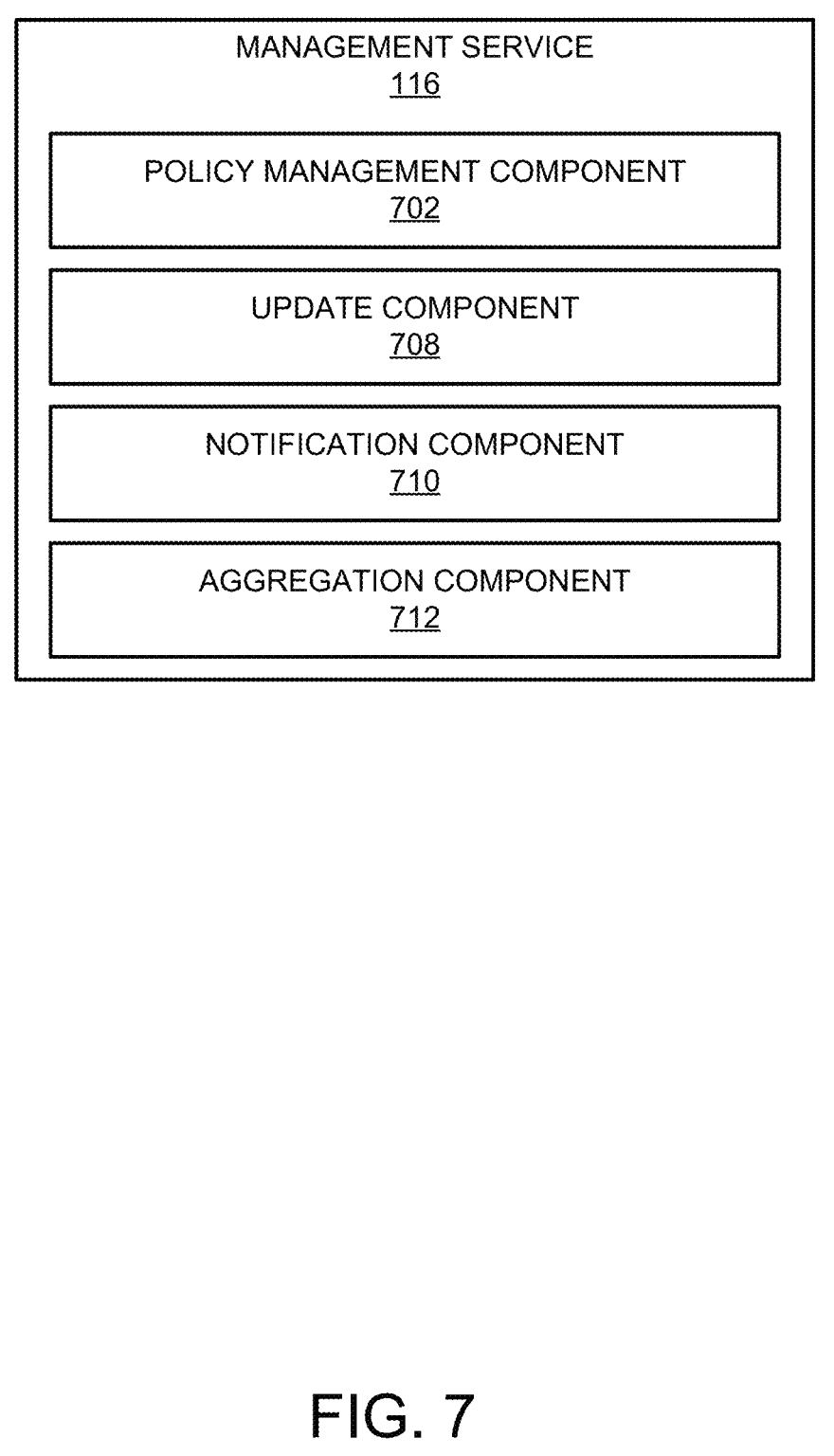

MANAGEMENT SERVICE
116

POLICY MANAGEMENT COMPONENT
702

UPDATE COMPONENT
708

NOTIFICATION COMPONENT
710

AGGREGATION COMPONENT
712

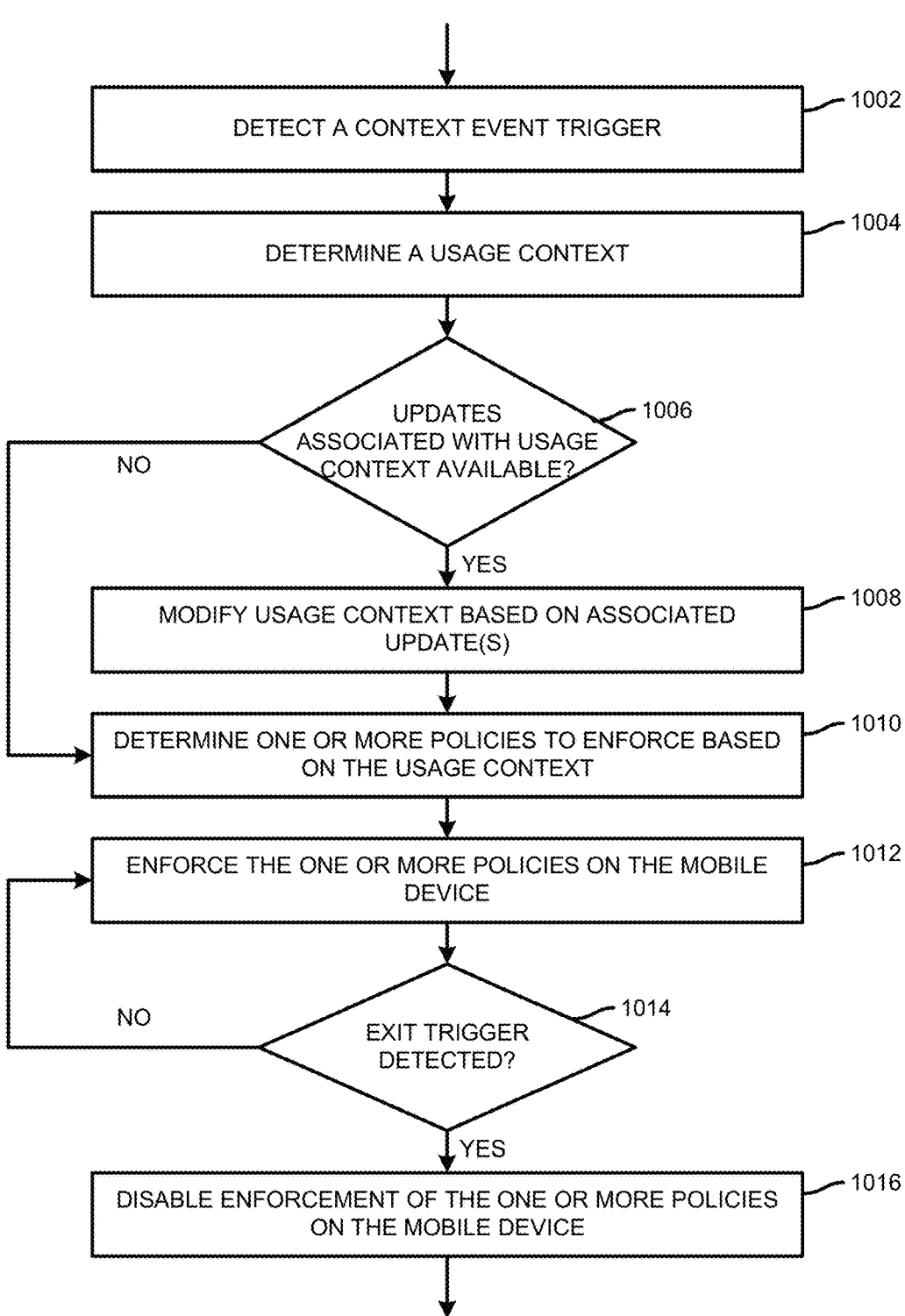

DETECT A CONTEXT EVENT TRIGGER — 1002

DETERMINE A USAGE CONTEXT — 1004

UPDATES ASSOCIATED WITH USAGE CONTEXT AVAILABLE? — 1006

NO

YES

MODIFY USAGE CONTEXT BASED ON ASSOCIATED UPDATE(S) — 1008

DETERMINE ONE OR MORE POLICIES TO ENFORCE BASED ON THE USAGE CONTEXT — 1010

ENFORCE THE ONE OR MORE POLICIES ON THE MOBILE DEVICE — 1012

NO

EXIT TRIGGER DETECTED? — 1014

YES

DISABLE ENFORCEMENT OF THE ONE OR MORE POLICIES ON THE MOBILE DEVICE — 1016

CONTEXT-AWARE MOBILE DEVICE MANAGEMENT

CROSS REFERENCE TO RELATED APPLICATIONS

The present application is a continuation of U.S. patent application Ser. No. 17/368,454, filed Jul. 6, 2021, which is a continuation-in-part of U.S. patent application Ser. No. 17/068,611, filed Oct. 12, 2020 (now U.S. Pat. No. 11,284, 334), which is a continuation of U.S. patent application Ser. No. 16/276,194, filed Feb. 14, 2019 (now U.S. Pat. No. 10,805,861), which is a continuation-in-part of U.S. patent application Ser. No. 15/191,353, filed Jun. 23, 2016 (now U.S. Pat. No. 10,268,530), which claims the benefit of priority from U.S. Provisional Patent Application Ser. No. 62/183,452, filed Jun. 23, 2015, and which is a continuation-in-part of U.S. patent application Ser. No. 14/944,178, filed Nov. 17, 2015 (now U.S. Pat. No. 9,398,421), which is a continuation of U.S. patent application Ser. No. 14/273,505, filed May 8, 2014 (now U.S. Pat. No. 9,338,605), which claims priority from U.S. Provisional Patent Application Ser. No. 61/936,152, filed Feb. 5, 2014, and claims priority from U.S. Provisional Patent Application Ser. No. 61/892,406, filed Oct. 17, 2013, and claims priority from U.S. Provisional Patent Application Ser. No. 61/821,019, filed May 8, 2013. The disclosures set forth in the referenced applications are incorporated herein by reference in their entireties.

FIELD

The present disclosure generally relates to mobile device management, and more particularly, to managing mobile device usage and functionality based on context.

BACKGROUND

Mobile devices provide convenience and enhance worker availability, connectivity, and productivity. However, one concern is that use of mobile devices can potentially impair focus of an individual on a given task, such as while operating a vehicle, operating heavy machinery, working at a job site, and so on. Consequences from such use include accidents, injuries, loss in productivity, and data loss.

Current mobile device management approaches include blocking usage of the mobile device using policy-based controls. For example, mobile device management (MDM) companies manage provisioning of corporate-owned and personally owned mobile devices, in which provisioning includes specifying basic attributes of a given mobile device (e.g., which applications are installed thereon), configuring security credentials and networks, and providing tools for tracking which mobile devices are deployed and to which individuals. However, such approaches are often rigid. For example, an MDM may provide a policy which specifies that an individual is prohibited from using texting of a mobile device, and control logic executing on the mobile device may block the individual from using text-based applications. Although a policy for blocking text messages can be effective in preventing the individual from texting, in some occasions, it may be in the interest of the individual to text, e.g., in the event of an emergency situation. Further, current approaches generally do not address usage patterns of a mobile device or an individual using the mobile device. Lack of data relating to the usage patterns may result in ineffective mobile device management. Further still, current approaches of mobile device management may affect performance of the mobile device itself.

SUMMARY

Embodiments presented herein disclose a method for managing mobile device usage based on context. The method generally includes detecting, by an application executing in the mobile device, an event to trigger context-based management of the mobile device. The method also generally includes determining a usage context associated with the mobile device. The method also generally includes identifying, as a function of the usage context, one or more policies to enforce on the mobile device and enforcing, by the application, the one or more policies on the mobile device.

Embodiments also include a computer-readable storage medium storing instructions, which, when executed, perform an operation for managing mobile device usage based on context. The operation itself includes detecting, by an application executing in the mobile device, an event to trigger context-based management of the mobile device. The operation also generally includes determining a usage context associated with the mobile device. The operation also generally includes identifying, as a function of the usage context, one or more policies to enforce on the mobile device and enforcing, by the application, the one or more policies on the mobile device.

Yet another embodiment discloses a system having a processor and a memory storing program code, which, when executed on the processor, performs an operation for managing mobile device usage based on context. The operation itself includes detecting, by an application executing in the mobile device, an event to trigger context-based management of the mobile device. The operation also generally includes determining a usage context associated with the mobile device. The operation also generally includes identifying, as a function of the usage context, one or more policies to enforce on the mobile device and enforcing, by the application, the one or more policies on the mobile device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 5 is a simplified block diagram of at least one embodiment of the control application described relative to FIG. 1;

FIG. 7 is a simplified block diagram of at least one embodiment of the management service described relative to FIG. 1;

FIG. 10 is a simplified flow diagram of at least one embodiment of a method for managing a mobile device based on a usage context;

DETAILED DESCRIPTION

Figure 1:
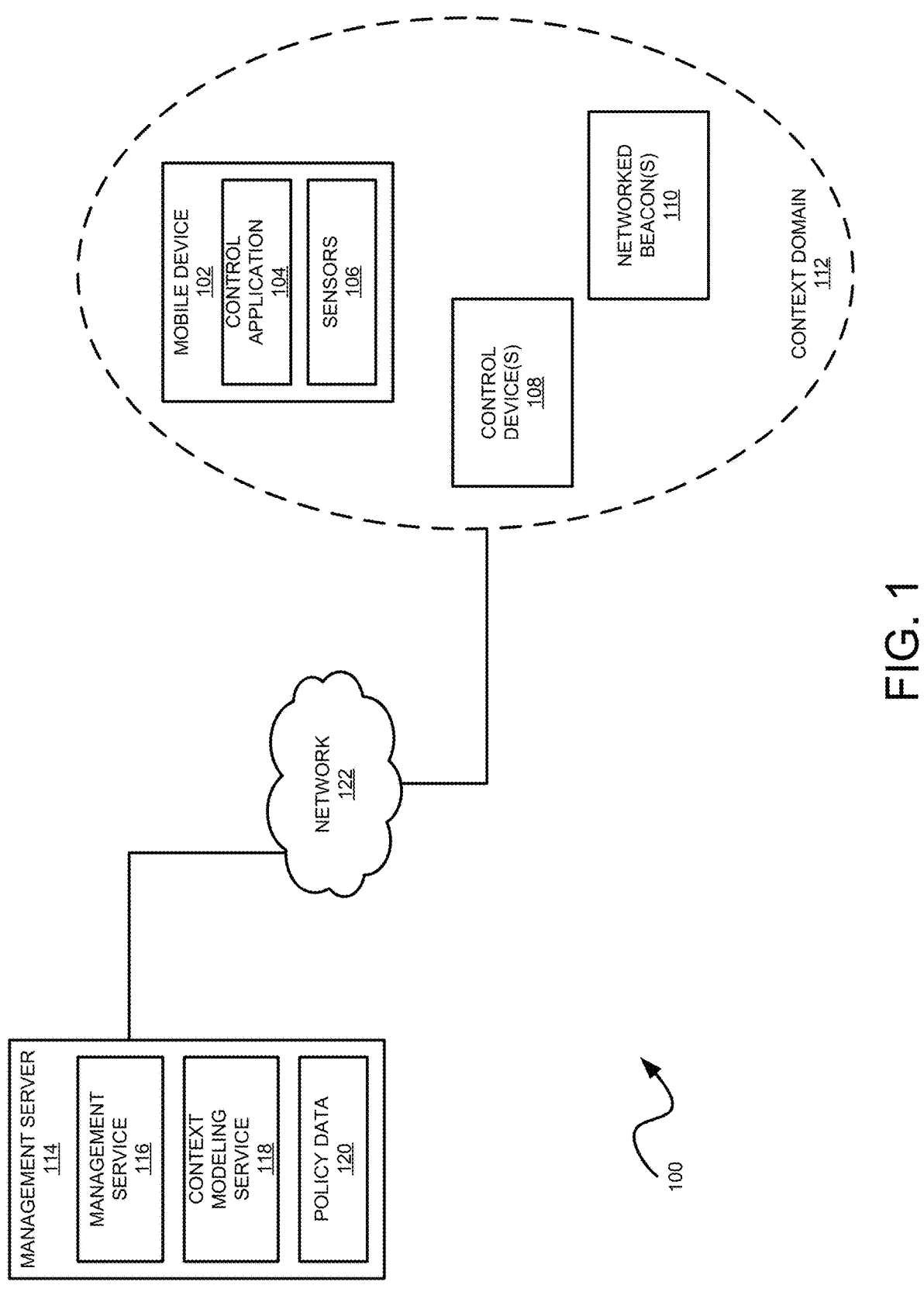
FIG. 1 is a simplified block diagram of at least one embodiment of a computing environment in which a mobile device is managed as a function of context-based policies.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As used herein, the term "vehicle" is intended to include automobiles, trucks, motorcycles, buses, planes, helicopters, blimps, balloons, gliders, boats, ferries, trains, trams, heavy equipment or machinery, and any type of apparatus, equipment, or other machine that is driven, operated, or controlled by a user (i.e., "driver") and that is susceptible to accident or injury to self or others if the driver is careless or not devoting full attention to operation of the vehicle.

As used herein, the term "mobile device" is intended to include and encompass, but not be limited to, any type of hand-held, portable, mountable, wearable, or similar computing or communication device that is usable within a vehicle, such as but not limited to cell phones, mobile phones, smart phones, push-to-talk devices, personal digital assistants (PDAs), text or email dedicated devices, general computers, laptops, electronic maps or other GPS (or GNSS) location devices, vehicle dashboard screens, vehicle infotainment systems, electronic reading devices, multimedia equipment, data tablets, electronic eyewear, wearable sensory or sensory-enhancement equipment, wearable devices in general, and any other computing or communication device that would or could be used by or accessible to the driver of a vehicle while it is moving or otherwise in operation and that could contribute to driver inattentiveness or otherwise interfere with the driver's ability to focus full attention on driving or operating the vehicle because of the talking, texting, surfing, browsing, viewing, or other interactive functionality of such device.

As used herein, the term "context" may include an environment, setting, or specific circumstances that surround an event, a sequence of events, or a collection of events. Context may include a location or relative location using technology such as GPS, GNSS, cell tower triangulation, BLUETOOTH beacons, WIFI, dead reckoning, image recognition, audio signatures, atmospheric pressure values, and other sensors known by those skilled in the art for understanding location or relative location. Context can also be identified by a third party through system integration in which an outside system is given the authority to determine and control the device context and policy to enforce. Context may also include attributes about an individual using a mobile device, such as age, job function, safety history, risk assessment, certification, security clearance, activity level, gait, heart rate, breathing rate, position (e.g. crouched, sitting, standing), exposure to hazardous chemicals, presence of personal protective equipment (PPE), presence of high sound levels, state of personal lighting devices. Context may also include current activity of the individual, such as swimming, diving, suspended by a rope, walking, driving, biking, loading/unloading, or operating machinery. Context may also include attributes about the environment, such as time of day, lighting, current weather conditions, presence of hazardous chemicals or substances, high sound levels, presence of water, nearby active equipment, attributes of people, places, or things nearby, and sudden hazards or emergency situations. Context may also include attributes about the equipment such as type of equipment, on/off status, movement status, and relative risk related to the equipment's use and function.

Embodiments presented herein disclose techniques for managing mobile device usage. More specifically, the techniques provide dynamically enabling and restricting usage patterns based on a usage context, e.g., to reduce physical and digital risk to a user (e.g., an individual, organization, and the like). In an embodiment, a mobile device includes an application installed thereon that determines a context in which an individual is currently using the mobile device. For example, the mobile device may evaluate characteristics associated with the mobile device (e.g., applications currently executing, battery life, hardware components currently active, etc.) and external characteristics (e.g., time of day, location, and characteristics associated with the individual). The application may identify, based on the evaluation, one or more usage policies to apply to the mobile device. The policies may, for example, indicate one or more functions of the mobile device to prohibit the individual from accessing, and the application may use blocking techniques (such as those described herein) to prevent the individual from accessing such functions. Advantageously, managing mobile device usage based on a context associated with the individual provides a more flexible approach to enabling or restricting access to the mobile device. Further, the techniques described herein may offload some of the context determination and policy enforcement logic to other external devices and locations, such as a remote management server (e.g., a server hosted on a cloud network) or a networked device (e.g., a networked beacon). Doing so allows for improved performance of the application executing on the mobile device, e.g., by processing fewer data to determine a usage context, resources for the application are available to process other tasks used to manage mobile device usage.

Referring now to FIG. 1, a computing environment 100 in which a mobile device is managed as a function of context-based policies is shown. Illustratively, the computing environment 100 includes a mobile device 102, one or more control devices 108, one or more networked beacons 110, and a management server 114. Each of the mobile device 102, control devices 108, and networked beacons 110 may be connected with a network 122 (e.g., a local area network, the Internet, etc.). The management server 114 may be embodied as any physical computer (e.g., a desktop computer, workstation, laptop computer, and the like), a virtual server instance executing on the cloud, and the like, that is capable of performing the functions described herein, such as defining and managing network policies, generating one or more machine learning models for determining usage context, generating one or more machine learning models for determining user behavior and usage patterns, etc. The networked beacons 110 may be embodied as any type of networking device capable of broadcasting signals (e.g., radio, audio, and light signals) to devices such as the mobile device 102. The environment 100 represents a contextually aware communication platform. The platform may be initiated by a platform administrator, by an individual worker for in-field communication within a certain region, driven by a broadcast system for emergency weather conditions or emergency situations (e.g., active shooter or terror situations).

The mobile device 102 may be embodied as a smartphone, tablet computer, laptop computer, wearable device, or any kind of device capable of carrying out the functions described herein, such as detecting an event triggering management of access to features thereon, determining a usage context, evaluating one or more policies associated with the usage context, and enforcing the one or more policies. As shown, the mobile device 102 includes a control application 104 and one or more sensors 106. The control application 104 may be embodied as any software or circuitry capable of performing the functions described herein. For example, the control application 104 may be a software application executing on one or more processors of the mobile device 102. The control application 104 is configured to, based on one or more user policies, enable or disable features of the mobile device 102 and present notifications to a display of the mobile device 102. The mobile device 102 may be communicatively coupled with a control device 108. The illustrative control device 108 may be embodied as any hardware, software, combination thereof, to determine, based on a usage context of the device, whether to enforce one or more usage policies on the mobile device 102. The control device 108 is also configured to enforce such policies on the mobile device 102. The control device 108 may perform various techniques to do so. For example, the control device 108 may establish a wireless connection with the mobile device 102 and transmit signals to the mobile device 102 that are indicative of actions to be performed by the mobile device 102 (e.g., keypresses that prevent an individual from interacting with one or more functions of the mobile device 102). The sensors 106 may be embodied as any hardware or software-based sensor components of the mobile device 102 used to capture data associated with the mobile device 102 (e.g., positioning data, audio data, video data, etc.) or the individual using the mobile device 102 (e.g., biometric information such as heart rate, movement, fingerprint data, etc.).

The illustrative networked beacons 110 transfer, via signal frequencies (e.g., using techniques such as BLUETOOTH Low Energy (BLE) protocols, WIFI, near field communication (NFC), THREAD, GAZELLE, etc.), information to the mobile device 102, control devices 108, and management server 114. The networked beacons 110, in operation, may broadcast data over advertising channels. Particularly, the networked beacons 110 may encode data in advertising packets and broadcast the packets over a range, e.g., specified in a configuration as physically being associated with a given context domain 112. Each networked beacon 110 may receive connections from a number of mobile devices 102, as well as servers and other networked beacons 110. In doing so, the networked beacons 110 may communicate with these devices using, e.g., device-specific application programming interfaces (APIs).

In an embodiment, the control devices 108, networked beacons 110, servers, and any other device interacting with the environment 100 may establish a context domain 112. As further described herein, a context domain 112 defines a context in which usage of the mobile device 102 is subject to one or more policies. For example, the context domain 112 may correspond to a location (e.g., a work campus, school campus, building, shopping center) an enclosed or partially-enclosed space (e.g., a vehicle, heavy machinery, etc.), or a combination thereof. Communications within a context domain 112 may use a variety of techniques, such as WIFI, BLUETOOTH, near field communication (NFC), and so on. Further, a control device 108 or a networked beacon 110 may project to the mobile device 102 an indication that the mobile device 102 is within the context domain 112. For example, a networked beacon 110 may be configured at the context domain 112 and broadcast signals within a specified radius indicative of the context domain 112.

Figure 2:
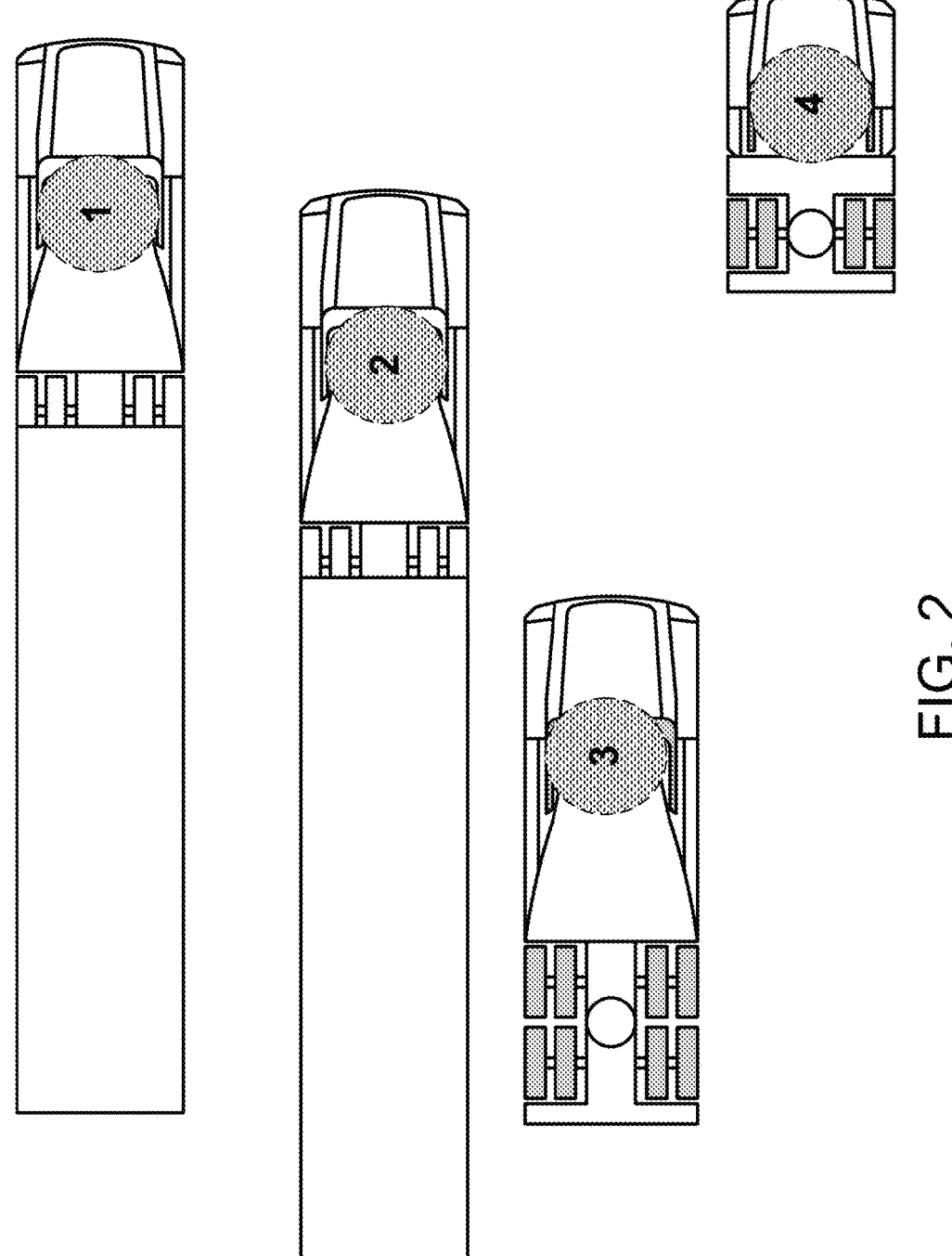
FIG. 2 is a simplified conceptual diagram of an example of context domains in which mobile device activity may be controlled based on a usage context.
Figure 3:
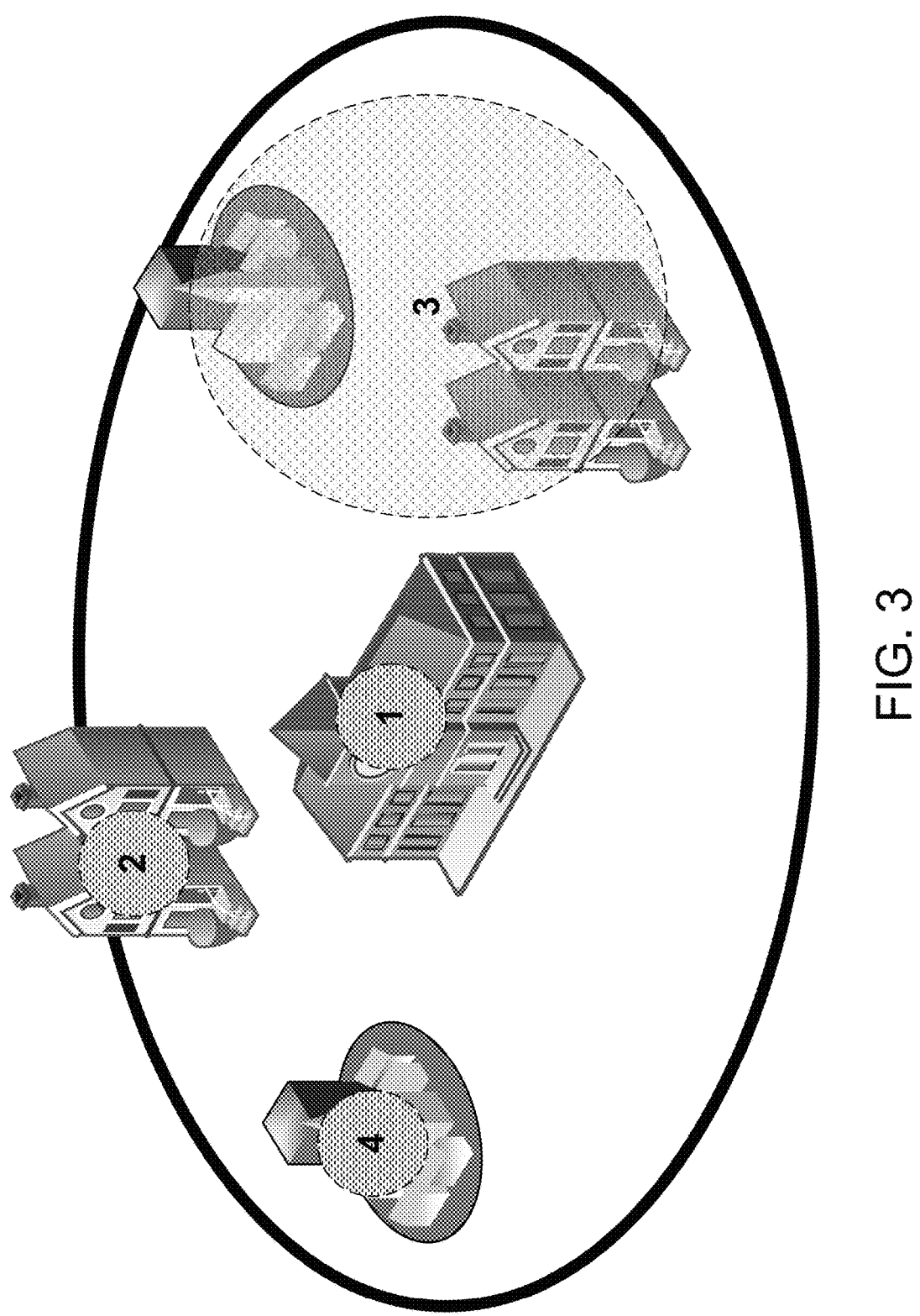
FIG. 3 is a simplified conceptual diagram of another example of context domains in which mobile device activity may be controlled based on a usage context.

In configuring a context domain 112, the networked beacons 110 can be classified as a public beacon or a private beacon. A public beacon may generally be accessible by any mobile device 102. A private beacon may be restricted to a subset of users, such as that of an organization. For example, private beacon may be installed inside a vehicle of the organization. Any mobile devices 102 of users associated with a specified subset may be authorized to interact with the private beacon. For example, referring now to FIG. 2, an example 200 of one or more context domains 112 is shown. Illustratively, FIG. 2 depicts a fleet of four vehicles. In this example 200, assume that the vehicle fleet belongs to an organization that desires to manage mobile devices 102 of users operating each vehicle. The organization may deploy a private beacon in each of the vehicle, such as on a dashboard of the vehicle. Each private beacon may correspond to a given context domain 112, as enumerated by the 1, 2, 3, and 4 in each respective vehicle. The private beacon may project a context domain 112 that allows a control application 104 executing on a mobile device 102 within the vehicle to identify usage policies associated with that context domain 112. One example may relate to vehicle infotainment systems within the vehicle. A policy may specify that access to such systems should be controlled (or otherwise prevented) based on the context in which the user is associated, and unapproved usage may include functions such as phone calls, text messaging, navigation, music, and the like. The private beacon may also restrict access by a mobile device 102 to a subset of users (e.g., the operator of the vehicle). As a result, users of that subset may be subject to context-based usage policies. Referring now to FIG. 3, an example 300 for one or more context domains 112 is shown. In this example 300, public beacons may be deployed in various locations of a campus (e.g., a work campus, school campus, etc.). Each public beacon may allow any mobile device 102 access and project a context domain 112 to the mobile device 102. In the example 300, the context domains 112 are enumerated 1, 2, 3, and 4 across different locations. For example, the context domains 112 labeled 1, 2, and 4 are each associated with an individual building. The context domain 112 labeled 3 is associated with two distinct buildings. Each of the context domains 112 may be associated with different usage policies. For example, in the context domain 112 labeled 1, a policy may specify that web access by a mobile device 102 is permitted, but certain sites are restricted, while in the context domain 112 labeled 3, an associated policy may specify instant messaging and web access are prohibited in some cases while allowed in others. For instance, the policy may restrict the transmission of workplace photos captured by the mobile device 102 from users of a certain level unless the photos are sent to a user of a higher level (e.g., transmission of photos representing a workplace hazard in to a manager, in the event the context domain 112 is in a high risk area). The control application 104 of a given mobile device 102 may, upon entering a given context domain 112, apply the associated policy. A management service (e.g., management service 116) may configure the policies and transmit the policies to mobile devices 102 entering a given context domain 112 (and/or send the policies to an associated networked beacon 110 for distribution to mobile devices 102 entering the respective context domain 112). In other embodiments, the control application 104 of a given mobile device 102 may configure such policies. Further, in locations in which public beacons are configured, live tracking by the networked beacon 110 may be performed. For example, users with a control application 104 could be tracked, located, and identified by a given organization (e.g., within a store, within a complex, within a building, etc.). Users without the control application 104 (or other supported application) may be tracked and located based on context signals broadcast from the mobile devices in possession. Under this example, heat mapping may be applied (e.g., to determine configurations for floor layouts and product placement) and cities may track foot traffic during events and in public areas.

In addition, the networked beacons 110 may be configured in a variety of manners. For example, the networked beacon 110 may be configured for (i) over the road vehicles, (ii) for heavy machinery, (iii) for on-premise sites (e.g., a static zone such as a work zone, school zone, home zone, safe zone, etc.), (iv) for a given radio frequency (RF) range, and the like. As another example, a networked beacon 110 may support auto-configuration (e.g., by other networked beacons 110 within network proximity thereof).

Of course, the context domain 112 may be composed of a network of mobile devices 102, such that each mobile device 102 carries out the functionality of a networked beacon 110 to other mobile devices 102. Further, a mobile device 102 may carry out the functionality of a networked beacon 110 in the event that a networked beacon 110 is currently at the maximum number of supported connections. In addition, the mobile device 102, networked beacon 110, management server 114, and other devices within the environment 100 may offload or share computational resources with one another to improve or share a determination of usage context.

Further, some context domains 112 may enable policies for mobile devices 102 executing the control application 104. In some cases, a mobile device that does not include the control application 104 (or otherwise unrecognized by networked beacons 110 or management servers 114) may enter a given context domain 112. To detect such devices, a networked beacon 110 may detect such mobile devices by listening for signals transmitted by those devices. In an embodiment, the networked beacon 110 may scan for identifiers associated with such devices in the signal transmissions (e.g., a media access control (MAC) address, International Mobile Equipment Identity (IMEI) identifier, or some other uniquely identifiable signature associated with the device, such as a power spectral density, timing, etc.). The networked beacon 110 may also transmit a signal to which such a mobile device may respond. For instance, the networked beacon 110 may advertise BLE and wait for a scan request from the device. In another instance, the networked beacon 110 may advertise as an LTE picocell. Further, in cases in which the networked beacon 110 is unable to ascertain a unique identifier for the mobile device, the networked beacon 110 may use a signal strength as an indicator of identity. For example, in some cases the mobile device may change its BLE MAC address. In such a case, the networked beacon 110 may observe transmissions from the same MAC address with a given range of RSSI for a specified period and then observe a new MAC address consistently in within the same RSSI range. Doing so allows the networked beacon 110 to determine that the same mobile device changed its MAC address. As another example method, the networked beacon 110 may monitor transmission power of a mobile device to determine whether the power matches expected variations based on proximity between devices and a base station as a vehicle moves. The methods described herein may be enhanced by awareness of other contextual aspects, such as other nearby mobile devices, whether the mobile device is within a vehicle or a building, whether a given vehicle is in motion, a proximity to a cell tower, and the like.

Turning back to FIG. 1, in an embodiment, each of the mobile device 102, control devices 108, and networked beacons 110 send data to and receive data from the management server 114. Generally, the combination of mobile device(s) 102, control devices 108, networked beacons 110, and management server 114 forms a contextual mesh used to establish a context environment. Illustratively, the management server 114 includes a management service 116, a context modeling service 118, and policy data 120. The management service 116 may be embodied as any hardware, software, or combination thereof that defines policy data 120 for individuals or groups of individuals relative to usage of a mobile device (e.g., the mobile device 102). The management service 116 may distribute the policy data 120, e.g., to devices within the context domain 112. For example, the management service 116 may transmit the policy data 120 to a control application 104 in a given mobile device 102. Doing so may trigger the control application 104 to configure the mobile device 102 and transmit messages to the control devices 108 and networked beacons 110 relating to the policy data 120. As another example, the management service 116 may send the policy data 120 to the networked beacons 110. In such a case, the networked beacon 110 may provision the control application 104 of a connected mobile device 102 with the policy data 120.

Further, the management service 116 may aggregate data received from multiple mobile devices 102, control devices 108, and networked beacons 110 across multiple context domains 112. The management service 116 may then use the aggregated data in a variety of applications. For example, the management service 116 may generate a visual representation based on overlapping context domains 112. Context domains 112 may overlap in the event where multiple beacons 110 are situated within proximity of one another. The visualization may be a two- or three-dimensional graphical representation that can, for example, map a position of mobile device users within a given context domain 112. Further, a networked beacon 110 may determine relative locations of mobile devices 102 connected to the beacon 110, e.g., using signal strength (such as RSSI). Another manner is to scan for phones and report the locations to a master database to map the area and determine movements of phones through the area. Through multiple beacons 110 reporting the same phones, the management service 116 may triangulate the positions of the mobile devices 102 in the area. An alternative approach includes requesting a mobile device 102 to report to the master database all of the networked beacons 110 that have been discovered by the mobile device 102. Doing so may allow an administrator to identify a location of a given individual or mobile device 102. The management service 116 may provide a notification service that can transmit messages to a respective mobile device 102. Given user locations, an administrator may strategically target messages to a given user (or group of users) or deploy resources to a given area based on a concentration of users (e.g., in emergency situations). In addition, a networked beacon 110 may be configured with visual and audio elements (e.g., configured into audio I/O and video I/O circuitry therein) to incorporate alerts and alarm systems for particular zones based on safety or emergency communication as well as indicating safe zones.

The context modeling service 118 may be embodied as any type of hardware or software on the management server 114 that evaluates the obtained and aggregated data of the multiple devices and generates one or more machine learning models. The generated machine learning models may include user behavioral models, context usage models, and the like. For example, the user behavioral models may be generated from data obtained from the sensors 106 (e.g., screen recorder, biometric sensors, health sensors, camera, audio sensors, and the like) in a variety of mobile devices 102. As further described herein, the context modeling service 118 may identify patterns of behavioral or context activity relative to other characteristics, such as time of day, external environment (e.g., weather conditions, traffic conditions, stock market conditions, news, social media headlines, financial reporting by a user or organization, and so on), and connected devices (e.g., the control devices 108 and the networked beacons 110). The generated models may thereafter be used in determining context using less data and processing by the control application 104. Further, the models may also be used in other applications, such as in compliance reporting, anomaly detection, data compression, risk profiling.

Note, although FIG. 1 depicts the management server 114 as being separate from the context domain 112, the context domain 112 may be configured to include the management server 114 (and possibly multiple management servers 114). For example, in such a case, the management server 114 may be a local server inside a building of an organization. Further, although the management service 116, context modeling service 118, and policy data 120 are depicted as being hosted by the management server 114, each of these components may be hosted on separate computer devices. Further, some of the logic of the management service 116 and the context modeling service 118 may be carried out by other components in the environment 100. For example, the control application 104 may distribute policy data 120 to surrounding mobile devices 102 in the context domain 112, which allows the management server 114 to use resources towards other functions. As another example, the networked beacons 110 may aggregate data collected for a given context domain 112 and generate machine learning models based on the data collected for that context domain 112. Further, as previously stated, the components of FIG. 1 may establish a contextual mesh. In such a mesh, each component (e.g., a mobile device 102, the management server 114, networked beacon 110, etc.) may perform functions described relative to other components herein. For example, the control application 104 may carry out data aggregation and modeling functions, and the networked beacons 110 may process sensor data collected from mobile devices 102. Further, within the mesh, devices such as the networked beacons 110 may connect to one another to provide additional context.

In an embodiment, the context domain 112 may be implemented via a virtual private network (VPN). The VPN allows for a firewall or filter to be placed on network traffic to mobile devices. This ability to restrict communication entering the network of the phone allows for a relatively more granular control and monitoring for mobile device usage and provides contextual management of other resources in the environment (e.g., in automating lockdown of specific areas, shutdown of devices, etc.). A VPN (e.g. of an organization) may be used to define the context domain 112 and set given policies for enabling or restricting usage of a given mobile device 102. Using a VPN, an organization may allow or restrict access to certain functions of a mobile device 102 while a corresponding employee is on a job site, in a company vehicle, performing work-related tasks, and the like. However, the organization might not want to provide full access to certain functions, such as some websites, social media, personal e-mail, and instant messaging functions. Using context-based mobile device management, the organization may classify context domains and flexibly enforce policies to avoid blanket restrictions on such functions. For example, using the VPN, the organization may allow website usage but limit such usage to an internal website or a list of approved websites. As another example, the organization may limit usage of specific messaging applications (and thereby reduce distraction). More particularly, the organization may restrict communications to the functions needed by an individual to accomplish work tasks. Given these restrictions, an organization may protect itself from liability by allowing needed functionality while preventing high-risk distractions regardless of what context domain of a job site, workplace, and the like, in which a given user is operating. As another advantage, a VPN may allow more effective control management for various types of mobile devices, such as wearable devices. Wearable devices (e.g., smart watches) present various issues in control management, such as a short life cycle for applications executing on the device, limited resources for high power operations, and overall lack of general functionality for control. However, by controlling information allowed to reach the watch via the VPN, the VPN can effectively prevent unauthorized usage of the mobile device by controlling the network traffic that is allowed on the wearable device. For example, a configuration for the VPN can provide mappings to prohibited functionality. For example, an organization may configure the VPN to blacklist such functionalities and whitelist others. The VPN may block blacklisted functionalities in operation to prevent usage on the wearable device.

Figure 4:
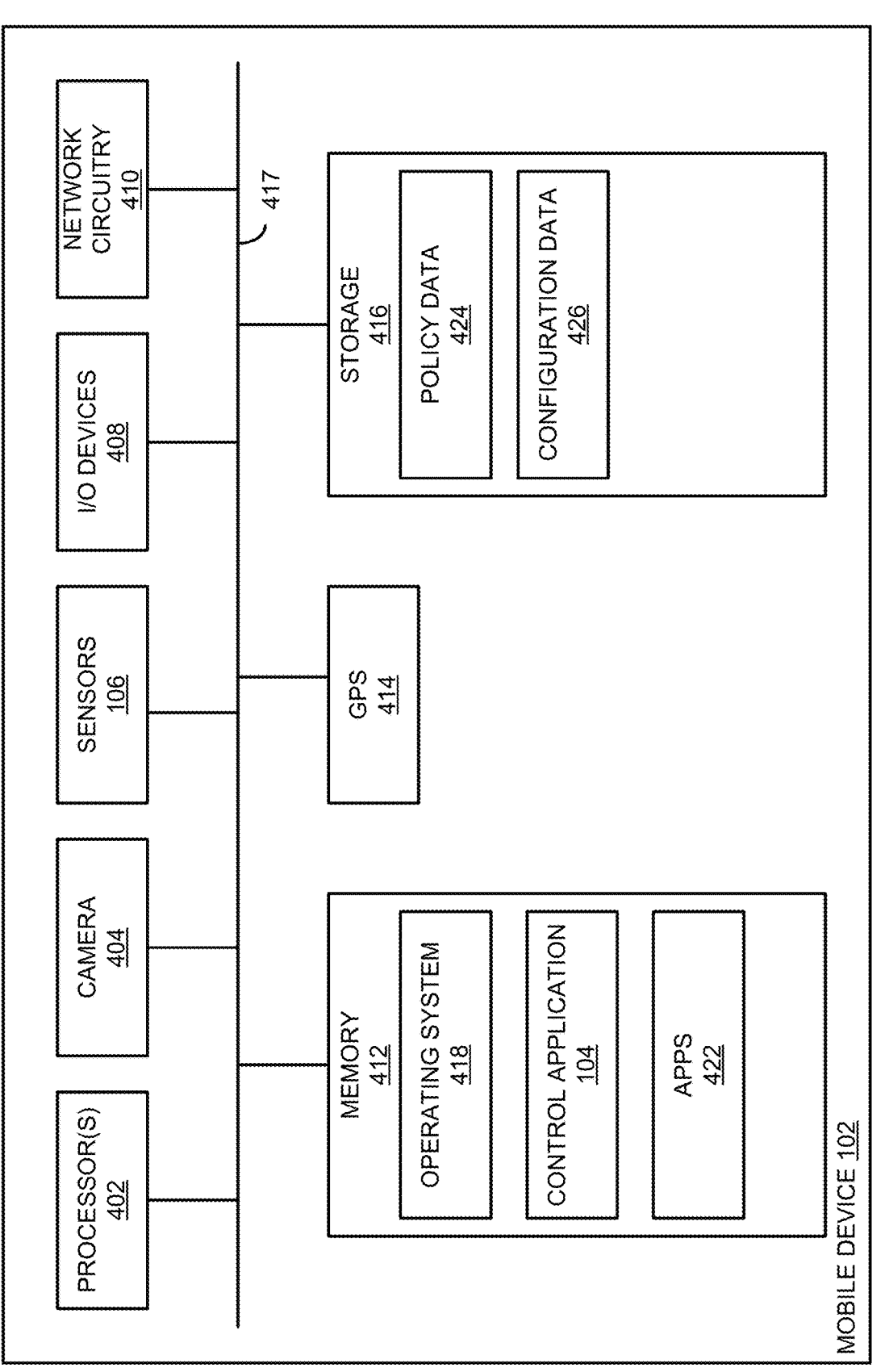
FIG. 4 is a simplified block diagram of at least one embodiment of the mobile device described relative to FIG. 1.

Referring now to FIG. 4, the mobile device 102 includes, without limitation, one or more processors 402, a camera 404, the sensors 106, input/output (I/O) devices 408, a network circuitry 410, a memory 412, a global positioning system (GPS) 414, and a storage 416, each of which is interconnected via an interconnect bus 417. Note, one of skill in the art will recognize that these components are described for example and that an actual mobile device 102 may include additional components not shown. Likewise, an actual mobile device 102 may omit one or more of the components described relative to FIG. 4.

The processors 402 may be embodied as one or more processors, each processor being a type capable of performing the functions described herein. For example, the processor 402 may be embodied as a single or multi-core processor(s), a microcontroller, or other processor or processing/controlling circuit. In some embodiments, the processor 402 may be embodied as, include, or be coupled to a field-programmable gate array (FPGA), an application-specific integrated circuit (ASIC), reconfigurable hardware or hardware circuitry, or other specialized hardware to perform the functions described herein.

The camera 404 may incorporate a rear-facing camera and a front-facing camera for capturing image and video data. The camera 404 may be controlled by software executing in the memory 1008. The sensors 106 include any hardware or software sensors for monitoring and obtaining usage, interaction, and activity with regard to the mobile device 102. For example, the sensors 106 may include biometric sensors (e.g., for monitoring heart rate, breathing, etc.), motion sensors, audio and video sensors, facial sensors, system usage sensors, and so on. The I/O devices 408 may be embodied as any type of input/output device connected with or provided as a component to the mobile device 102. Example I/O devices 408 include a keyboard, mouse, additional sensors, diagnostic equipment, speakers, interface devices, and other types of peripherals.

The network circuitry 410 may be embodied as any communication circuit, device, or combination thereof, capable of enabling communications over a network between the mobile device 102 and other devices (e.g., the management server 114, networked beacons 110, other mobile devices 102, and so on). The network circuitry 410 may be configured to use any one or more communication technologies (e.g., wired or wireless communications) and associated protocols (e.g., Ethernet, BLUETOOTH, WIFI, etc.) to perform such communication. The GPS 414 may be embodied as any hardware or circuitry to use positioning techniques (e.g., GPS, GLONASS, BEIDOU, GALILEO, or any Global Navigation Satellite System (GNSS)) to identify a location of the mobile device 102.

The memory 412 may be embodied as any type of volatile (e.g., dynamic random access memory, etc.) or non-volatile memory (e.g., Electrically Erasable Programmable Read-Only Memory (EEPROM)) or data storage capable of performing the functions described herein. Volatile memory may be a storage medium that requires power to maintain the state of data stored by the medium. Examples of volatile memory include various types of random access memory (RAM), such as DRAM or static random access memory (SRAM). An example of a type of DRAM that may be used in a memory module is synchronous dynamic random access memory (SDRAM). The storage 416 may be embodied as any type of device(s) configured for short-term or long-term storage of data. Examples include memory devices and circuits, memory cards, hard disk drives (HDDs), solid-state drives (SSDs), and so on. The storage 416 may include a system partition that stores data and firmware code for the storage 416.

As stated, each of the components of the mobile device 102 may be connected via the interconnect bus 417, which may be embodied as circuitry and/or components to carry out I/O operations between components of the mobile device 102. The interconnect bus 417 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to carry out the input/output operations.

As shown, the memory 412 includes an operating system 418, the control application 104, and one or more applications 422. The storage 416 includes policy data 424 and configuration data 426. The operating system 418 may be embodied as software that manages hardware and software resources of the mobile device 102, e.g., by providing services for allowing interfacing between different resources, memory allocation, I/O functionality, and so on. The control application 104 may be embodied as any software used to manage access to functions of the mobile device 102 based on the policy data 424 identified as a function of a usage context. The applications 422 may be embodied as any applications native to the operating system 418 and/or third-party applications (e.g., "apps") executable by the processor 402. The control application 104 may provide a software development kit (SDK) that developers of apps 422 may use to enable bidirectional communication between the control application 104 and the apps 422. For example, the control application 104 may provide a communication interface that apps 422 may use to provide further information for the control application 104 to use in determining context. For instance, the apps may use the SDK to establish communications for alerting the control application 104 as to the status of the application (e.g., whether the app is currently in the foreground display of the mobile device 102). Further, the apps 422 may customize functionality and user experience based on the determined context. The SDK allows the app 422 to communicate context relating to the event to the control application 104, e.g., to enact an adjustment to the policy currently being enforced.

The policy data 424 may correspond to one or more policies obtained from a networked beacon 110 or the management server 114 in response to determining a usage context. Further, the policy data 424 may be provided with the control application 104 (e.g., as a default customizable policy). The policy data 424 may be embodied in various formats. One example may include a customized format proprietary to the controller application 104. Other examples include a text file, markup language file (e.g., an eXtensible Markup Language (XML) file), a comma separated values (CSV) file, and so on. The configuration data 426 may correspond to configuration settings for the control application 104, such as user credentials for the management service 116 and networked beacons 110, user parameters (e.g., identifying information associated with the user), a list of preferred networked beacons 110, and the like. The configuration data 426 may be embodied in various formats, such as a text file, markup language file (e.g., an eXtensible Markup Language (XML) file), a comma separated values (CSV) file, and so on.

Referring now to FIG. 5, the control application 104 includes a discovery component 502, a context determination component 504, a monitor component 506, a policy analysis component 510, a policy enforcement component 512, and a messaging component 514.

The discovery component 502 is configured to detect a networked beacon 110 within a given proximity. For example, to do so, the discovery component 502 may be configured to receive network signals broadcast by the networked beacon 110. As another example, the discovery component 502 may broadcast signals detectable by a networked beacon 110. Upon detection of a networked beacon 110, the discovery component 502 may establish a connection with the networked beacon 110 (e.g., via various wireless technologies, such as BLUETOOTH or WIFI). The discovery component 502 may detect a control device 108 using similar techniques.

The context determination component 504 is configured to determine a usage context associated with the mobile device 102 and to retrieve one or more policies based on the usage context. For example, the context determination component 504 may identify a context based on a connected control device 108 or a networked beacon 110. For example, the context may be predefined by the networked beacon 110. As another example, the context determination component 504 may determine the context based on information provided by the networked beacon 110, characteristics associated with the mobile device 102, external characteristics associated with the mobile device 102 and/or user, etc. As yet another example, the context determination component 504 may determine whether the mobile device 102 is connected to a wireless network (e.g., a WIFI network) for a given location. If so determined, the context determination component 504 may recognize some level of context associated with the given location. The context determination component 504 may also register the mobile device 102 as present at the given location. Note, in some cases, the wireless network may prompt the mobile device 102 to connect and open a webpage to register and click a link to install any additional application (or the control application 104 itself). Once determined, the context determination component 504 may transmit an indication of the context to the networked beacon 110, management service 116, control device 108, etc. In response, the context determination component 504 may receive an identification of one or more policies to enforce on the mobile device 102. The control application 104 may load the policies locally. As yet another example, the context determination component 504 may also determine context based on a user (or administrator) interaction between other components of the environment 100 (e.g., networked beacons 110, the management server 114, control devices 108, and the like).

The monitor component 506 may observe usage and activity associated with the mobile device 102. For example, the monitor component 506 may log user interaction as well as actions performed by the mobile device (e.g., screen changes, transitions, incoming/outgoing phone calls, local notifications to the user such as text messages, social media notifications, etc.). As another example, the monitor component 506 includes a recording analysis component 508. The recording analysis component 508 may invoke a recording function of the mobile device 102 (e.g., via an application programming interface (API) provided by the mobile device 102) to record the display of the mobile device 102. The recording analysis component 508 may capture, via the recording function, a stream of images indicative of the screen recording. The recording analysis component 508 may post-process the stream of images to determine an application being displayed on the screen. Post-processing techniques may include machine learning, exact image matching, fuzzy image matching, pixel matching, image-to-text conversion, evaluation of screen transitions by the user or the application, and the like. The recording analysis component 508 may package the post-processing data for use by other components of the control application 104.

The policy analysis component 510 is configured to evaluate the monitored activity and usage relative to the identified policies to determine whether the monitored activity and usage conform to the policies. The policy enforcement component 512 is configured to apply the policies in response to a determination of the monitored data conforming or violating the policies. For instance, a given policy may specify one or more actions to perform in response to determining that the user is attempting to access one or more functions of the mobile device 102 prohibited by a given policy. Examples may include access to functions such as phone call features, text messaging features, navigation features, music application features, and the like. The policy analysis component 510 and policy enforcement component 512 may use a variety of policy enforcement techniques to carry out application of a policy. For example, the control application 104 may establish a wireless connection with a control device 108 in network proximity. The control device 108 may send, over the wireless connection, human interface device (HID) signals (e.g., keypresses of a home button) to cause the mobile device 102 to prevent access to the attempted functions. As another example, the policy enforcement component 512 may interface with digital identification cards as enforcement tools. The digital identification card may provide a unique identifier associated with a user of the mobile device 102 by using some digital system (e.g., the mobile device 102, another mobile device, laptop, or digital screen). The digital identification card may provide credentials used to authenticate the user (e.g., a clearance level) and be used in various situations. For example, using the digital identification card, the control application 104 may automatically retrieve time and location data, for use in situations such as entering a given context domain 112 (e.g., a construction site, a VPN network with a certain level of content blocked based on security level, school zone, work zone, and the like). Another implementation may use existing access controls to log digital identification cards used, user credentials, or other methods of gaining access to systems. The logs from these systems can then be compared to which mobile devices have reported. In the event of a discrepancy, an alert can be sent to an administrator indicating a user does not have the application installed on the mobile device.

The messaging component 514 is configured to subscribe to a notification service with components of the environment 100, such as the management service 116 and networked beacons 110. The messaging component 514 may receive notifications from the management service 116 (e.g., as push notifications, text messages, and the like). The notification service may be implemented via a variety of techniques, such as publish-subscribe messaging protocols (e.g., Message Queuing Telemetry Transport (MQTT)). The management service 116 may send notifications such as reminders and alerts to the messaging component 514 based on a current usage context, such as reminders for required personal protective equipment (PPE), known hazard or risk alerts, relevant safety reminders, emergency and/or evacuation alert information, and the like.

In an embodiment, the messaging component 514 may also register for notification services at the system-, operating system-, and app-level. Such notifications allow for both simple state communication based on the notification name along with transferring of complex data structures. Using this information the host application can make whitelisting determinations on what usage/functionality to prevent and/ or allow, such as whether or not a specific application is allowed to be used. Applications that integrate with this notification system will be able to transmit data via custom system-, operating system-, and app-level post notifications. The messaging component 514 may detect these custom notifications. Integrated applications (e.g., apps 422) may post notifications relating to, for example, a foreground status, background status, screen transitions, launching of sub tasks, and denoting specific screens visible to the user.

Note, the control application 104 may include a variety of additional components in practice not presently shown in FIG. 5. For example, the control application 104 may include components for interacting with accessibility services of apps executing on the mobile device 102. More particularly, some apps may use an accessibility service that allows users to more securely interact with the mobile device 102. The accessibility service acts as a layer between the user and the user interface of the mobile device 102. The accessibility service may cover user interface elements that are not suitable for a given environment (e.g., unauthorized applications) or layouts that are relatively complex and, instead, present the elements and layouts in a simpler format. In addition, the accessibility service acts as an input filter (e.g., only allowing touch interaction while allowing the user to see the user interface. The control application 104 may leverage the accessibility service to perform the functions described herein, such as providing a blocking screen to control access to certain applications, log touch events to quantify user engagement and distraction, and allow configuration of system settings and permissions based on context.

Figure 6:
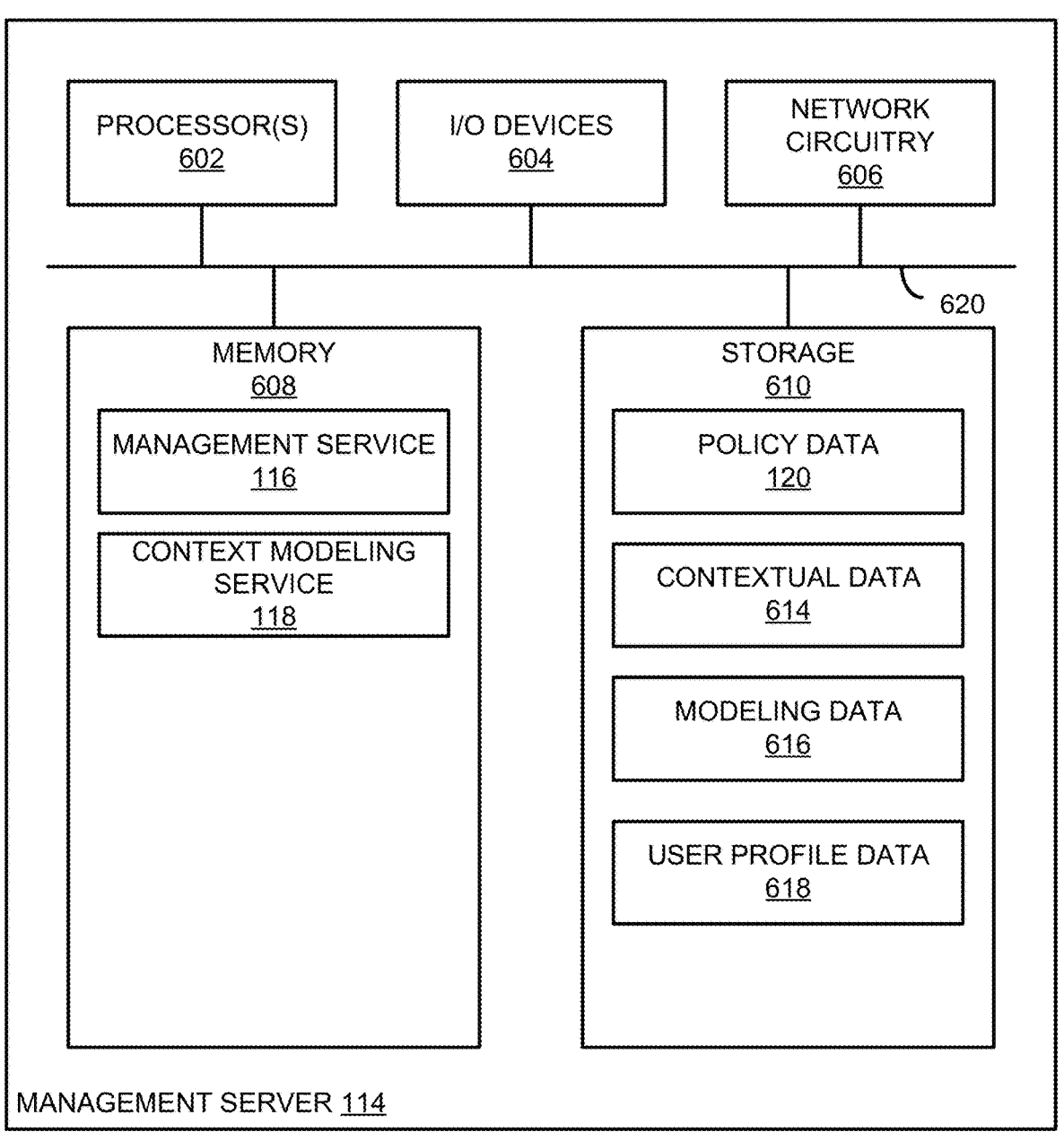
FIG. 6 is a simplified block diagram of at least one embodiment of the management server described relative to FIG. 1.

Referring now to FIG. 6, the management server 114 includes one or more processors 602, I/O devices 604, a network circuitry 606, a memory 608, and a storage 610, each connected with one another via an interconnect bus 620. Note, one of skill in the art will recognize that these components are described for example and that an actual management server 114 may include additional components not shown (e.g., an operating system, firmware drivers, etc.). Likewise, an actual management server 114 may omit one or more of the components described relative to FIG. 6.

The processors 602 may be embodied as one or more processors, each processor being a type capable of performing the functions described herein. The processors 602 may be similar to that of the processors 402 described relative to FIG. 4. The I/O devices 604 may be embodied as any type of input/output device connected with or provided as a component to the management server 114. Example I/O devices 604 include a keyboard, mouse, sensors, diagnostic equipment, speakers, interface devices, and other types of peripherals. The network circuitry 606 may be embodied as any communication circuit, device, or combination thereof, capable of enabling communications over a network between the management server 114 and other devices (e.g., networked beacons 110, control devices 108, mobile devices 102, and so on). The network circuitry 410 may be configured to use any one or more communication technologies (e.g., wired or wireless communications) and associated protocols (e.g., Ethernet, BLUETOOTH, WIFI, etc.) to perform such communication. The network circuitry 606 may be similar to that of the network circuitry 410 described relative to FIG. 4.

The memory 608 may be embodied may be embodied as any type of volatile (e.g., dynamic random access memory, etc.), non-volatile memory (e.g., EEPROM), shared memory (e.g., across other components of the environment 100), or data storage capable of performing the functions described herein. The memory 608 may be similar to that of the memory 412 described relative to FIG. 4. The storage 610 may be embodied as any type of device(s) configured for short-term or long-term storage of data and may be similar to that of the storage 416 described relative to FIG. 4.

Each of the components of the management server 114 may be connected via the interconnect bus 620, which may be embodied as circuitry and/or components to carry out operations (e.g., I/O operations) between components of the management server 114. The interconnect bus 620 may be similar to that of interconnect bus 417 of the mobile device 102 described relative to FIG. 4.

As shown, the memory 608 includes the management service 116 and the context modeling service 118. The storage 610 includes the policy data 120, contextual data 614, modeling data 616, and user profile data 618. The user profile data 618 includes information associated with one or more profiles of a user, group of users, organization, a group of organizations, and so on. Example information may include identifying information (e.g., name, contact information, associated devices, etc.). Each user profile may also be associated with policy data 120 and contextual data 614 that the management service 116 may transmit to the control application 104 of a mobile device 102, a control device 108, a networked beacon 110, and the like. The contextual data 614 is indicative of data received from the control application 104, control devices 108, and networked beacons 110 regarding determined usage contexts. For example, the contextual data 614 may include correlations between user activity (e.g., application usage, geographic location of a mobile device 102, time of day) and policy data 120 that is applied to the user. The contextual data 614 includes data from mobile devices 102 (e.g., heart rate readings, digital security token usage, GNSS sensor data, camera data, biometric scanner data, third-party application usage, native application usage, network traffic and system logs, movement and location data, and obtainable data on or around the devices within a context domain 112). Contextual data 614 may also include data associated with integrated external technologies (e.g., data sources outside of a context domain 112 that provide additional context to usage of a mobile device 102). An example of such technologies include physical access control systems (PACS), such as physical security identify verification techniques and access cards, biometric scanner data, facility entry/exit control mechanisms, PACS integration system data, and the like. Another example includes logical access control systems (LACS), such as data from identity and access management systems, additional system security control data (e.g., lightweight directory access protocol (LDAP) data, data feeds), other system entry/exit control mechanisms (e.g., password managers and the like), LACS integration system data, and the like. Yet another example includes physical and social environmental contextual data, such as weather data, traffic data, stock market data, news headlines, social media headlines, and the like.

The context modeling service 118 may use the contextual data 614 as input to generate modeling data 616. The modeling data 616 may include one or more machine learning models, classifiers, training sets, and the like generated from the contextual data 614. The management service 116 may send the modeling data 616 to the control application 114, control devices 108, and the networked beacons 110. Doing so allows these devices to use the modeling data 616 to more efficiently identify a usage context. For example, as a mobile device 102 may input currently observed data to a generated model and receive, as output, a usage context. The modeling data 616 may also be used to determine an activity or usage that may result from a current action performed on the mobile device 102 and enforce a policy prior to that determined activity or usage occurring.

Referring now to FIG. 7, the management service 116 includes a policy management component 702, an update component 708, a notification component 710, and an aggregation component 712. The policy management component 702 is configured to maintain usage policies for one or more users and organizations. The policy management component 702 may allow for customization (e.g., by an organization sending an updated policy through a management console application). The update component 708 is configured to receive updates to a given policy, modify the policy, and propagate the policy to associated devices. Updates can include additional permissions and enforcements, whitelisted applications and sites, removal of permissions and enforcements, and the like. The notification component 710 may provide a notification service used to push (e.g., transmit) messages to devices (e.g., the mobile device 102). Such messages may include indications of updated policies, listings of networked beacons 110 in proximity, and so on. The aggregation component 712 may perform various aggregation and analytics on data received from devices (e.g., the mobile device 102, control device 108, and networked beacons 110).

Figure 8:
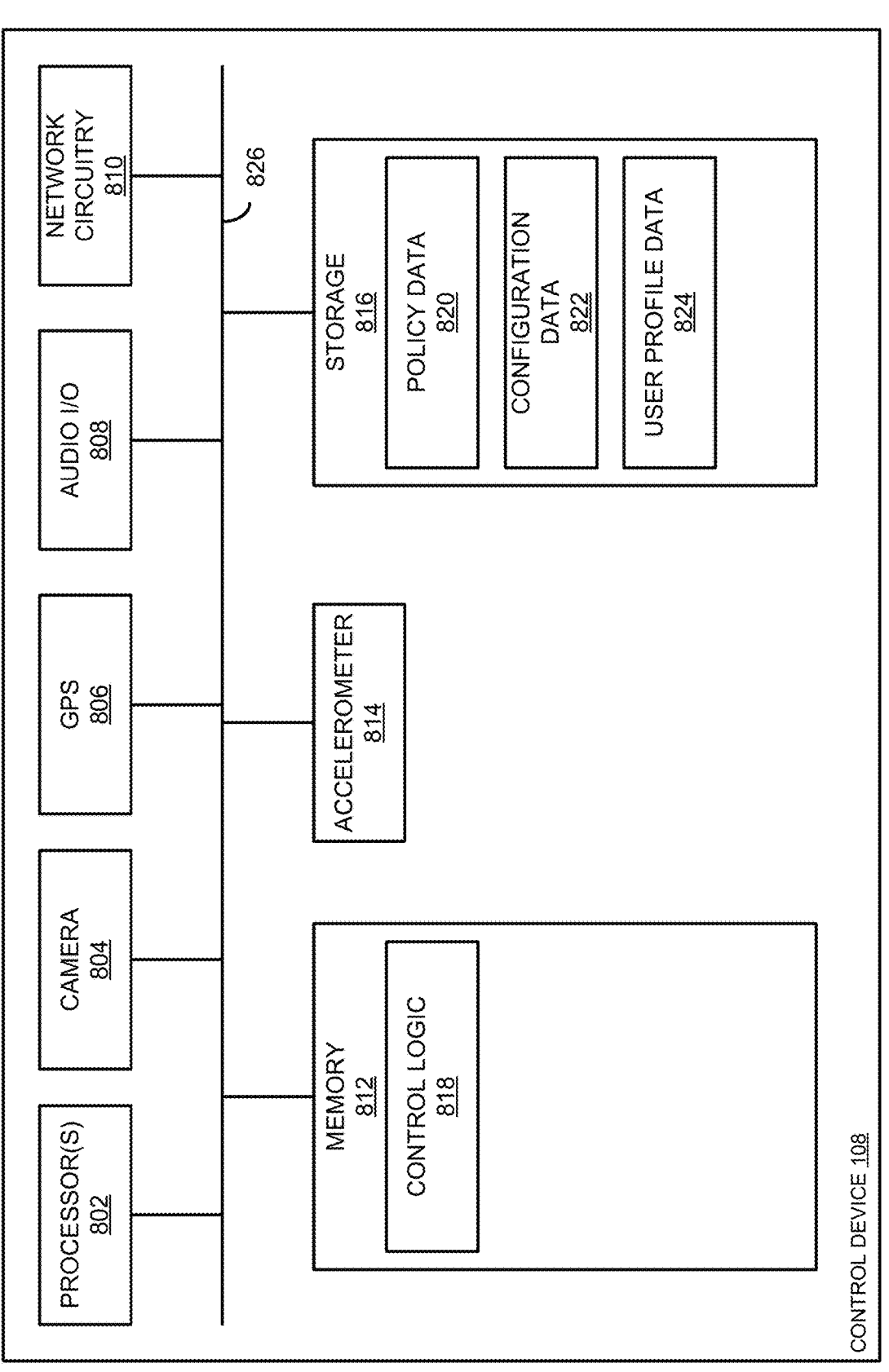
FIG. 8 is a simplified block diagram of at least one embodiment of the control device described relative to FIG. 1.

Referring now to FIG. 8, the control device 108 includes one or more processors 802, a camera 804, a GPS 806, audio I/O 808, a network circuitry 810, a memory 818, an accelerometer 814, and a storage 816, each connected with one another via an interconnect bus 816. Note, one of skill in the art will recognize that these components are described for example and that an actual control device 108 may include additional components not shown. Likewise, an actual control device 108 may omit one or more of the components described relative to FIG. 8.

The processors 802 may be embodied as one or more processors, each processor being a type capable of performing the functions described herein. The processors 802 may be similar to that of the processors 402 described relative to FIG. 4. The camera 804 may be any hardware used to capture image and video data. The camera 804 may be controlled by software executing in the memory 812. The GPS 806 may be embodied as any hardware or circuitry to use GNSS techniques to identify a location of the control device 108. The audio I/O 808 may incorporate audio-in and audio-out devices, such as microphone and speaker devices used to receive and emit audio. The control device 108 may use the audio I/O 808 to transmit audio signals used, based on location-identification techniques, to determine the location of the control device 108 relative to other objects within an enclosure (e.g., a vehicle, a room, etc.). The network circuitry 810 may be embodied as any communication circuit, device, or combination thereof, capable of enabling communications over a network between the control device 108 and other devices (e.g., networked beacons 110, mobile devices 102, the management server 114, and so on). The network circuitry 810 may be configured to use any one or more communication technologies (e.g., wired or wireless communications) and associated protocols (e.g., Ethernet, BLUETOOTH, WIFI, etc.) to perform such communication. The network circuitry 810 may be similar to that of the network circuitry 410 described relative to FIG. 4. The accelerometer 814 may be embodied as any device or circuitry to measure acceleration of the control device 108. Software executing in the memory 812 may use measurements from the accelerometer 814 to determine whether the control device 108 (e.g., in cases in which the control device 108 is in a vehicle). Further, the accelerometer 814 may be used to determine an orientation of the control device 108.

The memory 812 may be embodied may be embodied as any type of volatile (e.g., dynamic random access memory, etc.) or non-volatile memory (e.g., EEPROM) or data storage capable of performing the functions described herein. The memory 812 may be similar to that of the memory 412 described relative to FIG. 4. The storage 816 may be embodied as any type of device(s) configured for short-term or long-term storage of data and may be similar to that of the storage 416 described relative to FIG. 4.

Each of the components of the control device 108 may be connected via the interconnect bus 826, which may be embodied as circuitry and/or components to carry out operations (e.g., I/O operations) between components of the control device 108. The interconnect bus 826 may be similar to that of interconnect bus 417 of the mobile device 102 described relative to FIG. 4.

The memory 812 includes control logic 818. The control logic 818 is configured to establish a connection with a mobile device 102. For example, the control logic 818 may establish a wireless connection such as a BLUETOOTH connection with the mobile device 102. Further, the control logic 818 receives indications of attempts to access one or more prohibited functions a mobile device 102. In response, the control logic 818 may transmit signals to the mobile device 102 to prevent access to the prohibited functions. For example, the control logic 818 may transmit HID signals indicative of keypresses to prevent the prohibited function from being performed.

The storage 816 includes policy data 820, configuration data 822, and user profile 824. The policy data 820 and user profile 824 are similar to policy data and user profile data described in other passages herein (e.g., the policy data 120 and the user profile data 618, respectively). The configuration data 822 may specify various configuration settings of the control device 108. Example settings include data associated with the location in which the control device 108 is installed, user device identifiers, policy enforcement technique selection, and the like.

Figure 9:
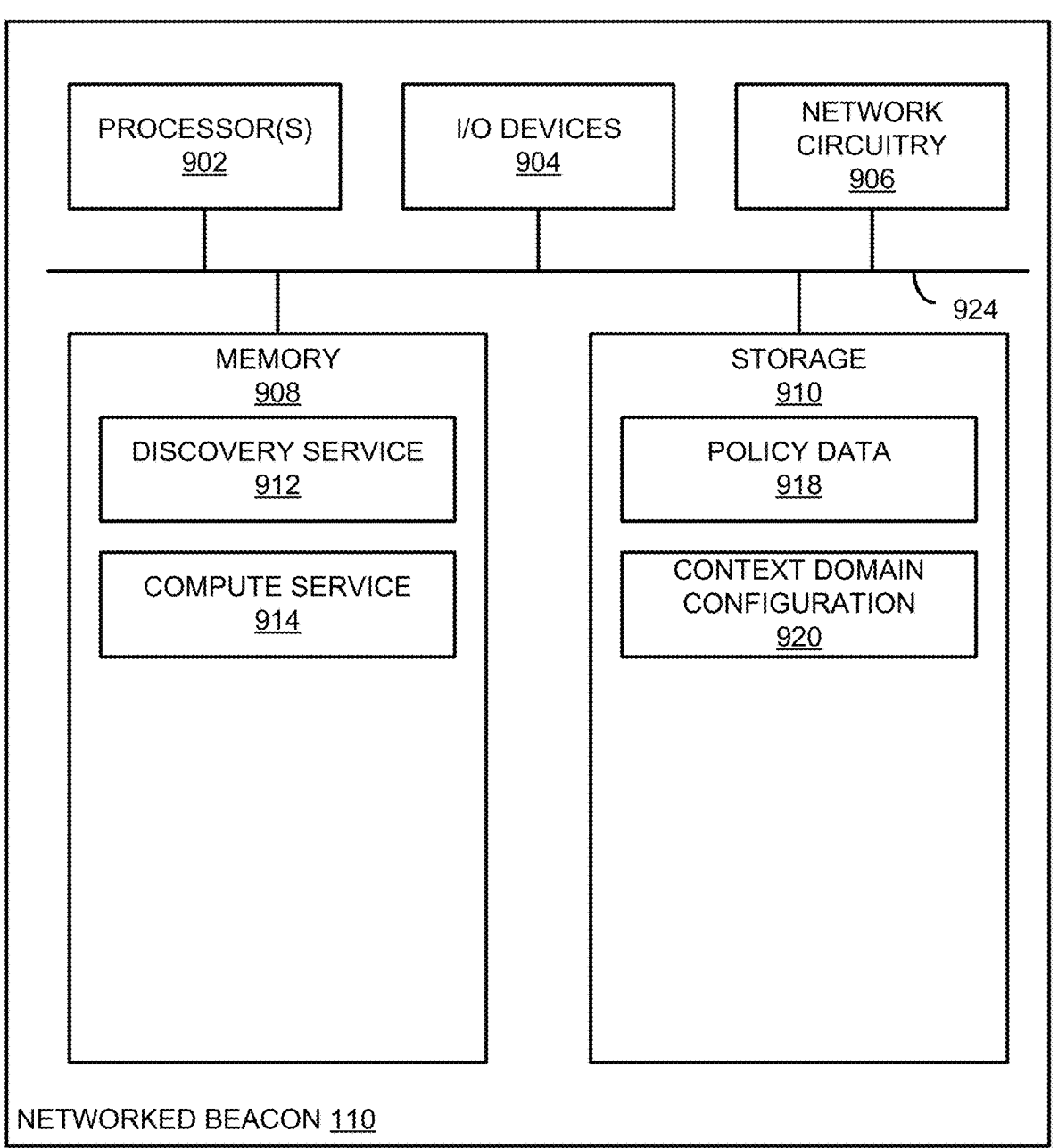
FIG. 9 is a simplified block diagram of at least one embodiment of the networked beacon described relative to FIG. 1.

Referring now to FIG. 9, the networked beacon 110 includes one or more processors 902, one or more I/O devices 904, a network circuitry 906, a memory 908, and a storage 910, each connected with one another via an interconnect bus 924. Note, one of skill in the art will recognize that these components are described for example and that an actual networked beacon 110 may include additional components not shown. Likewise, an actual networked beacon 110 may omit one or more of the components described relative to FIG. 9.

The processors 902 may be embodied as one or more processors, each processor being a type capable of performing the functions described herein. The processors 902 may be similar to that of the processors 402 described relative to FIG. 4. The I/O devices 904 may be embodied as any type of input/output device connected with or provided as a component to the networked beacon 110. Example I/O devices 904 include a keyboard, mouse, sensors, diagnostic equipment, speakers, interface devices, and other types of peripherals. The network circuitry 906 may be embodied as any communication circuit, device, or combination thereof, capable of enabling communications over a network between the networked beacon 110 and other devices (e.g., the management server 114, control devices 108, mobile devices 102, and so on). The network circuitry 906 may be configured to use any one or more communication technologies (e.g., wired or wireless communications) and associated protocols (e.g., Ethernet, BLUETOOTH, WIFI, etc.) to perform such communication. The network circuitry 906 may be similar to that of the network circuitry 410 described relative to FIG. 4.

The memory 908 may be embodied may be embodied as any type of volatile (e.g., dynamic random access memory, etc.) or non-volatile memory (e.g., EEPROM) or data storage capable of performing the functions described herein. The memory 908 may be similar to that of the memory 412 described relative to FIG. 4. The storage 910 may be embodied as any type of device(s) configured for short-term or long-term storage of data and may be similar to that of the storage 416 described relative to FIG. 4.

Each of the components of the networked beacon 110 may be connected via the interconnect bus 924, which may be embodied as circuitry and/or components to carry out operations (e.g., I/O operations) between components of the networked beacon 110. The interconnect bus 924 may be similar to that of interconnect bus 417 of the mobile device 102 described relative to FIG. 4.

The memory 908 includes a discovery service 912 and a compute service 914. The storage 910 includes policy data 918 and a context domain configuration 920. The discovery service 912 is to broadcast discovery signals within a specified range. Mobile devices 102 may receive the signals and send a request to establish a connection in response. Once connected, the discovery service 912 may transmit a usage context to the mobile device 102, which can be determined from the context domain configuration 920. The context domain configuration 920 may specify one or more usage contexts for a context domain 112 projected by the networked beacon 110. The usage contexts can differ from device-to-device (e.g., whether a user is using a smartphone or some other device such as a wearable device), user (e.g., whether a user is associated with certain usage permissions), and the like. The networked beacon 110 may also transmit policy data 918 to the mobile device 102. The policy data 918 is similar to policy data described herein (e.g., the policy data 120).

In an embodiment, the compute service 914 is configured to perform compute-intensive logic offloaded by a mobile device 102 to improve performance of the control application 104 of the mobile device 102. For example, the compute service 914 may receive usage and activity data offloaded by a mobile device 102 (e.g., sent by the control application 104 of the mobile device 102) or other devices (e.g., other networked beacons 110, control devices 108, and the management server 114). The compute service 914 may determine a usage context on behalf of the mobile device 102. The compute service 914 may also determine and evaluate policies associated with the mobile device 102 on behalf of the mobile device 102.

FIG. 10 illustrates a method 1000 for managing access to features of a mobile device (e.g., the mobile device 102) based on a usage context. As shown, the method 1000 begins in block 1002, in which the mobile device 102 detects a context event trigger. Examples of a context event trigger includes an installation of the control application 104 onto the mobile device 102, entering or exiting a context domain 112 (e.g., as a user entering a job site, as determined for example by a multitude of potential context data points within the context domain 112), a push notification from the management server 114 (or other mobile device 102) out to a group of mobile devices 102, a detection of one or more specified usage patterns, a start or conclusion of using certain components of machinery or a vehicle, a start or conclusion of an emergency event, and a display of digital identification at a checkpoint. As another example, context domain 112 triggers can also be determined using the camera on the mobile device 102. In one instance, a safe zone may be marked by a large QR code on the wall. In this case, a walking motion (e.g., as detected by the mobile device 102 for a specified period) may indicate that the user leaves the safe zone. In another instance, a change in orientation of the mobile device 102 can indicate that the user leaves the safe zone. In yet another instance, the predominant color or power spectral density of paint in the room may provide additional context trigger. In still another instance, the predominant color or power spectral density of the lighting may provide a context trigger. In another instance, a near infrared light may be installed and flash in a pattern that would indicate a context trigger. In another instance, an aspect of a sound transmission would provide context. In one case the sound transmission aspect may be embodied as an intentional signal emitted to provide a context trigger. The signal may be encoded using a variety of methods for encoding data within audio. In another case, the known audio signature of the environment may be used to determine context. For example, the mobile device 102 might detect the signature sound of a band saw on a factory floor, a centrifuge in a lab, street traffic indicating outside/near a road, etc. In such a case, the mobile device 102 may compare reference audio signatures for machinery against actual sounds to allow detecting malfunctions in the machinery or need for maintenance that could be reported to the company. In another instance, identifying echoes or other distortions may allow for determining further context in terms of user position. In another case, doppler shift may allow determination of motion with respect to the equipment.

In block 1004, the mobile device 102 determines a usage context. For example, assume that the mobile device 102 enters a context domain 112, such as a job site. An associated networked beacon 110 may automatically determine and transmit the usage context to the mobile device 102. As another example, the control application 104 may determine the context based on various characteristics (e.g., user activity, application activity, external characteristics such as location, weather, traffic, etc.). In block 1006, the mobile device 102 determines whether any updates associated with the usage context are available. For example, the mobile device 102 may query the management service 116 with the usage context data to make such determination. If updates are available, the mobile device 102 may retrieve the updated usage context data from the management service 116. In block 1008, the mobile device 102 modifies the usage context based on the associated updates.

In block 1010, the mobile device 102 determines one or more policies to enforce based on the usage context. The control application 104 may evaluate stored policies to determine which of the policies are applicable given the usage context. As another example, the mobile device 102 may query the management service 116 (or a networked beacon 110) with the usage context for associated policies. The control application 104 may retrieve such policies from the management service 116.

In block 1012, the mobile device 102 enforces the one or more policies on the mobile device 102. The mobile device 102 may perform various policy enforcement and access prevention techniques to do so. For example, the mobile device 102 may establish a connection with one of the control device 108, such that the control device 108 transmits signals to the mobile device 102 to prevent access of functions prohibited by the determined policies. Further, the control application 104 may generate a prompt to ensure that a user acknowledges the determined policies. For example, the control application 104 may prompt the user to ensure that a personal protective equipment (PPE) is being worn, to ensure that job safety requirements are acknowledged, and the like. By using abilities to block device usage, the control application 104 may ensure that the user acknowledges the policies prior to any usage of the mobile device 102. Prompts may include generated notifications, questionnaires, and the like.

In block 1014, the mobile device 102 determines whether an exit trigger is detected. An exit trigger may be any event that causes the control application 104 to cease enforcement of the determined policies. For example, an exit trigger can be the mobile device 102 leaving a context domain 112 (e.g., the mobile device 102 is no longer in range of a given networked beacon 110). If no exit trigger is detected, then the method 1000 returns to block 1012, in which the mobile device 102 continues enforcing the policies. Otherwise, in block 1016, the mobile device 102 disables enforcement of the one or more policies on the mobile device 102. The method 1000 may be applied in numerous contexts throughout the day. For example, a "Do Not Disturb" context may be triggered for a user mobile device during late night hours and deactivated at a time in the morning. Another context may be triggered when the mobile device is later detected inside a vehicle (e.g., during a drive to work). Yet another context may be triggered when the user and mobile device arrives at a given work site and enters a specified context domain.

Figure 11:
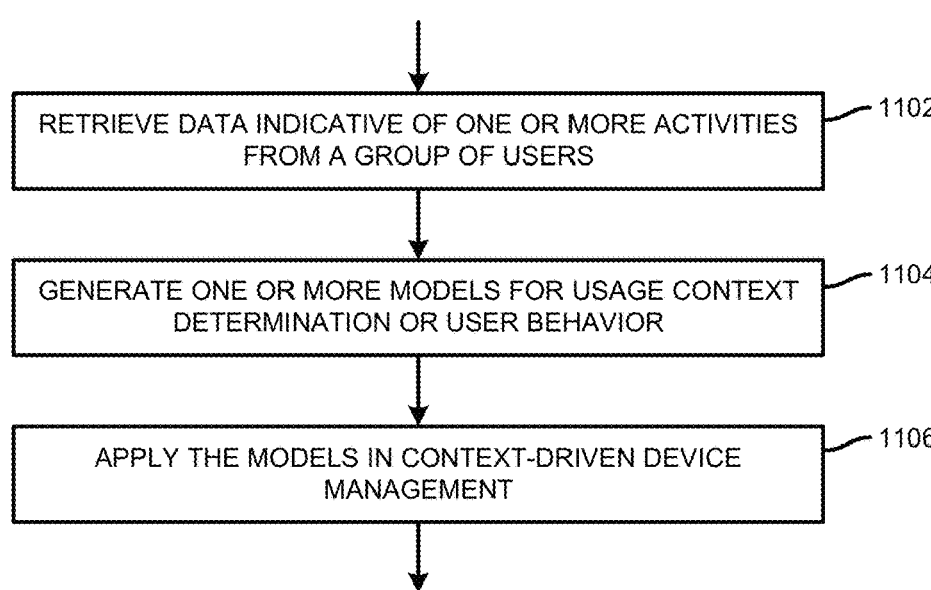
FIG. 11 is a simplified flow diagram of at least one embodiment of a method for applying a behavioral or usage model for managing a mobile device.

Referring now to FIG. 11, a method 1100 for managing one or more contextual models (e.g., context determination models and user behavior models) is shown. The method 1100 begins in block 1102, in which the management server 114 retrieves data indicative of one or more activities from a group of users. The data may be retrieved from the mobile devices 102 associated with the users, the control devices 108 connected with the mobile devices 102, or the networked beacons 110 connected with the mobile devices 102.

In block 1104, the management server 114 generates one or more models for usage context determination or user behavior. The management server 114 may do so using various techniques, such as neural networks or other machine learning algorithms. The management service 114 may generate static models used to describe a user at a specifically measured point in time, inferential models used to describe a user may act based on prior data, ontological models that describe the user in terms of relations to other users, time series models to describe a user in terms of how other models have changed over time.

In block 1106, the management server 114 may apply the models in a context-drive device management setting. For example, the management server 114 may update the control application 114 (or generate an update patch) including generated or updated models for local determination by the control application 114 of context and user behavior. Once applied, the models may also be used in compliance reporting (e.g., how many users performed a certain action in a given context and subject to a given policy), anomaly detection (e.g., to determine how users act relative to expected behavior), data compression, risk profiling, and policy enforcement.

Figure 12:
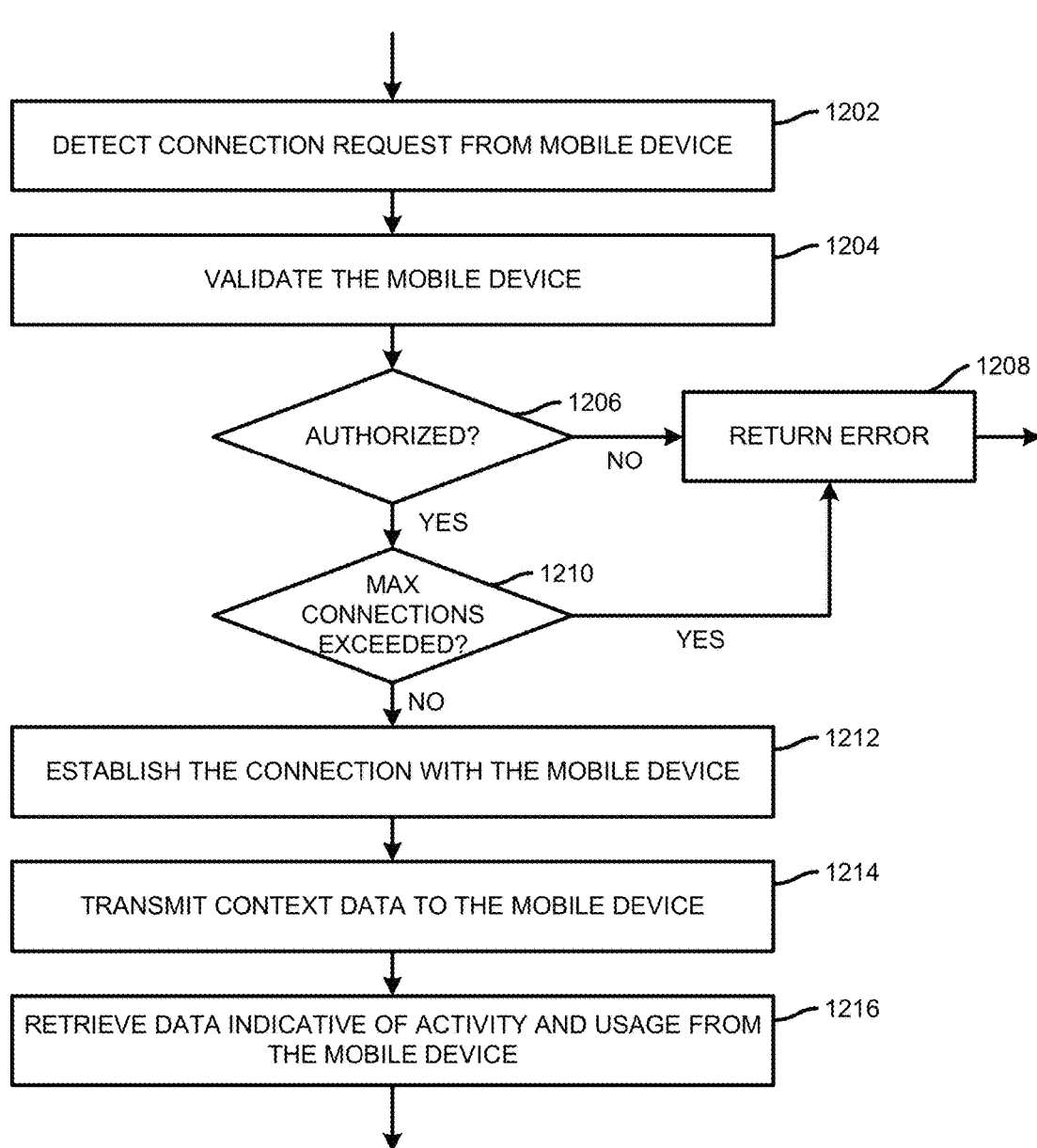
FIG. 12 is a simplified flow diagram of at least one embodiment of a method for communication with a networked beacon in a context driven mobile device management environment.

Referring now to FIG. 12, a method 1200 for managing mobile device 102 connections by a networked beacon 110 is shown. The method 1200 begins in block 1202, in which the networked beacon 110 detects a connection request from a mobile device 102. The request may include various information, such as a device identifier associated with the mobile device 102 and device credentials (e.g., a login and password connection, an encryption key, etc.).

In block 1204, the networked beacon 110 validates the mobile device 102, e.g., based on the credentials provided in the connection request and on whether the mobile device 102 is included on a list of authorized devices (e.g., in the event that the networked beacon 110 is a private beacon). In block 1206, the networked beacon 110 determines whether the mobile device 102 is authorized to connect to the networked beacon 110. If not, then in block 1208, the networked beacon 110 returns an error.

Otherwise, in block 1210, the networked beacon 110 determines whether a maximum amount of connections thereto is exceeded. If so, then the method 1200 may proceed to block 1208, in which the networked beacon 110 returns an error. In such a case, the mobile device 102 may seek out other beacon connections (e.g., to other networked beacons 110 in proximity or to mobile devices 102 performing functions of the networked beacons 110, as described above).

If the maximum amount of connections is not exceeded, then in block 1212, the networked beacon 110 establishes the connection with the mobile device 102. In block 1214, the networked beacon 110 transmits usage context data to the mobile device 102. The networked beacon 110 may also determine one or more policies to apply to the mobile device 102 based on the usage context data. In block 1216, the networked beacon 110 retrieves data indicative of user activity and mobile device usage from the mobile device 102. The networked beacon 110 may forward the data to the management device 114 (e.g., for aggregation of the data).

Figure 13:
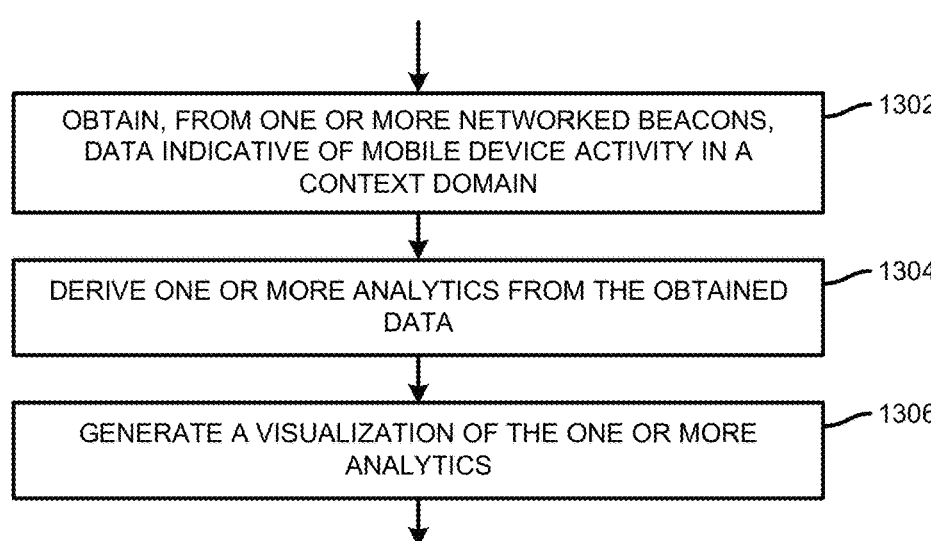
FIG. 13 is a simplified flow diagram of at least one embodiment of a method for generating a visualization of one or more context domains.

Referring now to FIG. 13, a method 1300 for generating a visualization based on aggregated data from networked beacons 110 is shown. The method 1300 begins in block 1302, in which the management server 114 obtains, the one or more networked beacons 110, data indicative of mobile device activity in a context domain 112, e.g., the data forwarded by the networked beacon 110 from multiple mobile devices 102.

In block 1304, the management server 114 derives one or more analytics from the obtained data, such as locations of the mobile devices 102 respective to the networked beacon(s) 110. In block 1306, the management server 114 generates one or more visualizations from the one or more analytics. An example visualization includes a heat map that identifies a location of the users relative to one or more context domains 112 (e.g., different floors of a building). Such a visualization may be advantageous, e.g., in the event of an emergency situation in which mobile devices 102 are to be notified of the emergency situation. The management server 114 may transmit such visualizations to control applications 104 in the context domains 112 by way of a notification service subscribed to by the mobile devices 102.

Unauthorized Device Detection

To achieve full management of mobile devices within a vehicle (or other enclosed space) using the techniques described herein, it is desirable to identify all mobile devices within the vehicle regardless of whether the mobile device is a managed device (also referred to herein as an "authorized device") or an unmanaged device (also referred to herein as an "unauthorized device") according to the management server 114. Once identified, the management server 114 is able to initiate management of the managed devices and/or perform methods to remediate the presence of unmanaged devices, such as trigger an email, SMS, or other notification and/or report to the responsible party.

Figure 14:
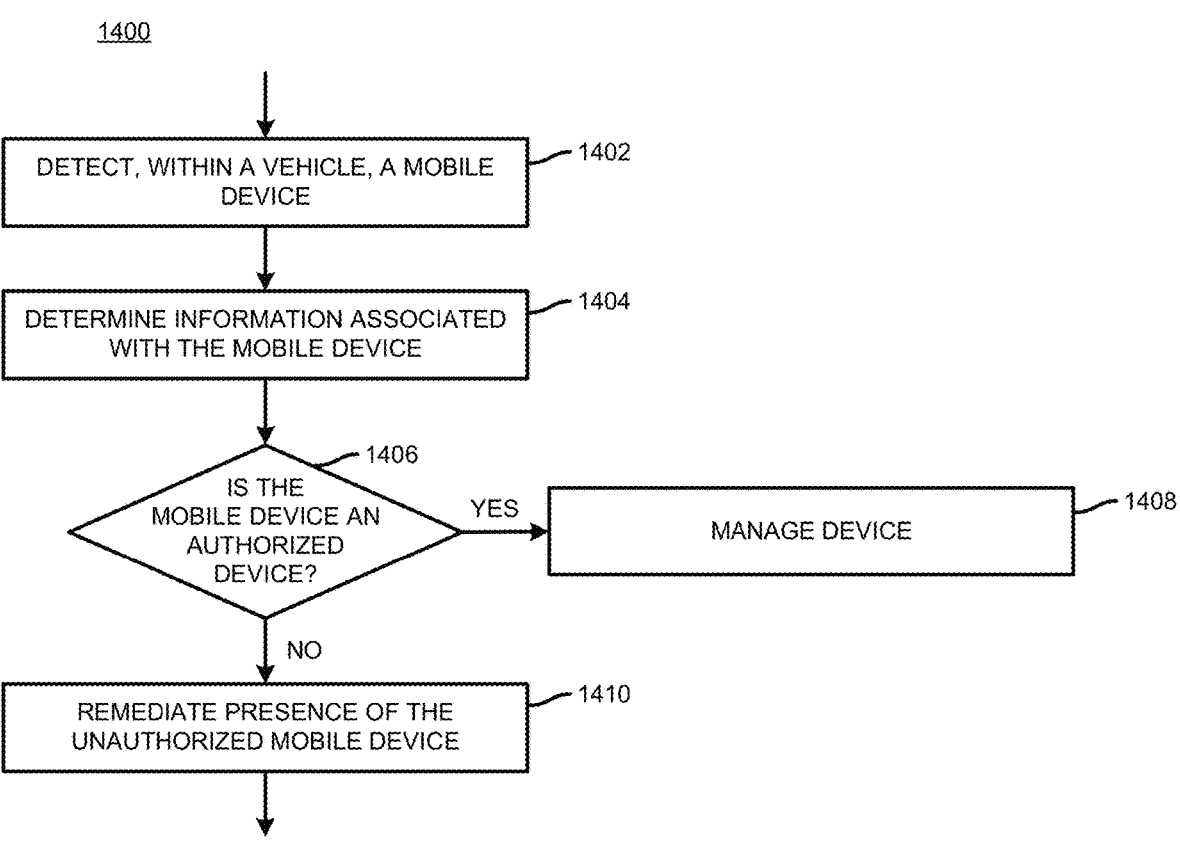
FIG. 14 is a simplified flow diagram of at least one embodiment of a method for detecting an unauthorized device within a vehicle.

FIG. 14 presents an example method 1400 of managing mobile devices within a relatively enclosed space. Note, the following describes managing mobile devices within a vehicle. However, one of skill in the art will recognize that embodiments may be adapted to a variety of relatively enclosed spaces, such as a building, a room within a building (e.g., a lab, machine shop, any area in which one has proximity to dangerous stationary equipment, etc.), a fenced-in area, a geo-fenced area, heavy machinery (forklifts, cranes, etc.), and so on.

As shown, the method 1400 begins in block 1402, in which a mobile device is detected within the vehicle. Detecting the mobile device can be accomplished through several ways. For example, in an embodiment, assume that a networked beacon 110 is present in the vehicle in communication with the management server 114. The networked beacon 110 may detect the mobile device using a variety of methods. For instance, the networked beacon 110 may detect advertising packets (e.g., transmitted via the BLUETOOTH low energy (BTLE) protocol) that the mobile device transmits. The advertising packets typically include identifying information that enables the networked beacon 110 to detect the presence of the mobile device.

As another example, the networked beacon 110 may broadcast BTLE advertisement packets to devices within the vehicle. Doing so can elicit a BTLE scan request from the mobile device. The scan requests may include identifying information that the networked beacon 110 may use to detect the mobile device. Such a technique is effective for mobile devices that do not broadcast advertising packets, such as some ANDROID mobile devices. Based on the time intervals at which the mobile device transmits the scan requests, the networked beacon 110 may determine various attributes relating to the mobile device. For instance, a relatively frequent scan request transmission (e.g., one transmission every fifteen seconds) can indicate that the display of the mobile device is currently active. Infrequent scan request transmissions can indicate that the display is inactive. The networked beacon 110 may also use the intervals to identify other attributes, such as the model or operating system of the mobile device.

Another example of detecting mobile devices is by using an application executing a known mobile device within the vehicle (e.g., the control application 104 registered with the management server 114), to identify other mobile devices within the vehicle. In an embodiment, the control application 104 is configured to detect advertising packets transmitted from other mobile devices. Such an example is advantageous in situations in which a networked beacon 110 is not situated within the vehicle, as this approach does not require additional hardware other than the known mobile device. Of course, a hybrid of any of the above-described techniques can be used to detect mobile devices within the vehicle. For example, the control application 104 of a mobile device may scan for advertising packets, and a networked beacon 110 may advertise packets and detect scan requests from mobile devices. The networked beacon 110 may then transmit the detected data to the known mobile device for further analysis.

In some cases, a given mobile device might not transmit any advertising packets or scan request packets. In such a case, the networked beacon 110 may be configured to emulate advertisements of a device that can elicit a scan request or any other BTLE activity from a given device to detect within the vehicle. For example, many mobile devices might attempt communication with standardized BTLE beacons (e.g., an IBEACON). If the networked beacon 110 emulates such a beacon, the networked beacon 110 may be able to stimulate BTLE activity from the mobile device.

In another example, a given mobile device might correspond to a single-connection peripheral device already connected. For instance, wearables (e.g., smart watches, ear buds, etc.) are such peripheral devices. The networked beacon 110 (or control application 104) may detect such devices by sniffing for traffic in BTLE data bands instead of an advertising band. Distinguishing between central and peripheral devices enables the networked beacon 110 (or control application 104) to better identify and categorize the device. This technique is effective with unencrypted BTLE connections but is also adaptable with BTLE connections in which the listener was present during the pairing process.

In block 1404, information about a mobile device may be determined once detected. For example, the networked beacon 110 (or control application 104) may identify, from the advertising packets or scan requests transmitted by a given mobile device, uniquely identifying information, such as a media access control (MAC) address, associated with that mobile device. The MAC address serves as an identifying field in such packets and are of three categories: fixed, long-term variable, and short-term variable. The networked beacon 110 (or control application 104) may use properties associated with each category to ascertain further information associated with the mobile device.

For example, a mobile device having a fixed MAC address uses the same MAC address in all network transmissions, including within and between trips of the vehicle. Such a property allows the networked beacon 110 (or control application 104) to identify the mobile device within and between trips. Consequently, the networked beacon 110 (or control application 104) may use the fixed MAC address to determine whether the mobile device is a managed device (e.g., registered with the management server 114) if the fixed MAC address corresponds to a physical MAC address (e.g., as opposed to a randomly-assigned MAC value, which will generally have a second character of 2, 6, A, or E in the address). This may be accomplished through various techniques, such as by the control application 104 via an API call to the operating system of the mobile device to obtain the MAC address or via a manual process in which the MAC address is registered with the management server 114 (e.g., via the control application 114).

A mobile device having a long-term variable MAC address remains constant throughout a given vehicle trip but can change between trips. The networked beacon 110 (or control application 104) may correlate the mobile device MAC addresses between trips using various techniques, as described further herein relative to short-term variable MAC addresses.

A mobile device having a short-term variable MAC address may change MAC addresses during the trip. Consequently, the networked beacon 110 (or control application 104) may use a variety of techniques to accurately identify the mobile device. For instance, the networked beacon 110 (or control application 104) may detect patterns of MAC address changes in the advertising packets or scan requests. In a given case, the networked beacon 110 (or control application 104) may determine that a previously detected MAC address has not been detected for an amount of time and that a more recently detected MAC address was detected some time after the previously detected MAC address was no longer observed during a vehicle trip. In such a case, the networked beacon 110 (or control application 104) may determine that both of the detected MAC addresses are associated with the same mobile device.

For increased confidence that a first detected MAC address and second detected MAC address are associated with the same device, the networked beacon 110 (or control application 104) may further monitor the Received Signal Strength Indicator (RSSI) associated with a detected MAC address. As known, a RSSI is an estimated measure of power level that a RF device is receiving from an access point. If RSSI characteristics (e.g., mean, variance, etc.) are similar between a first detected MAC address and second detected MAC address, the network beacon 110 (or control application 104) may determine both of the MAC addresses to be of the same device. In an embodiment, the networked beacon 110 (or control application 104) may use scoring methods using RSSI characteristics as input to determine a likelihood that two MAC addresses are associated with the same device. In addition, the networked beacon 110 (or control application 104) may also (or alternatively) ensure that the first detected MAC address and second detected MAC address are detected while in motion to reduce the likelihood that the underlying packet originates from a device outside of the vehicle.

In an embodiment, the networked beacon 110 (or control application 104) may also be configured to identify situations in which more than one mobile device in the vehicle have short-term variable MAC addresses. In such a case, the networked beacon 110 (or control application 104) may classify transitions between detected MAC addresses as being an aligned transition or an unaligned transition. An unaligned transition pertains to a single device transitioning to a new MAC address at a given time, and other devices continue to use the respective MAC address. This can be handled using similar methods in a single device scenario, as described herein. An aligned transition pertains to two or more devices transitioning MAC addresses relatively simultaneously. The networked beacon 110 (or control application 104) may handle aligned transitions based on a combination of RSSI statistics, transmission period data, and any additional identifying data included with the transmitted advertising packets or scanning request packets. Doing so allows the networked beacon 110 (or control application 104) to track how each MAC address pre-change corresponds to each MAC address post-change. Further, in some cases where RSSI, transmission period data, and packet-related data are relatively stable, the networked beacon 110 (or control application 104) may be configured to use such data as identifying information for a mobile device in place of the MAC address. Doing so may be more advantageous in the event that MAC addresses are not as stable.

In some cases for aligned transitions, the networked beacon 110 (or control application 104) may use information of multiple devices transmitting packets prior to and after the change in respective MAC addresses to assess a number of unmanaged devices within the vehicle, regardless of whether the networked beacon 110 (or control application 104) is able to identify to a degree of certainty a mapping of a given MAC address to a corresponding mobile device. For example, assume that a managed device and an unmanaged device are presently within a vehicle. If both devices are transmitting using a short-term variable MAC address and transmitting detectable packets, the networked beacon 110 (or control application 104) can identify that at least one of the devices is a managed device, and by elimination can determine that the other device is an unmanaged device. In this example, the networked beacon 110 (or control application 104) may create horizontal line segments corresponding to a time span over which each MAC address is included in a transmitted packet, where the x-axis represents time, and the y-axis represents different MAC addresses. The networked beacon 110 (or control application 104) may sweep a vertical line across from the beginning to the end of the trip, counting at each point the number of intersections with horizontal line segments. The maximum value for this count is the maximum devices simultaneously presented within the vehicle throughout the trip.

Further, the above approach assumes that when a given mobile device changes from a given short-term variable MAC address to another MAC address (i.e., the address does not go back to the previous MAC address). In an embodiment, the networked beacon 110 (or control application 104) may be configured to identify mobile devices that may revert to a previously used MAC address. To do so, the networked beacon 110 (or control application 104) may measure a similarity between MAC addresses by a number of differing bytes or bits in the address against a threshold. The threshold may vary based on environment, with a higher threshold avoiding false positives for device detection. If using the aforementioned horizontal line segmenting approach, the networked beacon 110 (or control application 104) may merge line segments corresponding to a given mobile device into a single line segment prior to a sweep.

Further still, in an embodiment, the networked beacon 110 (or control application 104) may account for noise, such as network packets transmitted from outside of the vehicle, using one or a combination of techniques. For example, the networked beacon 110 (or control application 104) may discard packets having RSSI values that fall below a specified threshold or that are within statistical thresholds (e.g., for variance, standard deviation, and the like). The networked beacon 110 (or control application 104) may do so in various areas of processing, such as per-packet, by MAC address, or by the identified device. In some implementations, the networked beacon 110 (or control application 104) may set different thresholds for each of these areas. Further, the networked beacon 110 (or control application 104) may also set a threshold minimum amount of incoming packets, e.g., at per-packet level, by MAC address, or by device.

As another example, the networked beacon 110 (or control application 104) may evaluate packets arriving while the vehicle is in motion (e.g., and not while stationary; determined by accelerometer or GPS components on the networked beacon 110 or control application 104, determined in a post-trip analysis by the management server 114, control application 104, or networked beacon 110 by combining other data sources such as in-vehicle telematics, etc.). The networked beacon 110 (or control application 110) may also use a speed threshold under which packets should be disregarded. Of course, the aforementioned techniques can be combined in a variety of ways for robustness. In one example, a high threshold for the first packet from a MAC address while the vehicle is in motion may be used to avoid detecting high RSSI packets from a nearby vehicle. In another example, the networked beacon 110 (or control application 104) may evaluate MAC addresses with a minimum number of sample addresses when moving but require a larger minimum number of sample addresses when not moving. In another example, the networked beacon 110 (or control application 104) may discard MAC addresses with a high variance while the vehicle is in motion, as this may indicate the underlying device is either coming closer or going further away (e.g., because the device is in a nearby vehicle).

Once the networked beacon 110 (or control application 104) determines information associated with the mobile device, then in block 1406, the networked beacon 110 determines, using the information, whether the mobile device is an authorized (e.g., managed) device. For example, the networked beacon 110 (or control application 104) may query the management server 114 using the obtained information such as the MAC address against a list of registered devices maintained by the management server 114 to determine whether the information mapping the device to the list is present. As another example, in many cases, a managed mobile device will have a control application 104 executing thereon. The networked beacon 110 may determine that a mobile device is managed using a BTLE discovery or scan and by process of elimination identify unmanaged devices. As yet another example, the networked beacon 110 (or control application 104) may determine whether signature BTLE timing from the control application 104 of the mobile device is present. This technique can also be used to establish offset in clocks between managed mobile devices and the networked beacon 110. Advantageously, the networked beacon 110 (or control application 104) is able to correlate GPS data from the mobile device with BTLE packet data from the networked beacon 110.

In addition, the networked beacon 110 (or control application 104) can determine whether the managed device (via the respective control application 104) registered a unique identifier with the networked beacon 110 (or control application 104). If so, the control application 104 may transmit the unique identifier to the networked beacon 110 (or control application 104) for authentication.

If the mobile device corresponds to an authorized device, then in block 1408, the mobile device is managed. The networked beacon 110 (or control application 104) may also use pattern matching techniques to establish a baseline BTLE activity for a given driver or vehicle once the authorized device is authorized as such. Doing so allows the networked beacon 110 (or control application 104) to identify deviations from that baseline and flag such activity for potential violation of policy.

If the mobile device does not correspond to an authorized device, the networked beacon 110 (or control application 104) classifies the mobile device as unauthorized (e.g., an unmanaged device). In such a case, in block 1410, the networked beacon 110 (or control application 104) may remediate the presence of the unauthorized mobile device. For example, the networked beacon 110 (or control application 104) may report details of the unauthorized mobile device to the management server 114. In addition to the information determined by the networked beacon 110 (or control application 104) described above, the networked beacon 110 (or control application 104) may also obtain other information provided within the observed advertising packets or scanning request packets. For example, the networked beacon 110 (or control application 104) may detect, in an advertising packet, whether a manufacturer-specific field is provided. If so, the networked beacon 110 (or control application 104) can ascertain the manufacturer of the unauthorized mobile device. As another example, the networked beacon 110 (or control application 104) can identify known patterns identified under controlled settings. Doing so enables the networked beacon 110 (or control application 104) to use fields, timings, flag sets, and other statistical analyses to identify the device. In addition, the networked beacon 110 (or control application 104) may report details of other mobile devices within the vehicle regardless of whether the other mobile devices are unmanaged. As yet another example, the networked beacon 110 (or control application 104) may ascertain usage of the unmanaged device based on advertising packets transmitted by the mobile device. For example, it is known that advertising packets sent from APPLE devices have various action codes. These action codes enable the networked beacon 110 (or control application 104) to infer whether the unmanaged device was in use. Using this data, the networked beacon 110 (or control application 104) may determine, for example, whether the phone is actively in use, if the user is on a phone call, or if the screen is locked. The networked beacon 110 (or control application 104) may also determine what major iOS version the device is executing based on the advertising data format and if the unmanaged has a wireless peripheral device connected thereto. For instance, the networked beacon 110 (or control application 104) may leverage the action codes to determine for example that if a type code is 11, the peripheral device corresponds to a watch wearable. The networked beacon 110 (or control application 104) may parse the first byte after the length to determine an action code by parsing out the least significant nibble of the byte. For example, if this value is 14, then the user is either on a phone call or video call. As another example, a type code of 16 indicates an APPLE Nearby Message.

Further Context-Based Mobile Device Management Techniques

The techniques described herein enhance mobile device management capabilities by dynamically managing MDM configurations, profiles, commands, and related functionality based on context. As previously described, context can be determined through various means. Specifically, a mobile device 102 can sense the context through beacons (e.g., the networked beacon 110), cellular, GPS, magnetometer, time or any additional sensors found in or around the mobile device 102. When sensing the context that a mobile device 102 is currently in, the device (or one or more external peripheral devices such as control devices 108) can report this context based on various triggers, such as on boundary changes or regular intervals to a MDM cloud platform (e.g., as described relative to FIG. 1, or some third-party cloud platform). These cloud platforms can then apply any set of MDM commands, profiles, or queries to either change or determine the state of the mobile device 102.

As known, APPLE hosts a push notification service (APNS). A MDM cloud platform (e.g., adapted to the environment 100 of FIG. 1) may provide multiple services that include serverless computing services, servers, and API endpoints. In an embodiment, one of these services can include a contextual MDM (CMDM) service that communicates with both the APNS and the mobile device. For example, the management service 116 may incorporate such features of the CMDM service. Generally, the term CMDM can broadly be applied to any system capable of communicating with the mobile device via APNS or any mechanism. In addition, the term CMDM can apply to any system (e.g., within the MDM cloud platform) capable of changing MDM based profiles, querying the mobile device or issuing MDM related commands to the mobile device. In one implementation, when the CMDM service determines that a new command is to be pushed to a mobile device, the service sends a command to the APNS. In turn, APNS may push a command to the mobile device 102, which notifies the mobile device 102 that a command ready to be received. The mobile device 102 may then attempt to retrieve the command from the CMDM service and execute the command if the mobile device 102 is in a state that it can execute.

APPLE can classify a mobile device 102 as a supervised device or a non-supervised device. A supervised device can have additional settings applied to it. Many of these additional supervised settings can drastically change the experience of the mobile device 102. APPLE generally manages mobile devices through commands and queries. Doing so allows the users to install and remove managed profiles, such as a configuration profile. Typically, a configuration profile has payloads that can be included therein. Each payload allows for a more granular control of the mobile device 102. As further described herein, techniques can be used to leverage these payloads in performing mobile device management.

Note, while many of the following examples are applicable to APPLE MDM profiles and payloads, the concept of a CMDM service altering or modifying the behavior, features, and or functions of the mobile device 102 based on context is not limited to just APPLE devices but rather can be adapted to any mobile device OS and service. The APPLE-specific examples are just some of the many possible scenarios and technologies that can adapt the broader inventive concept.

One payload of the configuration profile is the restrictions payload. This payload can apply different settings which would enable or disable certain features of a mobile device 102. One such example is "allowAirDrop" which would allow a mobile device 102 to use AirDrop if the value is set to true.

In addition, a supervised device has a feature known as the single app mode. In this mode, a mobile device 102 can be limited to a single application view. Such a view may be beneficial if the corporate safety manager wants to prevent use of any additional application while a vehicle is in motion other than the control application 104. This can be enabled and disabled through the use of a contextual mobile device management restrictions payload. APPLE also supports the concept of autonomous single app mode, allowing applications to enter and exit this state.

Another supervised device setting found in the restriction profile payload is the "whitelistedAppBundleIDs" setting. When a mobile device 102 detects being in a contextual area that requires certain application access, the CMDM service (e.g., the management service 116) can enable a whitelisted applications list that includes which apps can actually be visible and used by the user. For example, when a mobile device 102 is in a vehicle environment and it senses that the vehicle is in motion, the control application 104 can notify the server to enable the whitelisted application restrictions for its policy associated with the vehicle context. The vehicle whitelisted applications could include any application, however its common for navigation applications or other applications that are deemed safe to be utilized while the vehicle is in motion. The same concept can be applied to any context. Such as on a construction site, the allowed applications may consist of work order, or building schematic applications. Another scenario for the restrictions payload is the use of the "blacklistedAppBundleIDs" setting, which specifies applications specifically not allowed. An example may be to remove access to messaging applications only. Another example could be when the mobile device 102 leaves a work context, such as the end of a shift, applying a blacklist which prevents access to all business-related applications. The above are only a few examples of what can be accomplished with the restrictions payload. The CMDM service can apply any number and combination of restriction profiles to produce the desired experience based on the context.

The home screen layout payload can be beneficial when used in combination with the whitelisted application or blacklisted applications. This payload handles moving app icons between different display pages and onto or off of the dock at the bottom of the screen. The CMDM service may use this payload in combination with various profiles to prevent users from needing to scroll multiple pages to find which applications they are allowed to use in the context domain. This may also be useful for putting frequently used applications (according to context) on the bottom dock or first page of the display screen.

The notifications payload allows the CMDM service to limit notifications that can be presented to a user is in a given context domain 112. For example, while a user is driving, a given MDM policy might require that a user does not receive any notifications outside of the whitelisted application list. The control application 104 can then disable the notifications for each app not contained in this list. The control application 104 may restore notifications when the user leaves the vehicle thereafter. In another example, there may be applications that are whitelisted and deemed safe for a given context, but an administrator of the management service 116 wants to prevent incoming notifications from causing distractions. As a result, the management service 116 may notifications selectively disable or silence even for applications that are otherwise allowed to be used in that context. In other examples, the delivery mechanism of the notification can be adjusted (e.g., not allowing notifications to show on the lock screen of the device while in a high security or sensitive area).

One way to increase the awareness of which context domain 112 an user is in is to use lock screens, home screens, and notifications area on the mobile devices 102. One example of achieving such awareness is via the lock screen message payload, in which the control application 104 can change the text that appears at the bottom of the lock screen identifying what contextual area the mobile device 102 is in without needing to open an application. In another example, we may change the background of the home screen or lock screen to indicate the current zone or context information that is applied.

The VPN payload ensures that the mobile device 102 is communicating over a secured network. One example could be enabling this feature when the user leaves the context domain 112 (e.g., a corporate office) or is using cellular data instead of WIFI. Doing so can ensure that company data on the mobile device 102 is not accessible through an unsecured network. In addition to the VPN payload, the CMDM service may apply a web content filter payload to restrict which traffic someone can view when entering a context domain 112. This is beneficial if the individual arrives at an office context domain 112 and the office has a web filter policy even when using cellular data.

Another one of the commands that APPLE allows the CMDM service to manage a device is through Lost Mode, which mode allows the service to get the location of a mobile device 102 and prevent use thereof until the service disables the mode. When lost mode is enabled, the control application 104 can play a sound or display a message on the lock screen directing instructions to the user of the mobile device 102. The CMDM service is able to dynamically manage putting the mobile device into and out of lost mode based on context.

For instance, the CMDM service may create a region where the mobile device 102 should remain within. The control application 104 on the mobile device 102 could sense the mobile device 102 is within this region and maintain a specific policy during this time. When the mobile device 102 leaves this region, the CMDM service can activate the lost mode.

As an example, assume that a hospital maintains a number of mobile devices that should not leave the hospital. One or more geo-fences and or networked beacon 110 combinations could be used to define zones within the hospital. As the user approaches a defined exit area or otherwise attempts to leave the hospital, the CMDM service can perform various actions. For example, a text to speech message or sound file could be played alerting the user that the mobile device should not leave the facility. Visual alerts and messages can also be used to inform the user to not continue leaving the facility with the mobile device. Instructions can also be included for how to properly return the device. As the mobile device 102 continues to leave a given zone, the mobile device 102 could encounter more geo-fences, beacons 110, or other contextual clues indicating the device is still leaving the hospital. At this point, alerts could be sent to supervisors, security personnel, or other individual specifying information, e.g., that a mobile device 102 is leaving, what exit, and other relevant information about the event. As the content continues to change or indicate the device 102 has left the hospital, the CMDM service can apply various policy combinations to restrict access and protect the asset.

One example could be to remove all applications that contain patient information. Another policy may be to remove access to all applications and disable network access. Another policy could be to automatically place the device into lost mode. The control application 104 can also be used to continue alerting the user with instructions on how to return the device and what is occurring. The control application 104 can also be used to track the device and alert administrators on its current location. Once the mobile device 102 is back inside the hospital the CMDM service could automatically restore access and/or remove the various policies and commands that were issued. A notification could also be sent to various personnel informing them the device has been returned.

Another MDM command that APPLE allows is based around media management. The CMDM service could automatically install media based on a context domain 112 with which a user is coming into contact. In one example, when an electrician arrives at a new facility the CMDM service could trigger an install of schematics and other documentation that might be required when on site at that location. Another example could be safety notices that the user is required to read before continuing further into the plant. Once the user has left the facility the relevant media could then be removed to prevent clutter on the device, save storage space, or to ensure proprietary information is protected outside of designated zones.

User management is another area that APPLE has implemented commands One command is to force logout a user from an enterprise network or the mobile device 102. This could be useful in jurisdictions in which strict employee laws prevent users from working after hours. When the user is no longer on shift, the CMDM service may receive a notification from the control application 104, which would log out a user. If the user attempts to log back into the mobile device 102 control application 104 would report this action and log the user back out of the mobile device 102 again while reporting this to their administrator.

Another common use case is when a mobile device 102 is used for both personal and business. While the user is on personal time and away from a given context domain 112, the CMDM service can apply a profile that gives access to all the personal apps while potentially restricting access to business apps. As the mobile device 102 transitions to a context domain 112 indicating that the mobile device 102 is being used for business, the personal apps can be removed and the business apps restored.

The MDM platform may use all of these previously described commands and payloads in multiple different contexts. This allows administrators to identify which payloads and commands need to be triggered in which situations allowing for a more customized experience for the user. In general, the CMDM service can be triggered by anything over a network connection. This allows the list of actions that can trigger a wide variety of CMDM commands.

For instance, continuing the previous example of the hospital and geo-fence zones, the CMDM service may issue specific commands or profiles triggered through entering or exiting the defined geo-fence region. One example of this is when a user enters a restricted geo-fence, the restrictions profile is modified to reduce the set of applications the user may access. Another example is the concept of an inverted geo-fence. An inverted geo-fence pertains to instances in which the mobile device is not currently in a defined geo-fence area. Continuing the hospital example, there may be various geo-fences surrounding one or more hospitals, such as a geo-fence that indicates the device is within the hospital, a second geo-fence indicating that the device is now in the parking lot, and an inverted geo-fence which is active anytime the user is not within one of the aforementioned defined areas. This concept is useful for asset protection scenarios. Once the mobile device 102 is no longer in any defined geo-fence area, the CMDM service may determine the mobile device 102 to be out of compliance. The CMDM service may then use various mechanisms as described previously to notify the user to return the device and to restrict access to the device.

When dealing with geo-fences, it is sometimes required to have multiple geo-fences covering the same area. There are many ways to handle interaction between multiple geo-fences. One such mechanism is to apply the geo-fence that is closest to the mobile device 102 as defined by the distance from the central point. Another mechanism could be to use the same central point for multiple geo-fences but with different radius. In the hospital example, a geo-fence may have a central point within the hospital with a radius that covers the interior of the hospital. Further, a second geo-fence using the same central point but with a larger radius covering the parking lot. By using the geo-fence with the smallest radius when the distance is equal, one can smoothly transition between various overlapping geo-fences.

Another action could be from the lack of communication between the mobile device 102 and the management server 114. In one instance, the mobile device 102 can be configured to report to the management server 114 in at a specified frequency or time. The server 114 may run a timer at the specified frequency, and if the mobile device 102 does not appear to have reported, the CMDM service may deploy a set of commands to the mobile device 102. Any combination of commands or profiles could be sent based on this lack of communication. In one example, the CMDM service could enable lost mode. In another example, the CMDM service could apply a white list or blacklist profile restricting application usage, lock the screen, and change the lock screen message to instruct the user to open the control application 104 to allow for server communication. Thereafter, once the control application 104 is opened, the application 104 could prompt the user to fix any permissions or additional issues. Once the application is back in compliance, a command can be sent to re-enable the device 102, such as restoring access to applications.

In another scenario after a certain number of time periods without the mobile device 102 receiving communication with the CMDM service, a message could be sent to the users supervisor to allow him to investigate the issue in person.

Another action that could cause the CMDM service to send some commands could be running or walking. In one example, assume an employee works in a chemical plant, in which a geo-fence is defined around the inside perimeter of the plant. Further assume that this employee has spotted a chemical spill and proceeds to run from the spill. When the mobile device 102 senses that someone is running within this geo-fence, the CMDM service can then perform various actions such as but not limited to alerting all users that there is an evacuation notice and to leave the area.

Another context may be the act of walking. While a user is stationary, the CMDM service may allow access to applications defined for the given context domain 112, but once the user is no longer stationary (e.g., the user is walkin), the CMDM service applies a new profile to prevent interactions with the mobile device 102 until stationary again.

With a controlled area for entering and exiting a location, an administrator can reduce the overall amount of hardware required for managing a policy in a specific context domain 112 without GPS data. One example involves airport employees who help the planes arrive and depart. These employees go through a specific security check area before being allowed onto the job site. When the mobile device 102 of an employee passes through this area and sees a networked beacon 110 identified as an "Entrance Beacon" then the control application 104 sends a request to the CMDM service to limit the applications available, or perform other MDM commands to reduce accidents while on the job. Doing so allows the employee to move freely throughout without the need of coming into contact with additional beacons 110 or the location of the employee being tracked. Doing so allows for a minimal infrastructure implementation and reduces privacy concerns over location being shared. The mobile device 102 will remain within this context until a new context change is detected. For example, when the employee is finished for day, the employee would exit through the security area and come into contact with a networked beacon 110 identified as an "Exit Beacon," which can indicate the context has changed.

In other scenarios, there may be complex environments with many different active zones and/or contexts. For example, assume a mobile device 102 is being used at a construction site. A geo-fence covering the primary site may restrict access to just the applications relevant for the construction site. Within this construction site, networked beacons 110 may be affixed to forklifts or other equipment. Policy may specify that, when using a forklift, access to all applications is restricted. Therefore, the determination of context and appropriate policies should be capable of joining multiple factors together (e.g., while on the forklift apply the policy to remove all activity, but once off the forklift revert back to the geo-fence policy).

In addition to actions that are triggered by physical areas or lack of communication with the servers there can be actions triggered by time. As an example, an employee's schedule can be uploaded to the management server 114 reporting when the employee is supposed to be working. During these work hours, the mail application and other productivity apps are whitelisted while entertainment apps are blacklisted. When the employee is off the clock, the opposite payload is pushed to the mobile device 102, which results in the user not being allowed to access work based applications but allowed to access the regular entertainment applications.

Using all of these contextual actions, MDM commands, and MDM configuration payloads a large set of possibilities exists. With the ability to overlap across these possibilities there may need to be a broker service to handle all of the interactions and apply the needed configurations for these operations. The broker service may be cloud based, part of the CMDM service, or within an application on the mobile device or OS. The broker service could have a setting from the administrator which dictates in which manner to apply policies that overlap or conflict. Such as to apply the most or least restrictive or some custom hierarchy of settings.

The broker service may track current active policies for the mobile device 102 and communicating the associated set of settings across all policies. The broker service may store the currently enabled policies for each mobile device. When the broker service receives a new policy or if one of the current policies expires then the broker service will trigger a recalculation of the active settings applied by the CMDM service and apply the settings based on various rules defined.

If the administrator chooses to have the most restrictive policy then the broker would take all the active actions and perform a union of the current restrictions each action is trying to apply and then apply that union of commands as needed. Conversely, if the administrator chooses to have a least restrictive policy then the CMDM service may classify each setting in the active policies and choose the ones that are the least restrictive. In one example, if the geo-fence has a setting to deny all applications but the context domain 112 the user is currently in within allows navigation applications, the CMDM service would opt to allow only navigation applications.

Putting all the various contexts, unauthorized device detections, and MDM commands, restrictions, and policies together can result in complex and dynamic environments. One such example would follow a typical worker throughout their day. Starting in the morning, the worker may be at home. During this personal usage context, the mobile device 102 applies various MDM profiles resulting in the worker having access to all applications except for highly sensitive business apps. Later that morning the worker enters a vehicle context domain 112. The CMDM service then applies a policy limiting notifications and applications to navigation-related actions. Once the worker arrives at the job site (e.g., defined by a geo-fence), all personal applications are restricted but access to business apps are allowed. The worker then enters a specific section of the job site and new content and media is automatically sent to the mobile device 102 of the worker to enhance productivity. Further, the worker might then enter a highly sensitive area in which camera functions of the mobile device 102 is disabled by the CMDM policy. In addition, a rogue device detection system can also be used to identify instances in which there are more devices in the high security area than are currently being managed and thereby alert an administrator that an unauthorized device (potentially capable of taking photos) is active in the secure area. Later the worker returns home, and the policy changes back to the personal time policy.

In many situations techniques described previously utilizing various BLUETOOTH profiles, such as HID and ANCS techniques, may be required to implement the applicable policy. In other situations, foregrounding via means such as VOIP calls may be appropriate. These other situations are based on various factors which may prevent the CMDM service from applying the correct policy.

One such example could be a user driving a vehicle. In this scenario, the CMDM service may attempt to apply a new policy which restricts notifications and applications to navigation-related actions. However, due to OS limitations that do not allow new restriction profiles to be applied until the device is unlocked, the profile is not immediately applied. Other scenarios requiring the use of these other methods could be during instances in which the user is outside of network coverage. Therefore, other mechanisms described previously are used to eliminate distractions (e.g., such as using ANCS to silently dismiss notifications, VOIP calls for foregrounding, and HID keyboard presses to keep the user on the lock screen).

Further, in an embodiment, the networked beacon 110 may send out broadcasts as a beacon (e.g., using APPLE's IBEACON protocol built into iOS devices or third-party beaconing protocols, such as EDDYSTONE for ANDROID devices). Doing so allows the mobile device 102 to more quickly recognize a networked beacon 110 in a given area. The control application 104 may register to receive notifications in the event a networked beacon 110 comes into range or crosses a given proximity boundary around the mobile device 102. Generally, if the mobile device 102 has sent a notification when coming within proximity of the networked beacon 110, but the underlying hardware beacon and the mobile device 102 are no longer moving in relation to one another, then the control application 104 receives no additional notifications. To ensure that the control application 104 receives periodic additional notifications and keeps the control application 104 active while the mobile device 102 and the networked beacon 110 are stationary, broadcast information may be rotated. Particularly, the mobile device 102 may register with the operating system for multiple beacon broadcast information. In turn, the networked beacons 110 may broadcast a first set of beacon information for a short time period, stop broadcasting for another short time period, and move onto the next set of beacon information. The networked beacon 110 may repeat this process until reaching the last registered beacon broadcast information and returning to start with the first set of beacon information again. Doing so causes the operating system to come in range and out of range of the beacon broadcast information without requiring the mobile device 102 to be in motion.

Further, declarative management enables the mobile device 102 to locally store a range of configurations. Doing so allows for the control application 104 (or possibly a connected hardware device), to modify the permissions locally without having to receive any communication from the management server. This could be useful to modify a set of restrictions when the user is in an area with poor service reception. For instance, one use case in which this would be beneficial is if the user has enabled Airplane Mode on the mobile device 102 to attempt to retain their list of allowed applications when entering a restricted zone (established by geofence, beacons, running, or any type of zone discussed herein). Normally upon entering the contextual zone, the user would receive a new configuration profile from the CMDM service that reduces the set of allowed apps. In this case, without declarative management, the user would retain all current applications when entering the contextual zone since the CMDM service would be unable to install a new configuration profile due to Airplane Mode being enabled. Using declarative management, when the user enters the contextual zone, the control application 104 may determine that a new contextual profile is required and modify the profile locally to match the settings that should be configured for this area.

Transmissions Using BTLE Protocols

BLUETOOTH low energy (BTLE) wireless technology is an ultra-low power (ULP) 2.4 GHz RF technology designed to bring wireless links to products that currently use: proprietary wireless that is unable to communicate with other wireless protocols; wired connections; or have (at present) no wireless communication provision but would benefit from one.

BLUETOOTH low energy (BTLE) wireless technology is a ULP wireless solution featuring: Ultra-low peak, average and idle mode power consumption; Ultra-low cost plus small size for accessories and human interface devices (HID); Minimal cost and size addition to handsets and PCs; and Global, intuitive, and secure multi-vendor interoperability.

BLUETOOTH low energy (BTLE) wireless technology was designed from the outset to be a ULP technology whereas classic BLUETOOTH technology is a "low power" wireless technology. This difference dictates that the operational characteristics of BLUETOOTH low energy wireless technology and classic BLUETOOTH wireless technology are opposites. Classic BLUETOOTH wireless technology is a "connection oriented" radio with a fixed connection interval ideal for high activity links like mobile phones communicating with wireless headsets. Among several measures to reduce the power consumption, BTLE wireless technology employs a variable connection interval that can be set from a few milliseconds to several seconds depending on the application. In addition, because it features a very rapid connection, BLUETOOTH low energy wireless technology can normally be in a "not connected" state (saving power) where the two ends of a link are aware of each other, but only link up when necessary and then for as short a time as possible.

There are three characteristics of BLUETOOTH low energy technology that underlie its ULP performance (i) maximized standby time, (ii) fast connection, and (iii) low peak transmit/receive power. BLUETOOTH low energy technology uses just three "advertising" channels to search for other devices or promote its own presence to devices that might be looking to make a connection. In comparison, classic BLUETOOTH wireless technology uses 32 channels. This means BLUETOOTH low energy wireless technology has to switch "on" for just 0.6 to 1.2 ms to scan for other devices, while classic BLUETOOTH wireless technology requires 22.5 ms to scan its 32 channels. Consequently, BLUETOOTH low energy wireless technology uses 10 to 20 times less power than classic BLUETOOTH wireless technology to locate other radios.

Once connected, BLUETOOTH low energy wireless technology switches to one of its 37 data channels. During the short data transmission period the radio switches between channels in a pseudo-random pattern using the Adaptive Frequency Hopping (AFH) technology pioneered by classic BLUETOOTH wireless technology (although classic BLUETOOTH wireless technology uses 79 BLUETOOTH low energy wireless technology features a raw data bandwidth of 1 Mbps)—greater bandwidth allows more information to be sent in less time. A competing technology that features a bandwidth of 250 kbps, for example, has to be "on" for eight times as long (using more battery energy) to send the same amount of information. BLUETOOTH low energy wireless technology can "complete" a connection (i.e., scan for other devices, link, send data, authenticate and "gracefully" terminate) in just 3 ms. With classic BLUETOOTH wireless technology, a similar connection cycle is measured in hundreds of milliseconds; more time on air requires more energy from the battery.

BLUETOOTH low energy wireless technology also keeps a lid on peak power in two other ways: by employing more "relaxed" RF parameters than classic BLUETOOTH wireless technology, and by sending very short packets.

When using BTLE to communicate vehicular status data to one or more mobile devices, there are several things to consider. By default, BTLE allows for the communication of data without requiring pairing. The BTLE specification also allows for multiple devices to be simultaneously connected and sharing data. However, in practice, it has been found that most BTLE modules on the market can only support one device connected at a time. This introduces issues if more than one person or mobile device is in the cabin of the vehicle. To overcome this limitation, several workaround methods have been developed.

In one method, a unique identifier is embedded in the BTLE advertising data, so the mobile device can immediately recognize the unit as the one with which it will interact. In addition, vehicle status information can be embedded into the service UUID being advertised. In this manner, it is possible to transmit basic information, such as moving, not moving, and vehicle off status information by utilizing 3 different service UUIDs. The service UUID that is present indicates which mode the mobile device should be in. Utilizing this method, it is possible to prevent the mobile device from initiating a "connection" to the BTLE device. By not connecting, it is possible to have multiple devices simultaneously retrieve vehicle status data.

In addition to utilizing the service UUID, it is possible to overwrite the advertising data with additional information, such as, for example, using an approach outlined previously consisting of various frames of data. This allows the system not only to communicate vehicle status without connecting, but also to communicate additional vehicle metrics, such as braking, mileage, and speed.

In another implementation, it is possible to create a custom BTLE profile. This profile has multiple characteristics consisting of ASCII strings. Once the mobile device connects, it will read all characteristics. Once all characteristics are read, or a timeout is exceeded, the mobile device automatically disconnects from the BTLE device. In an alternative implementation, these characteristics can use the BTLE indication mechanism. Using the indication mechanism, the remote BTLE device can determine when the mobile device has read all of the characteristics. The BTLE unit will then disconnect the mobile device. Having the external hardware device automatically disconnect the mobile device at a set interval or at the completion of reading characteristics is critical to ensure multiple devices can retrieve the requested data in a timely fashion. This allows one unit to service multiple mobile devices and prevents possible denial of service.

Data can be retrieved via BTLE in multiple manners. For example, multiple custom characteristics are pre-defined. More than one custom characteristic is necessary since there is a length limit on a single characteristic, and the sum width of available data fields will likely exceed that value. These characteristics will be read-only by the client, and are configured such that the client is notified when the characteristics change.

Another method for BTLE data transmission is to use two custom characteristics. The first characteristic will hold a chunk of data—the next chunk of the data in the stream of data to be transmitted. The second characteristic will be readable and writable by the BTLE client, with notify enabled. It will be in one of two states. In state A, it will indicate that there is a new chunk available to be read. After the client has read the chunk, it will write state B. The BTLE server will then see that the client has read the chunk, and will load the next chunk, again setting the state back to state A.

Further, instead of BT or BTLE communications, it is also possible, in alternative embodiments, for WIFI to be used as a means for transmitting or broadcasting vehicular status data from the control device. Such information may be streamed over WIFI directly from the vehicle to a receiving device. In a mechanism similar to non-pairing BLUETOOTH implementations describe previously, the SSID of the WIFI network may be altered to communicate vehicle status. Furthermore, a web service could be running on the control device within the vehicle. Again, such device or hardware may be either aftermarket or OEM installed. This web service would respond to various queries indicating the state of the vehicle to such receiving device.

In an alternative embodiment, audio itself could also be used to transmit or broadcast vehicular status data. Using DSP techniques, data can be transmitted from the vehicle to software on mobile devices within the vehicle or to software being run by or on the vehicle itself. Essentially, any of the techniques used in analog modems may be used here, since the basic constraints are the same: transmit data via audible sounds over a noisy channel. These techniques include frequency modulation, amplitude modulation, or phase modulation. The number of different allowed frequencies/amplitude/phases will determine throughput, with more allowing higher throughput, but less allowing better operation in high signal-to-noise environments. Combinations, where more than one of these factors is modulated, may also be useful. Also, error detection schemes, such as parity or CRC32, are useful for finding and correcting errors.

Further, in some implementations there may be advantages to having systems, methods, and devices that can detect mobile devices in the vehicle without the need for any custom software running on the mobile device. Such systems, methods, and devices are implemented using the main controller or control device, as described above, as a monitoring device that is mounted, installed, or otherwise built into a vehicle or other controlled environment and is used to detect the presence of mobile devices in the vehicle or other controlled environment.

In one embodiment, such main controller or control device or monitoring device uses an antenna to receive cellular signals, especially the uplink bands. By measuring the power in these bands, the system is able to detect the presence of a mobile device in the vehicle. Mobile devices typically transmit and communicate with remote servers through the uplink frequency bands. Therefore, by looking at these specific bands, one can determine if a mobile device in the vehicle is requesting and/or uploading data.

The uplink bands and their frequency ranges differ from carrier to carrier and from region to region. Additionally, there are specific uplink bands for GSM and CDMA, UMTS (commonly known as 3G), and LTE (commonly known as 4G). By observing as many uplink bands as possible, the system can increase the success rate in detecting the presence of a mobile device within the vehicle or controlled environment regardless of carrier.

In one implementation, all desired uplink bands are monitored simultaneously. This is achieved by passing the received RF signal from the antenna through a splitter so that filters of correct center frequency and bandwidth can be used only to pass signals in those bands. A low noise amplifier (LNA) may be added after the filter to normalize each output power level before being fed into one or more power detectors. Optionally, a combiner can be used to feed the filtered signals into a single power detector. This approach is simplest in implementation. It also continuously monitors all bands. However, it has poor signal-to-noise ratio (SNR) due to the cumulative attenuation introduced by the components. Another downside is that, using this approach (absent further processing or tagging), the information regarding which band contains the signal is lost or not captured.

In another implementation, instead of feeding the received RF signal into a splitter and combiner, a switch is used. This mitigates the poor SNR of the previous approach, but at the cost of greater complexity as logic is required to control the switches. In addition, timing constraints now exist on when the power detector output is valid. Also, because all bands are not monitored constantly (if a single antenna is being used), short uplink pulses may be missed (e.g., sending of a text message on one band while another band is being monitored).

In another implementation, the RF signal is routed from the antenna to a mixer. The mixer is also connected to a voltage-controlled oscillator (VCO). By controlling the VCO, the signal can be frequency-shifted. An advantage of shifting the received RF signal around is the ability to use a single filter. The bandwidth of the filter is chosen to be the bandwidth of the narrowest noncontiguous band to be detected. Wider bands are swept across in multiple steps. This approach has low attenuation and allows identifying the band of the signal. However, complexity is high as logic is required to control the switches and timing constraints now exist on when the power detector output is valid. Also, because all bands are not monitored constantly, short signals may be missed. A second implementation with the mixer and VCO includes shifting the received RF signal to a lower frequency for less hardware intensive analysis. With the RF signal shifted downward, Fourier Transforms and Inverse Fourier Transforms can be computed and processed with minimal delay.

In another implementation, the RF signal is routed from the antenna to a mixer. The mixer is also connected to a VCO. By controlling the VCO, the signal can be frequency-shifted into one of multiple-sized bandwidth filters. Filters are available to match the specific bandwidth of the bands of interest, so no sweeping is necessary—in contrast with the previously-described approach.

In each of the approaches above, one or more low noise amplifiers may be added to try to reduce SNR degradation due to attenuation. This is especially important in approaches that have high attenuation and medium-to-low power levels. Low noise amplifiers (LNAs) are placed immediately after the antenna, immediately before the power detector, or both.

Splitters and combiners mentioned above may be chosen from two categories: lossy and lossless. Lossless splitters are not actually lossless, but simply minimize the loss to that which is physically necessary. For example, a 2:1 splitter will have half the power at each output as compared to its input, a 3:1 splitter will have a third of the power at each output as compared to its input, etc. Lossy splitters have a resistive element that increases losses beyond those minimally required. Lossless splitters typically require more circuit board space, and have a narrower bandwidth than lossy splitters.

In the above approaches, different components and different frequencies may have different degrees of attenuation. For example, multiple filters in parallel may have different degrees of attenuation in the passband. In this case, LNAs can be used to compensate for these differences. In dynamic implementations, such as those that use a switch or a mixer, the LNA can be tuned to compensate for the present configuration.

A fixed or variable attenuator could be used in place of the compensating LNAs mentioned above. This would most likely be used in combination with a fixed LNA. This approach has the advantage of being cheaper and using less power, but the disadvantage of decreasing SNR.

In another implementation, a field-programmable gate array (FPGA) is used to process the signals via a Fast Fourier Transform (FFT) or other Digital Signal Processing (DSP) techniques, which provide the speeds of the hardware implementation with the flexibility of firmware to create adjustments or fixes. For example, this approach enables the frequencies being monitored to be modified using a firmware update at a later date. This implementation could be implemented in any portion of the systems described above—including anywhere from analysis of the raw signal coming from the antenna to the DSP analysis of the power detector. In applications designed to determine whether or not there is a mobile device in the driver space of a vehicle, it is critical to eliminate, or minimize as much as possible, false positive determinations (i.e., when the mobile device is actually outside of the driver space of the vehicle).

One source of potential false signals includes cell towers. Cell towers transmit on downlink frequencies that are very close and sometimes directly following the uplink frequencies the above-described techniques and systems are designed to detect. There are a number of approaches for addressing this source of potential false signals.

In one approach, the filters being used are set to as narrow a bandwidth as possible. In another approach, a mixer with a narrow bandwidth filter is used to "zoom in" on the exact frequency of the signal. In another approach, the signal is monitored while the vehicle is in motion. Typically, as the vehicle moves, cell tower noise power will vary as the distance between the vehicle and the cell tower changes. In contrast, in-vehicle mobile device signal power remains relatively fixed even while the vehicle is in motion.

In addition to the uplink bands, the downlink bands hold useful information as well. Another method for helping determine the presence of a mobile device and checking for false positives is to monitor both the uplink and downlink pair of frequencies. By knowing the signal strength of the downlink towers, it is possible to estimate the power decrease or power amplification the mobile device will use when transmitting different distances to reach the cellular tower. For example, if the system detects a potential "rogue" mobile device through a certain uplink band, the system can then examine the paired downlink frequency as a power level comparison. If the mobile device is transmitting at very low power, then that means the cellular tower is nearby and the mobile device is not having to add more power into the transmitting antenna in order to maintain a communication link with the cell tower. However, if the mobile device is transmitting at a very high power, then that means the cellular tower is far away and the mobile device is amplifying its output to aid in maintaining a stable connection. The expected result for a mobile device being detected within the vehicle is that there will be a correlation between the power levels of the uplink and downlink bands.

Another method for helping determine the presence of a mobile device and checking for false positives is to use the signal strengths of the downlinks to determine thresholds for the paired uplink. This method utilizes all available data to help prevent false triggers. For example, if a very large signal strength in AT&T's LTE downlink band is detected, the system can adjust its threshold for AT&T's LTE uplink band to a lower threshold. Inversely, if AT&T's LTE downlink band signal is very low, the system can increase the threshold for AT&T's LTE uplink for mobile device detection. A cellular modem used by the system and installed inside a vehicle can also be used to help determine the downlink strengths of the carrier being used by the cellular modem. This approach allows for a faster calculation of the upload strengths and quicker mobile device detection than merely waiting for the mobile device to download data.

It will also be understood that anomalous or broken transmitters may emit power in any band, including the uplink bands monitored by the system. While these are not allowed by FCC rules, these signals nevertheless may still be present in real-world environments. It is possible to determine if signals are coming from anomalous or broken transmitters by monitoring such signals as the vehicle moves. Similar to determining if signals are coming from an external cell tower, the source of noise from anomalous or broken transmitters will vary as detected by the system antenna as the vehicle moves relative to such signal, while in-vehicle mobile device signal power will remain relatively fixed/stable.

The transmissions of mobile devices in other vehicles will, obviously, be in the uplink bands monitored by the system. Again, it will be appreciated that such signals in other vehicles will vary as the vehicle in which the system antenna is located moves relative to such other vehicles. In contrast, the in-vehicle mobile device signal power will remain relatively fixed during uplink periods. The signal power of a mobile device can adjust depending on the distance of the cell tower with which it is communicating, but that signal power adjustment will typically be a relatively low difference over time and, thus, should not significantly impact any of the implementations described above.

Another implementation uses the antenna of the main controller or control device to monitor all uplink bands by itself, without the aid of any other external sources, to determine if any mobile device is present and cellularly-active instead of being off or in airplane mode. For example, if a company's policies state that ALL mobile devices must be turned off or in airplane mode during trips and the system detects that a user is not following this restriction, an alert can be sent by the system to the administrator or contact point for the company.

Since most restrictions and/or monitoring of mobile device usage within a vehicle are targeted at mobile devices within the driver's space of the vehicle, it is still necessary to be able to distinguish when the mobile devices is being used in the drive or passenger seat with the present system. For example, if the mobile device is in the passenger seat, the system will still detect transmissions from such devices in the uplinks bands, and the system will still be able to determine that the signal is coming from within the vehicle and not from a source outside of the vehicle. There are multiple ways in which the output of the power detector can be used to determine the presence of a mobile device transmission. In one implementation, an absolute threshold is used and whenever the power detector output exceeds that threshold, the system determines that a mobile device is "transmitting." In another implementation, the system establishes a noise floor and monitors for a minimum signal-to-noise ratio (SNR).

In yet another implementation, the timing patterns that a mobile device uses in communication with a cellular tower are measured, and then the system analyzes for similarity among those timing parameters, potentially in addition to the techniques described above, to determine the presence of a mobile device transmission. Similarity can be measured using several digital signal processing (DSP) techniques, including but not limited to dynamic time warping.

In a finer-grained version of the above implementation, timing patterns can be studied to determine differences in these patterns in different operation scenarios, such as sending a text, making a call, or other data activity. Again, the system analyzes for similarity among those timing parameters using several DSP techniques, including but not limited to dynamic time warping.

The antenna in the control device may act as the primary cellular signal detector. Any other antennas or antenna sandwiches included within the vehicle or controlled environment communicate with the control device using conventional wired or wireless communication techniques and protocols. The control device is configured to determine if external antennas/antenna sandwiches have been installed within the vehicle or controlled environment and is further configured to determine if any such antennas or antenna sandwiches have been installed incorrectly or otherwise tampered with. For example, if the antennas of an antenna sandwich are installed in reversed configuration, the control device may include software that is able to invert the logic and properly account for the orientation in which the antenna sandwich has been installed. For example, if there is an antenna sandwich between the passenger and the driver's seat and another antenna sandwich behind the driver's seat and if the main antenna and the antenna sandwich behind the driver determines that a mobile device is being used in the driver's seat, but the antenna sandwich between the driver and passenger has a strong passenger signal and weak driver signal, then the system has a strong confidence that the orientation of the antenna sandwich between the driver and passenger seats has been reversed. This installation determination would then be stored in memory in the control device to ensure that signals received from that antenna sandwich would be correctly oriented over time and across different trips.

When there is an allowed mobile device in the vehicle, placed in its holder or cradle, it may still be desirable for the system to detect the presence of other mobile devices in the driver's area of the vehicle. The system must subtract out the signal from the allowed mobile device. In one implementation, the system determines on which band the allowed mobile device is operating, and ignores that band at all antennas when looking for additional mobile devices. Most mobile devices will use different uplink bands depending on the activity (mobile device call versus data transmission, for example). Therefore, the "band white-listing" must be used in conjunction with a time component, monitoring how the emissions from the allowed mobile device change over time, and modifying which band is white-listed. In one implementation of band white-listing, a hardware notch filter may be used. The system may switch between several notch filters—depending on the active frequency of the allowed mobile device. These notch filters may be implemented via standard hardware or software techniques. In another implementation, where multiple bandpass filters are used, one for each uplink band, the output of the bandpass for the active band of the allowed mobile device may simply be attenuated.

In another implementation, the transmitting band of the allowed mobile device is ignored, and only the time when the allowed mobile device is transmitting is examined In this implementation, those times are determined by relative signal strength between the holder antenna and other antennas. If it exceeds a predetermined SNR threshold, the system determines that the signal is coming from the allowed mobile device. Then, for that moment, input from all antennas in the vehicle are not considered when looking for unauthorized mobile devices. The signal during that time may simply be ignored, or may be replaced by a "background" signal, where the necessary qualities of that background signal will depend on the algorithm used for further analysis. For most purposes, the replacement signal would need to have a power spectral distribution similar to the quiet periods before and after the allowed mobile device transmission period.

Further, numerous procedures for determining the location of a mobile device within a vehicle, whether in the driver quadrant or in a passenger quadrant, using the control device of the present disclosure, are described in detail above. However, there are other procedures and techniques described in greater detail below, using suitably configured applications or software components installed or embedded on the mobile device, that can be used by such mobile device to determine its location within the vehicle.

In one embodiment, the location of the mobile device can be determined based on common engine noises and frequencies. For example, when driving, the left side of the engine will generate different sound patterns than the right side. Using this information, it is possible to determine if the mobile device is on the left or right side of the vehicle. After determining the vehicle's year/make/model, the mobile device would download a configuration file for the year/make/model of the current vehicle. This configuration file contains parameters for this vehicle, which can then be loaded into variables used by a combination of DSP and neural network algorithms. These algorithms are then used to determine the position of the mobile device within the cabin of the vehicle. In an alternative implementation, the mobile device may already contain all known configurations and can process the sounds without downloading additional information. In yet another implementation, the recorded sound capture will be sent to the cloud for further processing and to match the sound with the appropriate vehicle and to determine the quadrant in which the mobile device is located.

In another embodiment, the location of the mobile device within a vehicle or other closed environment can be determined by using various sensors on the mobile device. One such sensor is the magnetometer found on many mobile devices. When the mobile device is on the left side of the vehicle, the left door speaker will be closer than the right door speaker. Using this information one can determine if the mobile device is located in the driver quadrant. Accuracy of this will depend on orientation of the mobile device relative to the vehicle. However, this is not an issue, since the mobile device will typically be held in a common position when the driver actually tries to use it. Further, orientation of the mobile device relative to the ground can be helpful as well. In some situations, the magnetometer reading may be best utilized relative to the other mobile device located within the vehicle to account for other magnetic instruments distorting the signal. The comparison data can be sent to a cloud-based server, or transmitted locally among the mobile devices located within the vehicle. In another implementation, using a combination of sensors on the vehicle, such as magnetometer, accelerometer, gyroscopes, and other common sensors, it is possible to determine the approximate location of a mobile device within the vehicle. For example, when a vehicle makes a right turn, the vehicle tilts on its suspension. The side closest to the right side will feel a force pushing downward while the side closest to the left side will feel a force rising upwards while the suspension tilts. Utilizing this information, mobile devices within the vehicle can make assumptions about which quadrant it is likely located. This processing could happen individually with each mobile device, or in a manner in which the information is shared amongst the mobile devices within the vehicle either locally utilizing BLUETOOTH or other short range signals, or by uploading the data to a cloud-based server for further processing.

With regard to the orientation of the mobile device relative to the vehicle, another technique may also be used. The mobile device can determine the heading, and thus orientation, of the vehicle via GPS. Additionally, the mobile device can determine its own orientation via magnetometer and tilt sensors. Thus, the mobile device can determine its orientation with respect to the vehicle. The vector seen by the magnetometer of the mobile device may change as the mobile device rotates. However, it may also change as the position of the mobile device relative to a speaker changes. The mobile device can differentiate between these two conditions by looking for corresponding changes in the gyroscope to correlate with the observed rotation seen by the magnetometer. If there is no correlation, then the mobile device may be near a speaker. This information, combined with determination of its orientation relative to the vehicle, allows the mobile device to identify if it is near a speaker on the right side or the left side of the vehicle, allowing yet another method for driver identification.

In yet another embodiment, BLUETOOTH signal strength can be used. The mobile device with the highest BLUETOOTH signal strength relative to the control device would likely represent the mobile device closest to the control device. Again, this signal strength information, along with the model information of the mobile device and its orientation to ground, can be sent to the cloud, where variances in model sensitivity of the mobile device to BLUETOOTH at a given orientation can be taken into account.

In another embodiment, a challenge and response system can be used. If the control device is configured with a means of detecting cellular signal usage in the driver's seat area only, the control device can issue a challenge to each mobile device in the vehicle. For mobile device A, the control device may request the mobile device to make multiple quick data connections. If the control device detects that the mobile device in the driver seat performs this action, the driver mobile device would be identified. The control device would then issue a challenge to the remaining mobile devices. After each challenge/response session, the control device will have determined which mobile device(s) are located in the driver quadrant and policy can then be applied accordingly to all the mobile devices in the vehicle. If the control device is capable of differentiating calls vs. SMS vs. data transmissions, some combination of these may be used for more sophisticated challenge/response sessions.

Another embodiment, using cellular signal detection, can be implemented without requiring software to be installed on the mobile device. In this implementation, the control device monitors usage of the mobile device and compares generated signals to the known activity generated by mobile device(s) potentially used by the driver. For example, assume that the control device detects two (2) incoming SMS messages and one (1) outgoing SMS message at times x, y, and z, respectively. By comparing usage details contained within the carrier's network at times x, y, and z, the mobile device positioned within the driver's quadrant could be identified in real time. Once the proper mobile device has been identified as being in the driver quadrant, usage of the mobile device can be shut off within the carrier's network, or a signal can be sent to software running on the mobile device instructing it to block further activity.

The mobile device in the driver quadrant can also be narrowed down and/or identified without any activity manually being generated by the mobile device. For instance, by detecting patterns in the cellular signal generated by the mobile device in the driver quadrant, the model of the mobile device can be determined—which can further aid in identifying the mobile device. The method for detecting patterns within the cellular signal uses all methods known in the art, including neural networks and other AI methods. In addition to detecting patterns, signals can be generated by the carrier network and then detected locally within the driver quadrant. An example would be for the cellular network to send information to each mobile device within the vehicle and potentially within the driver quadrant of the vehicle. The control device would then match the generated signal with the appropriate mobile device.

In another embodiment, consider the scenario in which there is a mechanism to detect data bursts from the mobile device in the driver quadrant. This procedure is capable of building a data set of when the mobile device in the driver quadrant and what data is used over time. Consider, also, that there is an application on each mobile device in the cabin that monitors data usage on the mobile device over time or monitoring is provided through the carrier network without requiring an application on the mobile device itself. Mobile devices periodically perform data transactions even when in standby, such as checking email or social media status. Clearly, all of these data sets can be uploaded to a server, where they can be processed and a correlation found between the data set from the data detection mechanism for the driver quadrant and the data set from one or more other mobile devices in the vehicle. These correlation results can then be sent back down to the mobile devices within the vehicle, letting the mobile devices determine whether they are in the driver quadrant or in one of the passenger quadrants. Instead of uploading the data for processing via a server, the data may also be processed in-cabin using local communication techniques to transmit the data to a processing unit. The data may be transmitted via audible sound, ultrasonic sound, BLUETOOTH, BTLE, WIFI, NFC, infrared, visible light, or other mechanism. The processing unit may be one of the mobile devices itself or an application installed on one of the mobile devices, may be installed on or part of the control device, or may be a dedicated processing unit or processor installed on or within the vehicle.

In another embodiment, it is possible to use more than one mobile device to record or detect information from various sensors: GPS, accelerometer, manometer, light detector, camera, etc. The information can then be collected and compared to one another—either locally or within the cloud—to help determine the relative location of the mobile devices within the cabin of the vehicle. For example, imagine a scenario in which two mobile devices are running system software and collecting GPS location. GPS is typically accurate within a few feet. If, over the course of a drive (or vehicle outing), one mobile device continually reports a GPS location slightly to the left of the other mobile device, it could be determined which mobile device is the driver quadrant and which is in the passenger quadrant—depending upon the country and type of vehicle, and based on whether the driver of the vehicle is likely positioned to the right or left of passengers in the vehicle. Similar data could show whether one mobile device is further to the front or rear of the vehicle. Such data can then be used to determine which mobile device belongs to the driver. Similar scenarios could be constructed using any number of sensor data collected. Comparing the relative tilt or angular acceleration recorded by the mobile devices while turning represents another data point that may be used to advantage.

In another embodiment, it is possible to use an application installed on the mobile device, such as IBEACON, which is capable of transmitting a BTLE transmission, which can be detected and responded to by an OBDII device or control device. The BTLE data exchange provides distance data that can be used by the mobile device to determine how far away it is from the responding OBDII device or control device. Such distance data can be used alone, or in conjunction with one or more of the device location techniques described herein, to determine the likely location of the mobile device—whether in the driver quadrant, front seat passenger quadrant, or back seat passenger space.

All of the methods for determining or aiding in determining which mobile devices are located within particular quadrants (whether using the control device or not) could be used in various combinations with one another. While the methods are presented herein individually for ease of explanation, a real world solution can use one or more of these techniques for more accurately determining the location of mobile devices within vehicles.

Applications Making Advantageous Use of Device Location and Vehicular Status Data (1) Distracted Driving Applications for Conventional Mobile Devices In a distracted driving prevention or risk reduction system, there is a significant need and it would be very advantageous to be able determine the location of a mobile device within the vehicle—whether in the possession of the driver, a front seat passenger, or a passenger in the backseat. Once the location (or relative location) of the mobile device is known within the vehicle, the distracted driving prevention or risk reduction system can be configured to behave differently with different mobile devices—based on such location determinations.

For example, in some circumstances or applications, only the driver's mobile device needs to be blocked (i.e., monitored, controlled, etc.)—while the passenger devices (front seat and/or backseat) are allowed to remain unaffected. Alternatively, there may be circumstances or applications in which it is desirable for the system to be configured to block all mobile devices regardless of which mobile device is in the driver seat, or to open up certain aspects of the mobile device for non-drivers.

In some cases, distracted driving prevention or risk reduction is designed to improve upon the safe operation of a vehicle by a driver who has a mobile device, by limiting, controlling, managing, or preventing use of some or all functionality of the mobile device while the vehicle is in operation by the driver and/or in motion above a threshold speed, whether in reverse or forward direction. A default or configurable policy, rule base, or set of protocols are installed on, uploaded to, or otherwise accessible by the mobile device to define what functionality of the mobile device is limited, controlled, managed, or prevented and under what circumstances.

The distracted driving prevention or risk reduction applications described herein may use rules-based policies that are defined and targeted to individual users, devices, and vehicles, or they may be targeted to fleets of vehicles and selectively to groups or subgroups of employees or other categories of people using a centralized policy distribution and management system.

In some cases, there are one or more "default" or predefined policies usable and pre-configured for individual or corporate users and for different types of mobile devices—based on the capabilities and functionality of such mobile devices and based on the typical functions of the mobile device that are prevented, based on when such functionality needs to be prevented, and based on what functionality should not be prevented or is selectively permitted (such as the ability to make an emergency phone call, access a GPS map application, and the ability to text or call to or from specific numbers or people included on a "white" list or permitted list).

In addition, some companies may want to allow some of their corporate software applications to be accessible to their employee drivers even while operating a vehicle, as part of their job. The system allows an administrator to define customized policies for individuals or for larger groups of people (e.g., all family members, all kids in the family, employees of a division, specific types of employees, or all employees of the company, and the like). In an embodiment, mobile devices and/or vehicles that are not integrated into the system or that do not have suitable system software application(s) installed on the mobile device will not be impacted or interfered with by the system.

The vehicular status data provided by the control device and transmitted to the mobile device is used by software application installed on the mobile device, along with the mobile device location determination, to limit, control, manage, or prevent use of some or all functionality of the mobile device based on the applicable rules-based policy in effect on the relevant mobile device.

Once it has been determined which mobile device(s) within a vehicle should be disabled, the user must be prevented from accessing some or all functions of the mobile device, based on the policy associated with the user, with the vehicle, or with the mobile device—as may be customized based on environmental or other factors, such as location of the vehicle, time of day, weather conditions, etc.

Preventing a user from accessing specified functions of the mobile device may be accomplished in a number of ways. For example, one way to prevent access to all functions of a mobile device is to continuously display pop-up dialogs on the screen of the mobile device. These would appear at a rate such that no matter how fast the user dismisses the box, he never has time to access any function of his mobile device. Another way is to continuously throw up a full screen dialog or screen, potentially containing graphics and text. All touchscreen presses will be intercepted and thrown away by this dialog. Pressing the home button will simply cause the dialog to disappear for a very short time, due the continuous nature of its appearance. Another way is to allow the user to attempt to access some functionality of their mobile device, but to immediately close any application that is opened by the user. This may be accompanied by displaying a dialog box or other notification warning the user to be safe.

(2) Distracted Driving Applications for APPLE iOS-Types of Mobile Devices

Traditionally, distracted driving prevention and risk reduction systems have relied on a software application installed on or accessible by the mobile device located within the vehicle that receives a signal that then triggers a restriction of usage of the mobile device. This signal may originate locally from a sensor on the cell phone, such as GPS or accelerometer, or may originate from an external device either in the cloud or communicating over some wireless protocol (such as a transmission from the control device). Once the application receives or detects the trigger signal, the application on the conventional mobile device itself implements the usage restriction of the mobile device—thus, interfering with all or selected other applications and functionality of the mobile device. A common mechanism to perform mobile device blocking is to simply put up a screen on the mobile device that prevents the user from interacting with other applications. In addition, many applications will also watch for incoming/outgoing calls and forcibly end a phone call using APIs supplied by the operating system on the mobile device.

This well-established mechanism has worked well for most types of mobile devices. However, several manufacturers of mobile devices, such as APPLE, do not allow one installed application to "interfere with" other applications on the mobile device. This restriction or prohibition has prevented distracted driving software applications from working on these platforms. Even if one could design a solution or means to enable one application to restrict usage of other applications, such distracted driving solutions must still be submitted through APPLE's application review and approval process, which results in such application not being approved for sale or support through the APPLE App Store, since such an application violates APPLE's standard "application terms of service."

For these types of platforms, a different method for device restriction can be implemented. Instead of relying on the application installed on or accessed by the mobile device to perform the actual usage restriction, it is possible to use an external hardware device (in this case, the control device) to provide a data transmission or other communication to the iOS device that causes the OS of the mobile device to implement the desired restriction without requiring the application installed on or accessible by the mobile device to impose the restriction itself on another application or function on the mobile device.

(a) Preventing Prohibited Activities on a Mobile Device Using OS Level Commands Transmitted from an External Control Device Mimicking a HID For example, many mobile devices have supported external keyboards for a number of years. These external keyboards operate on standard protocols, such as HID (human interface device) or HID over GATT, for BLUETOOTH low energy applications.

Utilizing these established protocols, a system can be developed that is capable of restricting usage on these mobile platforms. For example, when the mobile device user opens an application, such external hardware device will receive a signal indicating improper usage and transmit a "key press," which has the same effect as if the user had pressed a key on an external keyboard. In most cases, a key press such as "home key" or "power key" is desirable. In the example in which a user opened or attempted to use an inappropriate or unauthorized application (e.g. based on the rules-based policy), it is possible to transmit a "home key" press, which would have the effect of minimizing this inappropriate or unauthorized application. This produces the desired effect of application restriction. This opens up a whole new class of mobile devices, which can implement a distracted driving policy and not have to worry about the application not being approved.

This mechanism could also be utilized in standalone manner—without any application needing to be installed on the mobile device. In this implementation, the external hardware device (e.g. control device) sends appropriate key presses on set intervals making it very difficult for a user to continue normal operation of the mobile device. In an embodiment, it is possible to use both a software application and an external hardware device. The software application would be similar in communication and functionality as the other applications described herein. However, the primary difference is that at least part of the mobile device restriction would require the external hardware device sending the equivalent of key presses over a protocol, such as HID. The software application on the mobile device would alert the external hardware device of improper usage, which would then trigger the sending of the key presses. In this example, this type of application could likely be approved since it would not directly violate the manufacturer's application terms of service. In particular, such application does not restrict usage of other applications. Instead, it simply informs an external hardware component of the current state of the mobile device. The external component then issues whatever commands are appropriate, based on state of the mobile device, vehicle state, and policy.

(b)(i) Preventing Prohibited Activities on a Mobile Device Using ANCS Notifications Transmitted Between an External Control Device and the Mobile Device It will be appreciated by those of skill in the art that APPLE®-branded mobile communication devices often trail ANDROID®-branded mobile communication devices due to APPLE Inc.'s tighter control of permissions associated with applications (or apps) installed thereon. However, it is possible to provide many mobile device control features and distracted driving functionality, which are more easily implemented or only available on an ANDROID®-branded mobile communication device, on an APPLE®-branded mobile communication device by making use of APPLE® Notification Center Service (ANCS) protocols currently used by APPLE®-branded mobile communication device that use APPLE's iOS operating system (hereinafter an "iOS device").

The novel solution disclosed herein takes advantage of the connection established between an external BTLE device and an iOS device. Specifically, the external BTLE device is permitted, by APPLE's iOS operating system, to interact with the ANCS service on the iOS device (called a "Notification Provider" within the ANCS protocol). The external BTLE device (called a "Notification Consumer" within the ANCS protocol) may be integrated into a DriveID or OBD transmitter type device (as described in the patent and patent applications incorporated herein by reference and identified above), enabling such existing DriveID or OBD transmitter type device to piggyback on the existing BTLE connection. Alternatively, the DriveID or OBD transmitter type device itself may be configured to be the external BTLE device itself that is configured to interact with the ANCS service on the iOS device.

One feature enabled by the ANCS protocols is the ability to block incoming calls directed to the iOS device. Currently, APPLE, Inc. does not include or permit an iOS API to end incoming calls. For this reason, existing distracted driving solutions installed on iOS devices have struggled with fully preventing inappropriate phone usage because of the restrictions imposed by APPLE, Inc. However, by sending a "negative" action in response to the incoming call notification using the ANCS protocols, the present disclosure is able to terminate/end calls before the user has had a chance to answer the call.

Another feature enabled by the ANCS protocols is the ability to auto-answer incoming calls. By sending a "positive" action in response to the incoming call notification using the ANCS protocols, software installed on the iOS device is permitted to answer the incoming call. This functionality is useful in some contexts, especially when combined with the ability to filter which incoming calls are ended or auto-answered. Using information obtained from the ANCS protocols, in combination with available iOS APIs for accessing contact information, the present system is able to determine the phone number of the caller. With this information, it is then possible, based on predefined list of known numbers, to define lists of phone numbers whose incoming calls will be either ended, auto-answered, or neither.

Another feature is the ability to auto-respond to SMS messages that are received by the iOS device while the user of the iOS device is driving or operating a vehicle. Using the ANCS protocols to determine the phone number of the SMS sender, the system can be configured to communicate with an SMS sending service (from the iOS device, from the external device, or relayed via a server) to send a response SMS to the sender. In one implementation, the system can be configured to use the iOS device phone number as the "sender phone number" when interacting with the SMS sending service. However, in many countries, including the United States, SMS spoofing is not technically feasible. In those cases, the auto-response SMS may originate from a third-party number.

Another feature is the ability to read incoming SMS messages aloud or audibly to the user of the iOS device— which is especially useful when the user is driving or operating a vehicle. Using the ANCS ability to access the content of the incoming text, along with existing iOS APIs for performing text-to-speech functions, the present system is able to audibilize the content of an incoming text message to the iOS device user. This feature can further be enhanced by providing mechanisms or policies that permit the iOS device to read SMS messages aloud if but only if the SMS originates from certain predetermined "white listed" phone numbers.

All SMS message functionality can be filtered based on white lists or black lists, in a method analogous to incoming calls, using the ANCS ability to determine the sender of the SMS message.

Another feature is the ability to remove notifications from the lock screen and notification shade of the main display screen of the iOS device. Normally, on iOS devices, when a notification for SMS message, email, or other activity is generated, it is visible on the lock screen, as well as in the shade accessible from the lock screen. Part or all of the content of the message may be visible. This capability, while useful to the user, presents an undesirable distraction when the user is driving or operating a vehicle. Sending a negative action to such notifications via ANCS allows the present system to remove these notifications from the lock screen and lock screen notification shade and, thus, reduce potential distractions to the user of the iOS device.

Another feature is the ability to audit distractions while driving using ANCS. Each time a notification comes in, the system is able, using ANCS, to record the time, app, and app category that generated the notification. This data can then be aligned with driving time to determine how many notifications, and from which apps (or types of app), are coming in while the user is driving or operating a vehicle. Such data can be extremely useful from an auditing, legal, or insurance policy perspective to assess the risks from distracted driving and identify the source(s) of the distraction.

This detailed information can be captured by the system whether it is merely operating in an "audit" mode or when it is operating in a distracted driving "protection" mode, for example. Further, this information can be analyzed against driving behavior to determine how incoming notification messages from various applications affect the user's driving ability. For example, it is possible to correlate braking events, acceleration events, and other negative driving behaviors to the exact notification or phone event that caused or occurred at the same time as such behavior. This type of data can have huge ramifications as it relates to pricing insurance based on device usage while driving or operating a vehicle.

In one implementation, the external device parses and interprets ANCS notifications when interacting with the ANCS service. The external device can then formulate ANCS responses—such as sending a negative action back to the ANCS service operating on the iOS device to end a phone call and/por dismiss notifications off of the user's screen. In some instances, positive actions, such as answering a phone call, may also be warranted. The determination to send negative actions, positive actions, or no response at all can vary based on the environment and settings/policy determined by or on behalf of the user. For instance, while stopped at a red light, the iOS device may chose not to end phone calls or dismiss messages whereas, while moving, it may be desirable for the system to be configured to send negative actions so that the ANCS service terminates the distracting activity or screen notification.

In another implementation, the external control device simply relays ANCS data, byte-for-byte, back to an application running on the iOS device. The iOS app (or a remote server) is then responsible for parsing and interpreting ANCS messages. This minimizes load on the external control device and allows for greater flexibility in determining responses and evaluating the environment. In this case, custom BLTE characteristics can be configured for transmitting the ANCS messages (notifications and actions/responses) back and forth between the external control device, one or more applications running on the iOS device, and the iOS device itself. Any combination of BTLE custom characteristics can be used for relaying ANCS messages back and forth, sending vehicle state information, and retrieving data to and from the external control device and the iOS device and/or applications running on the iOS device.

The following is just one example of how this service could be implemented:

1. An external control device containing a BTLE compatible BLUETOOTH module is paired/authenticated with one or more iOS devices. In this example, the external control device may be a DriveID type of hardware component, an OBD installed hardware device, a standalone device, a device integrated directly into the vehicle or with the vehicle's on-board computer, a device located on another smart phone or other device, or any device that is external to the target iOS device from and for which it will receive information;

2. The iOS device receives an SMS message;

3. ANCS passes the SMS message information to the external BTLE device as an ANCS notification;

4. The external device processes the SMS message and determines, based on the user's "distracted driving" policy settings, that the message should be "blocked" from being viewed by the user of the iOS device;

5. A negative action is then sent using ANCS from the external control device to the iOS device;

6. The iOS device processes the ANCS response (negative action) and removes the notification from the user's notification bar and lock screen—preventing the user from being distracted.

Further, the above example could be extended such that the ANCS message is also transmitted to a remote server, remote application which may be running on the target iOS device or other iOS devices, or to another external device such that the message could then be recorded for auditing purposes. Alternatively, such message could then be further analyzed and compared with other data to make a more informed decision on what, if any, ANCS response should be transmitted.

The following is another example of how this service could be implemented:

1. A BTLE module is included or installed in an external control device, such as a DriveID component;

2. The iOS device receives an SMS message;

3. ANCS passes the SMS message to the DriveID component as an NACS notification;

4. The DriveID component passes the selected information obtained from the ANCS notification back to a distracted driving application (e.g., the control application 104), which is installed and running on the target iOS device. The DriveID component may also pass vehicle status or state data, such as speed, to the iOS device;

5. The application installed and running on the target iOS device processes the selected information and any other information provided to the iOS device or otherwise independently determinable by the iOS device (such as vehicle speed, location, whether the iOS device is on the user or passenger side of the vehicle, etc.), compares the selected information and other information to various distracted driving settings or policies established for the user;

6. The application on the iOS device then formulates a desired response to the ANCS notification and sends it back to the DriveID component;

7. The DriveID component then transmits the desired response in the form of an ANCS action back to the target iOS device, whereby that the ANCS service can process the ANCS action and perform the action desired by the application (but by-passing the iOS restrictions imposed on the application from interfering directly with the underlying activity or functionality of the iOS device).

It should be noted that while SMS is used in the above examples, the above processes can also be performed for Skype (or similar VoIP) messages, emails, calls, third party app notifications, etc.

The ANCS service on iOS devices requires that the two devices (the external control device and the iOS device) to be paired. This can create a burden in families with multiple cars or in commercial vehicle fleets in which there may be hundreds or even thousands of different vehicles. The present system allows the end user to pair the target iOS device to only one unit and, thereafter, share the "pairing" among one or more external control devices.

This is accomplished by using a combination of an application running on the target iOS device and the external BTLE device. When the initial pairing is completed, the pairing/bonding keys and all relevant information is transmitted from the external BTLE device to the application running on the iOS device. This information is then stored locally and/or on a remote server.

From this point forward, the iOS application has all the information required to force a different external BTLE device to "mimic" the BTLE device with which the iOS device was originally paired. In this way, the iOS device believes that the BTLE external device with which it is currently communicating is the "original" device with which it established a BLUETOOTH pairing—allowing the iOS device and ANCS service to function correctly without requiring a new BLUETOOTH pairing.

Here is an example of how this is implemented in a DriveID component, as described in the above referenced patents and patent application incorporated by reference:

1. A BTLE module is installed in or otherwise built into the DriveID component;

2. A system application is installed and running on the target iOS device;

3. The target iOS device and the DriveID component begin a pairing sequence;

4. Once the pairing is complete, the DriveID component sends the pairing keys, MAC address, and all relevant information to the iOS application, which is then stored (either on the iOS device or a remote server in communication with or otherwise accessible by the iOS device);

5. The target iOS device can then be carried and used in a new vehicle and communicates with a new DriveID component that is unique to or associated with the new vehicle;

6. The iOS application sends the keys, MAC address, and other relevant information to the DriveID component in the new vehicle;

7. The DriveID component then changes its MAC address and keys to match the received information;

8. The iOS device and ANCS service then connects to the DriveID component in the new vehicle in an authentication fashion as the two devices are now "paired."

(b)(ii) Preventing Prohibited Activities on an iOS Mobile Device By Creative Use of CallKit API Protocols As stated above, it is well known that APPLE®-branded mobile communication devices often trail ANDROID®-branded and other mobile communication devices in software application ("app") development and functionality, primarily due to APPLE Inc.'s tighter control of permissions associated with apps installed thereon and restrictions that general prohibit $3^{rd}$ party apps from interfering with or blocking the functionality of other $3^{rd}$ party apps and core device functionality built into the APPLE®-branded mobile communication devices. However, APPLE, Inc. recently released a new public application program interface (API) in its version 10.0+ iOS operating system. This new API is called "CallKit," and the solutions described herein take advantage of the "CallKit" API to provide distracted driving and other management and control functionality of iOS mobile communication devices in ways and for purposes beyond those purposes specifically intended by the "CallKit" API.

The intended purpose and use of the "CallKit" API is to allow for Voice Over IP (VoIP) applications (e.g., Skype™ and similar VoIP applications) to have tighter integration into the iOS and core functionality provided on iOS devices. As explained in a press release introducing iOS version 10.0, APPLE, Inc. stated that the "CallKit framework . . . lets VoIP apps integrate with the iPhone [user interface to] give users a great experience." The framework enables users to "view and answer incoming VoIP calls on the lock screen and manage contacts from VoIP calls in the iPhone app's Favorites and Recents views." The press release states further that "CallKit also introduces app extensions that enable call blocking and caller identification."

This tighter integration allows a VoIP application installed on an iOS device to trigger the native phone application on the iOS device—both on the Lock Screen and when the device is unlocked and in use. This screen can be triggered in response to an incoming call, an active call, or an outbound VoIP call. For example, when a VoIP application notifies the iOS that there is an incoming call, the iOS will display the native phone app and indicate from whom the call is coming. As with conventional incoming calls to the iOS device, the display of a VoIP application using the CallKit functionality interrupts the user's current activity and becomes the "foregrounded application." This foregrounding will display over incoming SMS and other notifications, applications the user was using, and other processes. In addition, the triggering of the phone application is based on API calls that the VoIP application makes to notify the iOS that there is an incoming, outgoing, or in-progress VoIP call. However, no actual VoIP call has to be present for the VoIP application to trigger and make use of the CallKit functionality, as will be described hereinafter.

While this API is useful for improving the experience of VoIP applications on an iOS device, the level of control and discretion given to a VoIP (or any other) application incorporating the CallKit API makes it possible to display the phone application at will, which, in turn, enables the API to be used for other unintended but creative purposes. Such unintended but creative purposes include (i) helping to reduce distractions to a user of the iOS device when the user of the device is driving a vehicle or (ii) restricting, monitoring, or controlling selected functions of the iOS device when it is in a predetermined location or environment in which it may be desirable or necessary to limit or prohibit some functionality of the device (such as in a movie theatre, in a hospital, in a school, or in any other environment or area in which device usage needs to be controlled, monitored, or restricted).

For example, a conventional distracted driving application (as described herein, such as with reference to control application 104) would determine if and when a user of the iOS device was accessing or attempting to launch a "forbidden" or blacklisted application or function on the iOS device while the user of the device is driving or in a location in which the application or function on the iOS device is prohibited by the distracted driving application installed on or in controlling communication with the iOS device. If so, the distracted driving application can be configured to use the CallKit API to instruct the iOS to display a VoIP screen or notification window in the foreground, which effectively prevents the user from continuing with the prohibited application or feature since the VoIP notification window or display screen is given priority as the foregrounded application.

The screen or notification window associated with the application using the CallKit API may be a specified notification window or display screen provided by the application. For conventional VoIP applications using the CallKit API, the notification window or display screen is one generated by the native phone call interface or one customized by the VoIP application. With the present disclosure, the distracted driving application acts as if it is a VoIP application and generates a customized notification window or display screen that is conventionally displayed to users of non-iOS devices and that is intended to minimize the distraction caused to the user of the iOS device.

If the CallKit API used by the distracted driving software merely forces the installed VoIP phone application to display one of its notification windows or display screens, there are a number of different possible implementations for doing so to have the effect of preventing the user from launching or accessing the prohibited application or feature. Below are several options based on the current configuration of the CallKit API (which obviously may be expanded or enhanced in future versions of the API). For example, the CallKit API can be configured by the distracted driving software to generate a notification window or display screen indicating that there is: a new incoming call; a new incoming call but that the call has been answered; a new outgoing call; a new outgoing call but that the call has been answered.

As stated previously, the distracted driving software may incorporate the CallKit API, which then enables the distracted driving software to provide a customized notification window or display screen that is familiar to the user of the iOS device and does not confuse the user into believing that there is an attempted VoIP call coming in, in progress, or going out. Having a notification window or display screen generated by the distracted driving software has the added benefit of displaying a cleaner and more specific interface to the user, which helps the user understand what is happening and reduces confusion.

In implementations in which the native phone application is triggered and becomes foregrounded, efforts are made to notify the user as to what is currently happening, but in a manner that is intended to minimize the level of distraction. Some of these methods include: changing the displayed "caller name" to include phrases such as "Blocking Mode Active" rather than the name of an actual caller identified by caller ID; displaying a local notification to the user which explains that the user has accessed or attempted to launch an unauthorized application, function, or feature of the iOS device and that the distracted driving software has been triggered to prevent further usage and distraction that could be caused by such application, function, or feature; first instructing the iOS that the "phantom" phone call supports video and then providing a video or static image to the iOS for display on the device screen—wherein such video or static image merely includes an illustration or wording that notifies the user that the device is in "blocking" mode and that there is not really an incoming phone call.

In another implementation using the CallKit API, the distracted driving application is configured to trigger the native iOS phone app briefly to display but then quickly signal that the call has been ended. This method would only show to the user a quick screen flash. This has the effect, in many cases, of preventing the user of the iOS device from continuing the current activity without requiring the user to be "stuck" in the phone application. A follow up notification can then be displayed to the user alerting them to the unauthorized application, function, or feature that was attempting to launch or be used, which would help avoid or reduce potential confusion to the user.

In other implementations, it may be desirable to keep the user in the phone application user interface (UI) whenever the user is accessing or attempting to launch a "forbidden" or blacklisted application or function on the iOS device. This can be accomplished by continually triggering the phone application notification window or display screen whenever the user is driving or otherwise attempting to access or launch unauthorized application, function, or feature on the iOS device, when the user is driving or when the device is in a predetermined location or environment in which it may be desirable or necessary to limit or prohibit some functionality of the device. In other words, whenever the application detects the user has navigated away from the phone application or "hung up" the call, the distracted driving application can then fire a new call to bring the user back into the phone application and prevent any other action.

It may further be desirable only to show the phone application when the user interacts with the phone or turns the screen on. This would reduce the power/battery drain of the iOS mobile device by only showing the phone app when the screen was actively in use (i.e., in unlocked mode).

The phone application may also be triggered only in response to the user pressing buttons on the screen, or after an incoming notification, such as a text message, is received.

The CallKit API may also be useful in preventing other aspects of distracted driving. For example, the CallKit API has the ability to be notified of system calls and calls from other VoIP applications. Using the knowledge of these calls, the CallKit API may be used to mute, or even terminate, these other calls to prevent the user from being distracted by new incoming calls or continuing existing calls. Again, the instruction to mute or terminate the VoIP call would only be implemented if and when the distracted driving software determined that the user was accessing or attempting to launch a "forbidden" or blacklisted application or function on the iOS device while the user of the device is driving or in a location in which the application or function on the iOS device is prohibited by the distracted driving application installed on or in controlling communication with the iOS device.

In response to a new incoming call, the CallKit API may be used to tell the system that the distracted driving software also has an incoming call. This would make it difficult or impossible for the user to answer the other call and, therefore, prevents the user from talking on the phone while driving.

In another implementation the system can be configured quickly to initiate and disconnect calls repeatedly as long as the screen is on. This would have the effect of preventing the user from accessing any other applications while the user of the device is driving or in a location in which the application or function on the iOS device is prohibited by the distracted driving application installed on or in controlling communication with the iOS device. A notification may also be shown to the user during this time to help explain the actions taking place to reduce confusion.

In a further implementation, the CallKit API can be triggered to prevent the user from being able to see short lived distractions, such as notifications from applications such as email, messaging, IM, or other applications in which notifications have been activated or turned on. Once a notification is detected (and assuming it is not from an authorized or "white-listed" application or number kept in the distracted driving software policy or user profile), then an incoming or outgoing call with a callerID of "Blocking Mode Active" can be displayed on the screen, using the CallKit API, to alert the user that a distraction on the iOS device is being blocked or prevented. Once the distraction is removed from the iOS device or otherwise ends, the CallKit API would send a notification indicating that the "blocked" call had terminated or disconnected and the user would be placed into a "safe area"—whether that be back to a Locked Screen status, back into an approved application, or back to the default screen generated by the distracted driving software.

Stated another way, in version 10.0+ of its iOS, APPLE, Inc. introduced a new public API replacing its prior notification system with a new UserNotifications framework. This API allows for customizing of both modal and Lock Screen notifications that are shown to the user of the iOS device.

In pre-existing "notification-based" systems prior to the CallKit API, there was no "true" way of preventing or blocking unauthorized applications, functions, or features on an iOS device using a $3^{rd}$ party app due to the inability of a non-CallKit API to determine the "Alert Style" of a notification coming from another app on the iOS device. This inability to enforce conventional distracted driving solutions made it difficult to enforce blocking or preventing use of unauthorized applications, functions, or features on an iOS device—or at least made just restrictions easier to circumvent.

However, the CallKit API effectively enables distracted driving software to integrate with and make effective use of the CallKit API functionality to prevent the user from accessing any other applications while the user of the iOS device is driving or in a location in which the application or function on the iOS device is prohibited by the distracted driving application installed on or in controlling communication with the iOS device. These implementations include:

Using a detection system the distracted driving software application resident on the iOS device is notified of the user interacting with the lock screen of the mobile device. This causes the distracted driving application to send multiple CallKit API notifications that are displayed on the lock screen of the iOS device. This addition of notifications results in the unapproved distraction (messages, email, notifications from applications on the phone, or phone call notifications, etc.) to be forced off of the display screen and out of view of the user.

Using means already described in prior filings identified above and incorporated by reference herein, once an iOS device is notified of an incoming, unapproved distraction (messages, email, notifications from applications on the iOS device, or phone call notifications, etc.), the distracted driving application resident on the iOS device triggers multiple notifications forcing the unapproved distraction off of the iOS device display screen and out of the user's view. If the user interacts with the display screen, the notifications are then cleared out and implementation 1 (above) is then triggered, causing more notifications to be displayed—which further reinforces to the user that the action is not approved.

With the ability to display an enforceable modal notification to the user while the iOS device is unlocked, it is now possible to provide the user with a customizable user experience. Items, such as one touch dialing, opening allowed applications, and other approved features can be set as available without the user going through layer after layer of User Interfaces; thus, further minimizing unnecessary distractions to an iOS device user while the user is attempting to access or use an "authorized" or permitted application, function, or feature on an iOS device.

With the ability to display an enforceable modal notification, the iOS device is able to block unapproved incoming phone calls, FaceTime calls, and VoIP calls. Upon the notification of an incoming phone call, the distracted driving application resident on the iOS device can display a notification to the user alerting them that the call is not allowed; thus, preventing them from answering the call. Outgoing calls can be prohibited in similar manner using the CallKit APIs to prevent the user from accessing pathways for making a call.

(c) Enforcing and Preventing By-Passing of "Do Not Disturb While Driving" Functionality on Mobile Devices That Enable Users to Self-Impose Distracted Driving Restrictions With APPLE Inc.'s introduction of its "Do Not Disturb While Driving" (DNDWD) functionality in iOS 11, APPLE introduced a self-enforcing (i.e. user opt in) way to limit mobile device distraction. For example, while the DNDWD is active on the mobile device, the user is protected from (i.e. prevented from seeing, hearing, and interacting with) passive distractions. Passive distractions typically include notifications (whether phone, text, or app-related) that are inbound or otherwise not directly initiated by the user, but are actions by the mobile device to which the user responds. The user is also protected from active distractions. In contrast with passive distractions, active distractions include interactions or activities on the mobile device initiated by the user. Active distractions are addressed by preventing the user from unlocking the mobile device when the device is in a "locked" state and when the DNDWD functionality is active. However, APPLE makes it relatively easy for its users to override or by-pass the self-imposed DNDWD functionality by responding to a simple on-screen challenge. For example, when attempting to unlock the device when the DNDWD functionality is active, the user is presented with an on-screen challenge. Basically, the DNDWD gives the user one last chance to decide whether or not to by-pass or disable the DNDWD functionality regardless of whether the user is driving. When attempting to unlock, the device displays two buttons to the user: CANCEL and I AM NOT DRIVING. Thus, APPLE's DNDWD functionality is provided as a deterrent to discourage the user from interaction with other functions of the mobile device. However, once the user selects "I AM NOT DRIVING" and opts out of being blocked from using the device, there is no further enforcement or blocking of device functionality by the system—even if the user is operating the vehicle.

The distracted driving prevention software and system of the disclosed herein may be used to supplement and enforce a distracted driving prevention application, such as APPLE's basic DNDWD functionality. The present disclosure is also useful for improving upon and complementing any blocking functionality adopted by device manufacturers other than APPLE, Inc. that provide self-imposed, but easy to deactivate, protections. For example, when a vehicle is in motion, the APPLE's basic DNDWD functionality will keep the mobile device in a locked state, e.g., such that the user must take affirmative action to transition the mobile device to an unlocked state. Embodiments may be configured to detect the affirmative action to unlock the device while the vehicle is in motion, which triggers an enforcement protocol built into the distracted driving application of the present system. If the distracted driving prevention application on the mobile device detects that the user is in a vehicle moving (based on, for example, GPS data or another external triggering mechanism) the mobile device may prompt the user to re-enable the blocking functionality (after the user has selected the I AM NOT DRIVING button), warning that the distracted driving prevention application on the device will take affirmative action, such as notifying an account administrator/parent/guardian that the driver is no longer in compliance with the blocking functionality while in operation of a vehicle.

Increasingly, insurance companies and underwriters are basing the cost of insuring motorists on a multitude of things such as but not limited to daily mileage, time of day for drives, age of the driver, etc. A number of insurance companies are currently attempting to more accurately assign insurance costs and premiums on companies and upon individual users or families based on the driving habits of said drivers being insured. A number of data points are taken into consideration when establishing such costs and premiums, including but not limited to tracking and monitoring harsh braking events, average and top speeds, speeds compared to speed limits, hard acceleration events, hard cornering, and the like. Much of this data can be collected by the on-board computer of many vehicles, by control devices, as described herein, that are installed in vehicles, and based on data that can be collected by the mobile devices themselves. The challenge for this insurance cost model occurs when there are multiple users of this insurance in the same vehicle at the same time. Data collected for multiple users within the same vehicle will identify the same data points for all mobile devices within the vehicle—regardless of which device user is driving. For example, Driver X may be the safer and less risky of the two drivers in the eyes of the insurance company; however, if Driver Y is riding as a passenger when Driver X is driving, the data collected about Driver X's driving behavior will also be applied, incorrectly, to Driver Y. And, thus, the lower risk profile of Driver X may be incorrectly assigned to Driver Y. The inverse is also true. If Driver Y is driving and has the higher risk profile, all data collected about risky Driver Y may be incorrectly attributed to safer Driver X when Driver X is merely riding as a passenger of Driver Y.

(c)(i) Determining When a Mobile Device is Being Used by a Passenger Rather Than a Driver of a Vehicle.

A number of techniques for distinguishing between a driver and a passenger have already been described and disclosed herein. However, there may be circumstances in which it is desirable to determine whether a device user is a driver or passenger based on actions that the present distracted driving prevention software installed on the mobile device requires the user to take to validate and confirm whether he is a driver or passenger. In some embodiments, the system defaults to the assumption that the device user is a driver. Consequently, processes and systems described herein confirm whether the user is not the driver. However, such confirmation can require more than having a user self-select an option on the home screen of the device. This validation process can be performed before releasing the user to full device functionality that is conventionally provided after the user selects the I AM NOT DRIVING option.

For example, according to one embodiment disclosed herein, the user is prompted to hold the mobile device such that the screen of the device is facing him. The mobile device may prompt the user to rotate the device 360 degrees while keeping his hand from obstructing a rear-facing camera of the device, which is on the other side of the mobile device from the screen. The collected image or images (e.g., video data including image frames) is then processed (locally on the mobile device or uploaded and processed remotely) to determine whether the user is in the passenger space of the vehicle.

In another embodiment of the present disclosure, which requires less computational power than a 360 degree scan, the mobile device prompts the user to hold the mobile device in front of him. Then, front and rear-facing cameras are used to collect image/video data for processing. Again, collected image/video data is then processed/analyzed (locally on the mobile device or uploaded and processed remotely) to determine whether the user is in the passenger area of the vehicle.

In a feature or improvement upon the two procedures described above, tilt of the mobile device can also be checked with respect to gravity, and the tilt must be in a given range before collected images/video will be considered for processing. Alternatively, the system can require the mobile device to orient itself with respect to the vehicle, and this relative orientation must be in a pre-determined range before collected images/video will be considered for processing.

In another embodiment, mobile device prompts the user to hold the device such that the user's face is visible via the front-facing camera. Next, while the user's face is still visible, the system instructs the user to rotate his head and the camera such that the user is looking at an object within the cabin of the vehicle. The mobile device may instruct the user to aim the camera at a given item, such as a steering wheel, rear-view mirror, or passenger seat (or any other space in the vehicle). Optionally, by rotating through randomly-selected and different potential objects or locations within the vehicle and instructing the user to respond within a very short period of time, the mobile devices provides an additional challenge to the user with the selected item or location and requiring the user to aim the camera at that item or location in a relatively short amount of time. The system includes algorithms to determine where the user is looking compared to where the user should be looking if he were a passenger rather than a driver. Therefore, embodiments provide an additional challenge that can be used in combination with other challenge mechanisms to increase the reliability of the verification process.

In some embodiments, the mobile device is configured to enable the rear- and front-facing cameras to take images (or videos) from both cameras—one to capture the user's face and background behind the user and the other to capture what is in front of the user. Further, the mobile device may instruct the user to sit in the vehicle seat, with headrest behind the user's head and to position the device at head level so that one camera (front-facing camera) is pointed toward the user's face and the other camera (rear-facing camera) is pointed toward the dashboard/windshield of the vehicle (if the user is in the front seat) or the back of one of the front seats (if the user is in a rear seat). Further still, the mobile device may instruct the user how and where to hold the device and then the device screen shows a split view— one view for the front-facing camera and the other view for the rear-facing camera. Once the user's face is centered and properly oriented in the front-facing camera, the mobile device can capture or simply analyze the view from the rear-facing camera. If the user's face is captured and has an appropriate background based on where the user indicates he is sitting in the vehicle, and if there are no turnings or adjustments detected by the device which might indicate that the device is being handed to a different user or moved to try to trick the validation procedure, then the rear-facing image or video can be analyzed to determine whether the view is consistent with a view from the seat indicated by the user. As long as the view does not match a view from the driver's seat and as long as there have been no disallowed movements (turns, tilts, vertical or horizontal shifts of the device, as detected by the device's accelerometer, for example), then the validation process confirming that the user is not in the driver's seat is successful and the user is permitted to use the device as normal.

The above procedure or process also works for devices that do not enable simultaneous images or videos. First, the device is positioned to capture and center on the user's face. Then, the rear-facing camera takes or analyzes its view. If there are no disallowed movements between the capture or the user's face and then the capture or analysis of the rear-facing view, then the validation process proceeds. If there are any disallowed movements, then the validation process requires the user to start over and capture the user's face with one camera and hold the device in position until the device can capture or analyze the view from the other camera to determine where the user is positioned in the vehicle.

In an additional feature of the above verification process, the mobile device may prompt the user to select or self-identify in which seat within the vehicle he is located. This additional step is optionally performed before or while performing the passenger verification test. Doing so allows the mobile device to validate the location with knowledge of where the user claims to be located within the vehicle. In some embodiments, the device screen presents the user with a graphic, top level view of the vehicle and the different locations within the vehicle in which the user may be located. The user would then select the seat or space location by tapping the appropriate location on the device screen.

In some embodiments, the mobile device processes and analyzes collected image/video data by training a neural network (or other machine learning algorithm) to detect certain images from specified viewpoints. For example, if the user is in the front seat, the mobile device may instruct the user to point the camera towards the steering wheel while keeping his head visible in the forward-facing camera. The forward-facing camera confirms that the user's head is visible and then confirms, using the rear-facing camera, that the image matches the type of "view" expected by the machine learning algorithms based on system calibration and based on an ever-growing library of representative images taken of different users in different vehicles. If the check passes, the system knows that the user is in the front passenger seat.

In the back seat, the mobile device may perform a similar test. Where the user is visible in the front-facing camera and the seat in front of the user is visible in the back facing camera, the system may determine that the user is in a rear passenger space.

If the user is driving or riding in the vehicle at night or in the dark, the light from the device screen may be used to help illuminate the objects and locations within the vehicle. A white or gray image on the screen may help in this regard. This is safer than using the device's flash so as to avoid blinding the driver of the current vehicle or those in other vehicles.

Alternatively, at night or during dark conditions, the lights from the console or vehicle instrumentation panel may be detected in the images/video and used by the system to help determine the location and position of the device and device user.

In other embodiments, one or more of the above techniques may be combined together to provide the system with a higher level of confidence and accuracy in determining the position and location of the mobile device within the vehicle.

The process of analyzing any collected image/video data includes identifying, for example, the location of the vehicle dash board, steering wheel or console, rear and side view mirrors, gears, and the like. In addition, the mobile device may analyze and compare a location of the user's head, torso, hands, and arms relative to vehicle objects, such as seat and head rest, external windows, and whether the image was captured by the front or rear facing camera.

In some embodiments, the mobile device checks the images or videos of the rear-facing camera against a library of potential "views" the user may experience from various positions within the vehicle, such as front passenger, rear passenger, public transport such as a bus etc. If the view matches a passenger view, the blocking is released. If the device rotates more than a few degrees in any one direction, or if an acceleration consistent with "moving" the device takes place, the system resets and the user is required to start over and ensure that his face is visible in the rear-facing camera again. Doing so ensures that the user is always directly behind the device and looking into the rear-facing camera and cannot attempt to move the device after capturing the user's face. The user is allowed only small movements after the device is properly oriented to capture the user's face. This increases the accuracy of the image or video captured by the opposite-facing camera—whether it is capturing an image of the steering wheel, seat head rest, view straight ahead of the user, or other location within the vehicle at which the user has been instructed to look.

In some embodiments, the mobile device instructs the user where to look—whether that be the steering wheel, passenger seat, dashboard etc. So, when the user is ready to start the validation process, the user simply presses the validation button, aligns his face with the rear-facing camera, and if the user is already looking where he is supposed to, the mobile device quickly checks the rear camera image after locking in on the user's face. If the image matches (within a predetermined degree of accuracy) an expected passenger view, they are deemed to be a passenger. So, in such a case, there is no need for the user to turn or rotate their head/camera.

Accordingly, unless the device enable images or videos to be captured simultaneously, the system essentially switches back and forth between the front and rear camera based on events. First, the front-facing camera is activated until the system locks in on the user's face. The orientation of the device is established when the user's face is captured so that any unacceptable movements, tilting, or re-orientations of the device can be detected if the orientation changes. Then, the system switches to the rear-facing camera to determine what the user is "looking at." If the user moves too much, the system switches back to check the rear-facing camera to ensure that the user's face is still properly positioned and that the user is not trying improperly to by-pass the validation procedure.

In one embodiment, the mobile device analyzes the collected image/video data to determine if an empty seat can be identified in the rear-facing camera, which can be useful for confirming whether there are passengers within the vehicle. Additionally, the system may require that the rear-facing camera detect the user's face.

In another embodiment, the mobile device instructs the user to type in a displayed code while collecting the images/video. Doing so enables the camera of the device to capture the user, background behind the user, and any objects detected by the front-facing camera. This technique prevents or makes it more difficult for the user to try to trick the validation procedures since the image/video data will only be collected while the user is typing in the required information, which establishes a fixed orientation between the device and user during the data collection process.

(c)(ii) Additional Methods for Preventing a Bone Fide Passenger From Entering Validation Data on Behalf of the User/Actual Driver.

Another problem to be solved is when a driver asks his passenger to unlock his device for him In this situation, once the passenger has unlocked the phone, the system uses inertial navigation techniques to integrate accelerometer and gyroscope sensor data available from sensors built into the mobile device to determine that the device has been passed back to the driver. This data can be combined with GPS data to reduce false positives/negatives due to the motion of the vehicle. In addition, this technique can be combined with one or more of the above validation techniques.

Additionally, to prevent users from trying to have a passenger unlock the device for them, the system may warn the person completing the passenger verification test that the person doing so is solely responsible for keeping the mobile device in the passenger zone. The person completing the passenger verification test is warned that he is and will be responsible for any negative actions that happen if the device is used by or given back to the driver of the vehicle. The person completing the passenger verification test is then prompted to click an "I AGREE" button before the device is unlocked. In addition, the image of the person who unlocked the phone is taken and saved in the device. This accountability provides an additional deterrent to anyone trying to by-pass the DNDWD functionality and can also be stored and used for later audit or enforcement actions that may be necessary if an incident occurs and it is later necessary to identify who completed the passenger verification process.

(c)(iii) Procedures Used by the Present Distracted Driving System to Detect When the Mobile Device is in DNDWD Status and to Detect When User Selects the I AM NOT DRIVING Button To Deactivate the DNDWD Functionality.

In an embodiment, when the system's application running on the mobile device detects that the mobile device is in a moving vehicle, it also needs to determine whether or not the DNDWD functionality has been activated by the user and detect when or if the user selects the I AM NOT DRIVING button. This detection is done via API calls that are exposed via the OS, which give status information for DNDWD functionality. Alternatively, this detection can also be accomplished by observing mobile device behaviors. Such behaviors include but are not limited to detecting that the user: has navigated away from the home lock screen, is accessing applications, is receiving incoming messages, or is making or receiving phone calls.

Once the application has detected that the DNDWD functionality is not currently active or is disabled, the present application will confirm that the mobile device is still moving in a manner consistent with being in a vehicle. This determination can be based on hardware installed in the vehicle or sensors on the mobile device such as but not limited to: accelerometer, GPS, WIFI.

Once the present application has determined that the DNDWD functionality is not active and that the mobile device is moving, the application may perform one or more of the following activities in various combinations or order:

Action 1: Notify an administrator/parent/guardian/insurance company or person of authority that the mobile device is being used while moving.

Action 2: Prompt or instruct the user to reactivate the DNDWD functionality.

Action 3: Adjust the user's driving or UBI score to reflect the activities of the user.

Action 4: Prompt the user to perform a passenger verification test. If the passenger verification test fails and it is determined that the user is, in fact, driving, then all of the above may be performed in response, including but not limited to: appropriate notifications, driving score impact, prompt to turn back on, etc.

In one embodiment, the passenger verification test may include having the user perform operations that can only be completed when the application has the user's full attention.

In another embodiment, the passenger verification test may include utilizing the device's camera system, as described above, to identify if the device is being used by a passenger rather than the driver.

If the passenger verification test is successful, the user can then freely use the mobile device. However, it may make sense periodically to require the user to re-perform the tests.

If the passenger verification test fails, it makes sense potentially to impact driving scores, notify the user to turn the DNDWD feature back on, lock the device or disable usage until the user re-enables the DNDWD functionality, make notification to one or more appropriate parties regarding the activity, or, in some situations, even prevent the vehicle from being used.

In another embodiment, allowable features or apps may be allowed to be used even when it has been determined that the mobile device is being used by a driver after failing the passenger verification test. Such allowable features or apps may include, for example, navigation or music applications or emergency or white listed communications. The usage of these applications and functions may be controlled and monitored based on distracted driving policies associated with the present system.

In another embodiment, the above features may be used in a way that does not rely on APPLE's DNDWD functionality to perform the feature restrictions. For example, once it has been determined that the user is attempting to use the mobile device and the mobile device is moving, the system can require instruct the user to perform a user verification test, as described above.

If the passenger verification test fails, make notification, deduct scores, or use other means to lock and disable the mobile device to prevent further inappropriate usage.

In some embodiments, it may be desirable to force the user to perform the passenger verification test(s). This can be accomplished by locking or preventing further usage of the device until the user confirms that they are a passenger. Other ways of enforcing the DNDWD functionality may include deducting driver score points based on how long it takes for them to acknowledge and perform the test.

In some embodiments, it may be desirable to prompt the user to perform a passenger verification test. If the user fails the passenger verification test, the system can be optionally configured to permit the user to proceed, but to alert their parent or employer or other admin that the user by-passed the DNDWD functionality. Optionally, the system can permit the user to acknowledge that they are the driver and to request that the DNDWD functionality be reactivated. If the user chooses to proceed despite failing the passenger verification test, the system can be configured to enable the admin to disable the user's ability even to attempt to pass the passenger verification procedure in the future—in which case, the system would automatically engage the distracted driving functionality or reactivate the DNDWD functionality if the device is being used in a moving vehicle. Optionally, the system could be configured automatically to remove the ability to use the passenger button in the future after 1 or more incorrect uses.

In other embodiments, AI (artificial intelligence), machine learning, decision trees, or hard coded logic may be used to adjust the behavior and response based on the user's prior history. For example, the user can begin in one mode, such as pure audit (where one or more functions are available to be used) or pure blocking (where nothing can be used) and adjust the blocking policy to be more or less restrictive based on the user reaching certain driving score thresholds, or other incentive based systems.

(3) Alternative Triggers for Initiating Distracted Driving and Other Applications It is sometimes useful to trigger a mobile device to go into "blocking" mode using a signal from the carrier network or from a cloud-based data network that is sent down to the mobile device. In network-based call blocking, a vehicle is equipped with a unit that is able to both determine vehicle status and communicate that information to a cloud-based network or server. The mobile device associated with that vehicle will then receive this information from the network and begin blocking/auditing/scoring. One problem with this particular technique is that the user's mobile device will be blocked, even if the user and his mobile device are not in the vehicle but if that vehicle is being driven by someone else. Most systems utilizing a signal from the cloud to trigger blocking work on a one-to-one basis. Meaning, one mobile device is tied to one vehicle. This is not an ideal situation. Below are some solutions to this problem.

One solution is to use the control device described herein, in conjunction with one or more mobile devices within the vehicle, to determine location of such mobile devices and then to determine the likely driver of the vehicle based upon such location determinations. Armed with this information, it is then possible for the control device or a software application on the mobile device of the driver to communicate vehicle status information and driver information to the carrier network, which can then intelligently send back a suitable signal to cause the mobile device to go into blocking/auditing/scoring mode. Alternatively, the carrier itself could impose a block, at least on cellular voice and data communications controlled by the carrier, to prevent such functionality until the control device or mobile device sends a suitable signal indicating that the vehicle is no longer being driven by the user of the mobile device and/or that the mobile device is no longer located in the driver space of the vehicle. It will also be appreciated by those of skill in the art that, armed with the information concerning who is driving the vehicle, it is then possible for the control device or a software application on the mobile device of the driver to communicate vehicle status information and driver information to a remote application server, which can then intelligently send back driver-specific data and information that can be used by software applications installed on the mobile device, for purposes other than distracted driving prevention.

Another solution is to use the GPS of the mobile device to determine if the mobile device is in motion. This would be performed only upon notification from the cloud that the vehicle associated with that mobile device is in motion, so as to preserve battery life on the mobile device. Further, the GPS position of the mobile device can be compared to that of the vehicle. This would allow the user to continue to have use of his mobile device when riding with someone else in another vehicle—even if his vehicle is being used by another at the same time.

Yet another solution is to use the accelerometer of the mobile device to determine if there has been a period of "walking" before getting a signal from the cloud that the vehicle is in motion. This would identify a scenario in which the user was likely walking to his vehicle. Further, it would allow someone in a stationary position to continue using his mobile device while someone else was driving his vehicle. Any "walking" detected long before, or after the signal from the cloud indicating vehicle movement, could be ignored.

In another case, significant changes in temperature can be used to indicate that the user is moving toward her vehicle. For example, the user may be getting into her vehicle and turning on the heat or air conditioner. Alternately, the user may be walking from inside to outside to get in her vehicle. In either case, the rapid change in temperature will give some indication of a change in environment that, when correlated with the vehicle moving signal from the cloud, gives a higher level of certainty that the user is indeed driving her vehicle. This temperature can be correlated with the outside temperature of that location at that time, determined using the GPS coordinates from the vehicle and a third-party weather API, giving even better results.

Additionally, changes in barometric pressure can be used in a similar manner as temperature. Due to the nature of HVAC systems, barometric pressure is often different inside of buildings and vehicles than it is in the open environment. Some modern mobile device have barometric pressure sensors capable of detecting these differences. Again, this reading could be correlated with third-party data for increased accuracy.

Software running on the mobile device can analyze sounds captured within the vehicle, such as distinct engine noises, that could be used to determine the mobile device receiving the signal is actually in a vehicle. The sounds could be compared independently of the system control device in the vehicle, or sound samples captured by both a control device in the vehicle as well as the mobile device itself could be compared. For example, algorithms can be used to determine that the sounds heard by a mobile device are consistent with sounds that would be heard while in a vehicle. More specifically, the captured sounds may be used to determine the type of vehicle in which the mobile device is located to further verify that the mobile device is located in the intended or expected vehicle. Furthermore, if a sample was taken by both the control device and by the mobile device, the sounds can be compared to see if they were taken from the same vehicle. To aid in comparison, the control device or mobile device may broadcast a high frequency tone to signify an identifiable sound that can be detected by the other device to confirm that both are within the same vehicle.

In another implementation, the mobile device or control device may be periodically broadcasting a tone at a specified frequency to help with identification—as outlined above for identifying in which quadrant the mobile device is located. Using any of the above-mentioned methods, the control device in the vehicle may play audio tones, which are then picked up by the mobile device. Once the sounds have been picked up by the mobile device, a decision can be made as to whether the mobile device should be "blocked." Furthermore, using the quadrant-identifying techniques described above, a mobile device triggered to go into blocking mode from the network could be configured not to go into blocking mode, notwithstanding the network signal, if the mobile device determined that it was not within the driver quadrant of the vehicle.

If the mobile device is connected to a BLUETOOTH device, such as a vehicle navigation system or a hands-free phone application, such information could be valuable in determining if the mobile device is currently located within the "correct" or expected vehicle when the network "blocking" signal is generated.

As WIFI and connected-vehicle initiatives become increasingly more popular, using WIFI to identify that a particular mobile device is in a particular vehicle is becoming more viable. For example, merely determining with which WIFI network a mobile device is connected may be sufficient to confirm that such mobile device is in a particular vehicle. Another implementation may be to send data over the WIFI network in a challenge/response configuration. Another use of WIFI could be in an aftermarket hardware device added to a vehicle or integrated as part of the vehicle by the OEM that is running a web service which can be queried locally by a mobile device connected to the WIFI to determine state of the vehicle or to determine within which vehicle a mobile device is located.

Another detection mechanism is to use cellular signal characteristics, as detected by a hardware device located within the vehicle. Activity occurring on the mobile device, such as received or sent SMS messages, phone calls, or data transfers, can be used to narrow down which mobile device may be located in that particular vehicle. Absent any noticeable activity by the mobile device, the cellular signal detection hardware may be able to distinguish certain identifiable traits of the mobile device. Such as connected cell tower, relative cellular signal strength, cellular technology in use for example GSM vs. CDMA, 2G vs. 3G vs. LTE. Even characteristics produced by sensors running on the mobile device, such as BLUETOOTH, can be utilized.

It should be noted that all of the above methods could utilize and process the collected data within the mobile device, within the system control device, remotely from the vehicle, using a cloud-based server or processor, or any suitable combination of the above.

In another implementation, simply having the presence of various audio frequencies could be enough to trigger the application on the mobile device. One example could be to go into blocking/auditing/scoring mode whenever a consistent 19200 Hz and 19300 Hz signal is detected, as outlined in the various audio signal transmission methods discussed previously. If both signals are identified and consistently being played, the mobile device may use this as a signal to engage. To help prevent false positives related to the presence of the two signals, a third frequency may be used as a control or "presence" frequency. In one implementation, the left speaker might play a 19200 Hz tone and a 19300 Hz tone, whereas the right speaker would play a 19400 Hz tone and a 19300 Hz tone. In this example, the 19300 hz signal is the control signal. Further determination related to quadrant may be used as outlined above. It should be further stressed that all frequencies presented herein are intended only as examples. Any number of frequencies could be utilized in the presented solutions.

Another embodiment not requiring any hardware to be installed within the vehicle relies upon audio captured by the mobile device. Once the audio has been analyzed and determined to be in a vehicle, the accelerometer or GPS of the mobile device could be used to trigger motion and instruct the software on the mobile device to go into blocking mode. Through further analysis, the specific vehicle or type of vehicle could be determined. This would allow for a GPS or accelerometer based system to remove false positives and ensure that the mobile device is blocked only in intended vehicles.

In one implementation it may be desirable periodically to record background audio. Once the audio indicates that the mobile device is potentially in a vehicle, based on engine noises, known frequencies being played through the vehicle speakers, or other pre-determined sounds that are used to detect that a mobile device is in a vehicle, the system can transition to using GPS or accelerometer for motion to launch the blocking software on the mobile device. A GPS triggered or accelerometer triggered solution implemented in this fashion would have substantially reduced battery drain.

In another implementation, GPS or accelerometer data may be used to indicate movement. Once movement has been indicated, the mobile device can record background audio to determine if it is in a vehicle and/or specifically in which quadrant within the vehicle the mobile device is located. Using this information, a determination for blocking/auditing/scoring can be made by the software on the mobile device.

Light (either visible or not visible to the human eye) could be picked up by light sensors built into many mobile devices. Changes in light could be an indication of change in environment, which may precede a mobile device entering a vehicle. Light could also be unique to a vehicle and used as a way of distinguishing one vehicle from another. For example, lights emitted by various instruments and gadgets found within a vehicle, or light from outside the vehicle filtered by window tint may be used and calibrated to apply to a specific vehicle—with calibration being adjusted based on time of day and current weather conditions retrieved for the current location of the vehicle or the mobile device. The intensity, hue, and saturation of light(s) detected could all be useful in making this determination. Light itself could also be a triggering mechanism, with different lights being emitted into the cabin of a vehicle and detected by the mobile device. Data can be communicated through this method as well, using frequency modulation techniques. Using infrared may be especially advantageous in this context, as it would be invisible to humans, while most digital cameras are capable of seeing near-infrared light.

By utilizing all of the above triggering mechanisms, the blocking/auditing/scoring applications described herein can have multiple mobile devices associated with a single vehicle or with multiple vehicles.

All of the above methods of determining which mobile device (or the likelihood of a mobile device) being in a vehicle could also be used to conserve battery on the mobile device for various blocking/auditing/scoring applications. Some of these sensors use less energy than BT, for example. Thus, first determining that a mobile device is in a vehicle, using one or more the above information, such as audio, light, temperature, magnetometer, etc., may be useful before the mobile device initiates any BLUETOOTH discovery protocols, which would help conserve battery life on the mobile device.

In all references above to blocking or triggering, the solution should be understood to mean a blocking solution, auditing, scoring, UBI, or hours of service type application.

(4) Logging, Collection, and Auditing of Driver Activity and Vehicle Usage Applications Advantageously, the systems, methods, and devices described herein are also capable of monitoring usage of a vehicle to detect, log, and report on dangerous or abusive operator behavior, such as excessive speeding or excessive idling of the vehicle.

For example, a mobile application could record the number of phone calls made, the duration of phone calls, SMS sent and/or received, applications used, duration of application(s) used, screen dimming/un-dimming, screen locked or unlocked status, and other variables to reconstruct a picture of how the mobile device was utilized while the user was driving.

In another example, the microphone of the control device can be used to detect breaking glass associated with the vehicle. Such detection in combination with vehicle movement, based on data from the accelerometer or the GPS module, could be used to indicate that the vehicle has been in an accident. In contrast, detection of breaking glass in combination with non-movement of the vehicle, again based on data from the accelerometer or the GPS module, could be used to indicate that the vehicle has been broken into. Applications running on a mobile device or running on the vehicle itself could then use this data to, in the first case, send an automated call to 911 and to a spouse or closest relative indicating that an accident has occurred. In the second case, applications running on a mobile device or running on the vehicle itself could then use this data to call 911 and call or text the owner of the vehicle indicating that a break-in may have occurred. The GPS location of the device could also be provided in such communication.

In another example, being able to detect noise in the cabin of the vehicle, such as a dog barking or a child crying, in combination with data detecting that the vehicle is not in motion and has not been in motion for a predetermined period of time, in combination with a high in-cabin temperature reading, could trigger an application to notify send an emergency alert call or text to the owner of the vehicle (or to authorities) depending upon the settings made in the application.

In a further example, the accelerometer of the control device can be used to detect rapid changes in orientation of the control device. If such rapid change in orientation is detected while the vehicle is in motion, such information could indicate that the vehicle has been involved in a potentially serious accident, indicating that the vehicle has rolled or flipped. On the other hand, such rapid change in orientation of the control device while the vehicle is not in motion could indicate that the user is attempting to remove the control device from its mounted position. Additional vehicular data detectible by the control device can further aid in validating if either of these conditions is actually occurring.

(5) UBI Scoring and Insurance Applications

Another advantage of knowing which mobile device is in the driver quadrant of a vehicle is to identify the owner of the mobile device as the likely driver of the vehicle, which can then be used for UBI scoring, rewards programs, electronic driver logging, and the like.

For purposes of UBI scoring, there can be individual scores for various factors associated with the driver. These factors can then be combined into a single cumulative score. Further, impaired driving can potentially be detected by swerving, hard braking, and hard acceleration. Each of these can be detected via accelerometer associated with the vehicle, with the control device installed in a vehicle, or with the mobile device, or any combination of the above.

For example, a mobile application could record the number of phone calls made, the duration of phone calls, SMS sent and/or received, applications used, duration of application(s) used, screen dimming/un-dimming, screen locked or unlocked status, and other variables to reconstruct a picture of how the mobile device was utilized while the user was driving. This usage information can then be formulated into a score to aid in UBI scoring, reward programs, or behavioral modification programs.

Utilizing a device capable of detecting signals emitting from the driver quadrant of a vehicle, UBI, rewards, or behavioral scoring could also be performed without needing an application to run on the mobile device. Such as outlined above, the signal detection system could record various uses of the mobile device while located within the driver quadrant.

Driving conditions can also play a role in such scoring. For example, if someone is driving into the sun, while it is at a low angle, this in a dangerous condition. This can be detected by heading information, latitude and longitude data (all gathered via GPS) combined with ephemeris data for the sun, at that time, and in that location. A threshold for both heading versus sun azimuth, as well as minimum and maximum sun altitude, could be used for this score, as well as length of time and speed while in this condition.

Driver fatigue can also be a contributing factor to accidents. This can be measured by tracking how many hours the driver has driven that day, as well as how many hours in a row the driver has driven. Additionally, late night interstate driving is more dangerous than late night city driving. Interstate driving can be detected by a continuous high speed or by collection of GPS data.

Additionally, the control device can be used to help detect, identify, and manage insurance fraud and collision management by monitoring/collecting data, such as accelerometer activity, g-force/impact, combined with GPS location and other data elements including driver/passenger identification. For instance, if an impact event happens, while a teenage-driver was driving the vehicle near the parent-vehicle-owner's home, the collected data would prevent the parent-vehicle-owner from moving the vehicle and staging a fraudulent accident at a later time, at a different location, and with a different driver.

(6) Smart Pairing Applications

Another use for driver identification (or identifying within which quadrant of the vehicle a mobile device is located) includes "smart pairing." For example, it is becoming more and more common for vehicles to adapt to the person who is driving. Many aspects of the driving experience (such as which mobile device is currently connected to hands free, which address book is shared, which music is being streamed, seat adjustments, etc.) can be configured within the vehicle based on driver. Using technology to identify which mobile device is within the driver quadrant can be used to make these technologies more efficient. For example, an application running on a mobile device can be configured to notify the head unit or head rest when the mobile device is in the driver quadrant. This would allow the vehicle's adjustments to take place automatically.

A common use case would be determining which mobile device is currently connected via BLUETOOTH to the head unit. If two family members enter into a vehicle today, only one of those mobile devices will connect to the head unit for music streaming, address book synching, and hands free calling. Typically, the mobile device that has been designated as the "primary" device associated with the vehicle will prevail—even if such device is not being carried by the driver. Using the control device disclosed herein and using one or more methods for determining whether the mobile device is located in the driver quadrant, the head unit could drop the connection to the "primary" mobile device when it has been determined that the primary mobile device is not located within the driver quadrant. This would free up the connection for the mobile device (and the customized vehicle settings) of the user who is actually sitting in the driver quadrant. Head unit technology can take advantage of this smart association without blindly relying upon which mobile device has been identified as the "primary" device associated with the vehicle and, instead, the system would dynamically designate whichever mobile device is in the driver quadrant as the currently active or primary device and associate the vehicle settings to the user associated with the detected mobile device.

The various technologies and techniques for determining whether the mobile device is located in the driver quadrant can also be used outside of today's current head unit use cases. For example, SMS could be withheld by the head unit automatically, calls could be routed to voice mail, auto responding messages could be sent. Any number of adjustments can be made to communications that are allowed—based on the mobile device located within the driver quadrant. Even behavioral modification technologies could benefit, being able to direct instructions tailored towards the actual driver or passengers based on the various locations of the mobile devices within the cabin of the vehicle.

(7) Industry Specific Applications

Another use for driver identification (or identifying within which quadrant of the vehicle a mobile device is located) includes the ability to communicate with third party route management software as to GPS location, start/stop time, etc. Such data can also be cross-referenced for route optimization, re-routing due to traffic congestion data, validation and/or verification of home healthcare visits, compliance with house arrest or parole obligations, delivery notifications and confirmations, and the like.

In view of the foregoing detailed description of embodiments of the present disclosure, it readily will be understood by those persons skilled in the art that the present disclosure is susceptible to broad utility and application. While various aspects have been described herein, additional aspects, features, and methodologies of the present disclosure will be readily discernible therefrom. Many embodiments and adaptations of the present disclosure other than those herein described, as well as many variations, modifications, and equivalent arrangements and methodologies, will be apparent from or reasonably suggested by the present disclosure and the foregoing description thereof, without departing from the substance or scope of the present disclosure. Furthermore, any sequence(s) and/or temporal order of steps of various processes described and claimed herein are those considered to be the best mode contemplated for carrying out the present disclosure. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the present disclosure. In addition, some steps may be carried out simultaneously. Accordingly, while the present disclosure has been described herein in detail in relation to the embodiments, it is to be understood that this disclosure is only illustrative and exemplary of the present disclosure and is made merely for purposes of providing a full and enabling disclosure of the techniques described herein. The foregoing disclosure is not intended nor is to be construed to limiting or otherwise to exclude any such other embodiments, adaptations, variations, modifications and equivalent arrangements.

What is claimed is:

1. A method comprising:

receiving, by a contextual mobile device management (CMDM) service executing on a platform, an indication of a change in a context for managing a mobile device via a configuration profile associated with the mobile device, wherein the CMDM service sends communications to the mobile device via a push notification service executing on the platform;

determining, by the CMDM service and based on the change in context, a mobile device management policy to apply to the mobile device; and modifying, by the CMDM service, the configuration profile associated with the mobile device by:

generating a notification comprising a payload to modify the configuration profile according to the determined mobile device management policy, and transmitting, via the push notification service, the notification to the mobile device to cause the mobile device to modify the configuration profile.

2. The method of claim 1, wherein the CMDM service receives the indication of the change in the context from a networked beacon.

3. The method of claim 2, wherein the CMDM service receives the indication of the change in the context from the networked beacon in response to the mobile device leaving a predefined geofence.

4. The method of claim 1, wherein the payload is a command for the mobile device to execute, and wherein transmitting the notification to the mobile device causes the mobile device to execute the command.

5. The method of claim 1, wherein the payload comprises restrictions to one or more features of the mobile device.

6. The method of claim 1, wherein the payload comprises enabling or disabling a single application view mode on the mobile device.

7. The method of claim 1, wherein the payload comprises enabling a whitelisted applications list on the mobile device, wherein the whitelisted applications list specifies one or more applications on the mobile device that are accessible by a user.

8. The method of claim 1, wherein the payload comprises enabling a blacklisted applications list on the mobile device, wherein the blacklisted applications list specifies one or more applications on the mobile device that are prohibited from access by a user.

9. The method of claim 1, wherein the payload comprises limiting incoming notifications being transmitted to the mobile device.

10. The method of claim 1, wherein the payload comprises modifying a lock screen message presented on a display of the mobile device.

11. The method of claim 1, wherein the payload comprises applying a web content filter to restrict one or more types of network traffic from access on the mobile device.

12. The method of claim 1, further comprising:

generating a geofence region in which the mobile device is to remain;

upon detecting that the mobile device leaves the geofence region, activating a lost device mode on the mobile device.

13. The method of claim 1, wherein the payload is a command that triggers the mobile device to install media based on a context domain.

14. The method of claim 1, wherein the payload comprises restricting access to one or more business applications on the mobile device.

* * * * *